(12) United States Patent
Rehman et al.

(10) Patent No.: US 11,987,894 B2
(45) Date of Patent: *May 21, 2024

(54) ELECTROCHEMICAL WATER SPLITTING CELL

(71) Applicant: KING FAHD UNIVERSITY OF PETROLEUM AND MINERALS, Dhahran (SA)

(72) Inventors: Abdul Rehman, Dhahran (SA); Abbas Hakeem Saeed, Dhahran (SA); Muhammad Ali Ehsan, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 18/146,144

(22) Filed: Dec. 23, 2022

(65) Prior Publication Data

US 2024/0003023 A1 Jan. 4, 2024

Related U.S. Application Data

(63) Continuation of application No. 16/660,160, filed on Oct. 22, 2019, now Pat. No. 11,542,614.

(51) Int. Cl.
*C25B 11/073* (2021.01)
*C01G 31/00* (2006.01)
(Continued)

(52) U.S. Cl.
CPC .......... *C25B 11/073* (2021.01); *C01G 31/006* (2013.01); *C01G 51/42* (2013.01);
(Continued)

(58) Field of Classification Search
CPC ....... C25B 11/073; C25B 1/04; C01G 31/006; C01G 51/42; H01M 4/485; H01M 4/525
See application file for complete search history.

(56) References Cited

U.S. PATENT DOCUMENTS

| | | | |
|---|---|---|---|
| 4,162,302 A * | 7/1979 | Hirayama | C01B 3/068 |
| | | | 423/658.2 |
| 2002/0055041 A1 | 5/2002 | Kobayashi | |
| 2018/0212241 A1 | 7/2018 | Liu et al. | |

FOREIGN PATENT DOCUMENTS

| CN | 105742075 A | 7/2016 |
|---|---|---|
| CN | 108283929 A | 7/2018 |

(Continued)

OTHER PUBLICATIONS

Liardet et al "Amorphous Cobalt Vanadium Oxide as a Highly Active Electrocatalyst for Oxygen Evolution", ACS Catal. 2018, 8, 644-650.*

(Continued)

*Primary Examiner* — Mark Kopec
(74) *Attorney, Agent, or Firm* — Oblon, McClelland, Maier & Neustadt, L.L.P.

(57) ABSTRACT

A $CoVO_x$ composite electrode and method of making is described. The composite electrode comprises a substrate with an average 0.5-5 μm thick layer of $CoVO_x$ having pores with average diameters of 2-200 nm. The method of making the composite electrode involves contacting the substrate with an aerosol comprising a solvent, a cobalt complex, and a vanadium complex. The $CoVO_x$ composite electrode is capable of being used in an electrochemical cell for water oxidation.

14 Claims, 39 Drawing Sheets

(51) Int. Cl.
  *C01G 51/00* (2006.01)
  *C25B 1/04* (2021.01)
  *H01M 4/485* (2010.01)
  *H01M 4/525* (2010.01)
(52) U.S. Cl.
  CPC .............. *C25B 1/04* (2013.01); *H01M 4/485* (2013.01); *H01M 4/525* (2013.01)

(56) References Cited

FOREIGN PATENT DOCUMENTS

| | | |
|---|---|---|
| CN | 108579788 A | 9/2018 |
| CN | 109585800 A | 4/2019 |
| RU | 2 570 070 C1 | 12/2015 |

OTHER PUBLICATIONS

Yu et al "Efficient electrocatalytic water oxidation by a copper oxide thin film in borate buffer", ACS Catal., 2015, 5, 627-630.*

Hao, et al. ; Synthesis of cobalt vanadium nanomaterials for efficient electrocatalysis of oxygen evolution ; Frontiers of Chemical Science and Engineering, vol. 12, Issue 3 ; pp. 409-416 ; Oct. 2, 2018 ; Abstract Only ; 2 Pages.

Xiao, et al. ; Cobalt-vanadium bimetal-based nanoplates for efficient overall water splitting ; Science China Materials, 61(1) ; pp. 80-90 ; Nov. 7, 2017; 11 Pages.

Yang, et al. ; Cobalt-Vanadium Hydroxide Nanoneedles with a Free-Standing Structure as High-Performance Oxygen Evolution Reaction Electrocatalysts ; ChemElectroChem, vol. 6, Issue 7 ; Mar. 14, 2019 ; Abstract Only ; 2 Pages.

Pavliuk, et al. ; Homogeneous Cobalt/Vanadium Complexes as Precursors for Functionalized Mixed Oxides in Visible-Light-Driven Water Oxidation ; ChemSusChem, vol. 9, Issue 20 ; Sep. 30, 2016 ; Abstract Only ; 2 Pages.

Sagu, et al. ; Electrocatalytic activity of CoFe O thin films prepared by AACVD towards the oxygen evolution reaction in alkaline media ; Electrochemistry Communications, vol. 87 ; pp. 1-4 ; Feb. 2018 ; 8 Pages.

Ehsan, et al. ; Direct Deposition of Amorphous Cobalt-Vanadium Mixed Oxide Films for Electrocatalytic Water Oxidation ; ACS OMEGA 4 ; pp. 12671-12679 ; 2019 ; 9 Pages.

Ehsan, et al. ; Fabrication of photoactive $CaTiO_3$—$TiO_2$ composite thin film electrodes via facile single step aerosol assisted chemical vapor deposition route ; Journal of Materials Science: Materials in Electronics ; Nov. 17, 2018 ; 14 Pages.

Ehsan, et al. ; Fabrication of $CoTiO_3$—$TiO_2$ composite films from a heterobimetallic single source precursor for electrochemical sensing of dopamine† ; Falton Transactions 46 ; May 15, 2016 ; 11 Pages.

Ehsan, et al. ; Facile Synthesis of Gold-Supported Thin Film of Cobalt Oxide via AACVD for Enhanced Electrocatalytic Activity in Oxygen Evolution Reaction ; ECS Journal of Solid State Science and Technology 7 (12) ; pp. 711-718 ; 2018 ; 8 Pages.

Liarfet, et al. ; Amorphous Cobalt Vanadium Oxide as a Highly Active Electrocatalyst for Oxygen Evolution ; ACS Catalysis 8 ; pp. 644-650 ; 2018 ; 7 Pages.

Kim et al "Novel synthesis of high-capacity cobalt vanadate for use in lithium secondary cells", Journal of Power Sources 112 (2002) 504-508.

Xing et al "Cobalt vanadate as highly active, stable, noble metal-free oxygen evolution electrocatalyst", J. Mater. Chem. A, 2014, 2, 18435.

Soundharrajan et al "$Co_3V_2O_8$ sponge network morphology derived from metal-organic framework as an excellent lithium storage anode material", ACS Appl. Mater. Interfaces 2016, 8, 8546-8553.

* cited by examiner

| Element | Atomic % |
|---|---|
| O K | 70.83 |
| V K | 10.58 |
| Co K | 9.10 |
| Sn L | 9.49 |

| Element | Atomic % |
|---|---|
|  |  |
| O K | 68.23 |
| V K | 15.15 |
| Co K | 16.62 |

| Element | Atomic % |
|---|---|
| O K | 60.23 |
| V K | 19.53 |
| Co K | 20.24 |

ELECTROCHEMICAL WATER SPLITTING CELL

CROSS-REFERENCE TO RELATED APPLICATIONS

The present application is a Continuation of U.S. application Ser. No. 16/660,160, now allowed, having a filing date of Oct. 22, 2019.

STATEMENT REGARDING PRIOR DISCLOSURES BY THE INVENTORS

Aspects of this technology are described in an article "Direct Deposition of Amorphous Cobalt-Vanadium Mixed Oxide Films for Electrocatalytic Water Oxidation" by Muhammad Ali Ehsan, Abbas Hakeem Saeed, Muhammad Sharif, and Abdul Rehman, in *ACS Omega*, 2019, 4, 12671-12679, DOI: 10.1021/acsomega.9b01385, which is incorporated herein by reference in its entirety.

STATEMENT OF ACKNOWLEDGEMENT

This project was prepared with support from the Center of Excellence in Nanotechnology (CENT) at King Fahd University of Petroleum & Minerals (KFUPM) and from the Deanship of Scientific Research (DSR) at KFUPM: Project no. IN161012.

BACKGROUND OF THE INVENTION

Technical Field

The present invention relates to a method of making a $CoVO_x$ composite thin film electrode that is capable of electrocatalytic water splitting.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water splitting reactions for generating and storing clean energy in the form of hydrogen may fulfill rising global energy demands while mitigating ever-increasing environmental concerns. See Wang, Y.; Suzuki, H.; Xie, J.; Tomita, O.; Martin, D. J.; Higashi, M.; Kong, D.; Abe, R.; Tang, J., Mimicking Natural Photosynthesis: Solar to Renewable H2 Fuel Synthesis by Z-Scheme Water Splitting Systems. Chemical Reviews 2018, 118 (10), 5201-5241; and Chu, S.; Cui, Y.; Liu, N., The path towards sustainable energy. *Nature Materials* 2016, 16, 16, each incorporated herein by reference in their entirety. A bottle neck here is the four electron oxygen evolution reaction (OER), which due to its sluggish kinetics and high overvoltage, requires highly active catalytic materials for an economically viable rate of reaction. See Reier, T.; Oezaslan, M.; Strasser, P., Electrocatalytic Oxygen Evolution Reaction (OER) on Ru, Ir, and Pt Catalysts: A Comparative Study of Nanoparticles and Bulk Materials. *ACS Catalysis* 2012, 2 (8), 1765-1772; Reier, T.; Nong Hong, N.; Teschner, D.; Schlögl, R.; Strasser, P., Electrocatalytic Oxygen Evolution Reaction in Acidic Environments—Reaction Mechanisms and Catalysts. *Advanced Energy Materials* 2016, 7 (1), 1601275; and Kumar, A.; Ciucci, F.; Morozovska, A. N.; Kalinin, S. V.; Jesse, S., Measuring oxygen reduction/evolution reactions on the nanoscale. Nature Chemistry 2011, 3, 707, each incorporated herein by reference in their entirety. At the same time, these materials need to be robust, efficient, and facile to be produced. Current benchmarks for water oxidation are $IrO_2$ and $RuO_2$, but these are based on scarce and costly noble metals, and thus replacing them with earth abundant materials is an active area of research. See McCrory, C. C. L.; Jung, S.; Peters, J. C.; Jaramillo, T. F., Benchmarking Heterogeneous Electrocatalysts for the Oxygen Evolution Reaction. *Journal of the American Chemical Society* 2013, 135 (45), 16977-16987; Lyons, M. E. G.; Brandon, M. P., A comparative study of the oxygen evolution reaction on oxidised nickel, cobalt and iron electrodes in base. *Journal of Electroanalytical Chemistry* 2010, 641 (1), 119-130; Faber, M. S.; Jin, S., Earth-abundant inorganic electrocatalysts and their nanostructures for energy conversion applications. *Energy & Environmental Science* 2014, 7 (11), 3519-3542; and Roger, I.; Shipman, M. A.; Symes, M. D., Earth-abundant catalysts for electrochemical and photoelectrochemical water splitting. *Nature Reviews Chemistry* 2017, 1, 0003, each incorporated herein by reference in their entirety.

While the approach to develop these electrocatalysts mostly remains empirical, some attempts to explore theoretical guidelines have also been made. See Grimaud, A.; May, K. J.; Carlton, C. E.; Lee, Y. L.; Risch, M.; Hong, W. T.; Zhou, J.; Shao-Horn, Y., Double perovskites as a family of highly active catalysts for oxygen evolution in alkaline solution. *Nat Commun* 2013, 4, 2439; and Suntivich, J.; May, K. J.; Gasteiger, H. A.; Goodenough, J. B.; Shao-Horn, Y., A perovskite oxide optimized for oxygen evolution catalysis from molecular orbital principles. *Science* 2011, 334 (6061), 1383-5, incorporated herein by reference in their entirety.

In one such purely descriptor approach, the intrinsic activity of the mixed metal oxide films is correlated to the M-OH bond strengths using volcano plots. See Morales-Guio, C. G.; Thorwarth, K.; Niesen, B.; Liardet, L.; Patscheider, J.; Ballif, C.; Hu, X., Solar Hydrogen Production by Amorphous Silicon Photocathodes Coated with a Magnetron Sputter Deposited $Mo_2C$ Catalyst. *J Am Chem Soc* 2015, 137 (22), 7035-8, incorporated herein by reference in its entirety. The outcome of this approach is quite debatable as it neither describes the physical origin nor the nature of the active sites in the metal oxide films. See Stevens, M. B.; Trang, C. D. M.; Enman, L. J.; Deng, J.; Boettcher, S. W., Reactive Fe-Sites in Ni/Fe (Oxy)hydroxide Are Responsible for Exceptional Oxygen Electrocatalysis Activity. *J Am Chem Soc* 2017, 139 (33), 11361-11364; and Friebel, D.; Louie, M. W.; Bajdich, M.; Sanwald, K. E.; Cai, Y.; Wise, A. M.; Cheng, M.-J.; Sokaras, D.; Weng, T.-C.; Alonso-Mori, R.; Davis, R. C.; Bargar, J. R.; Norskov, J. K.; Nilsson, A.; Bell, A. T., Identification of Highly Active Fe Sites in (Ni,Fe)OOH for Electrocatalytic Water Splitting. *Journal of the American Chemical Society* 2015, 137 (3), 1305-1313, each incorporated herein by reference in their entirety. However, it approximates the superior catalytic activity of films like $NiFeO_x$ and $CoFeO_x$, explaining that Ni and Co are located on different branches of the volcano plot as compared to Fe, thereby benefiting from the balancing of M-OH bond strengths for higher catalytic activity. Even better performance has been shown by $CoVO_x$ catalysts, especially ones having amorphous character, with V sitting in the same branch of volcano plot as Fe while Co sits at exactly opposite branch, as depicted in FIG. 1. See Liu, J.; Ji, Y.; Nai, J.; Niu, X.; Luo, Y.; Guo, L.; Yang, S., Ultrathin amorphous cobalt-vanadium hydr(oxy)oxide catalysts for the oxygen evolution reaction. *Energy & Environmental Science* 2018, 11 (7), 1736-1741; Thorat, G. M.; Jadhav, H. S.; Roy, A.; Chung, W.-J.; Seo, J. G., Dual Role of Deep Eutectic Solvent as a Solvent and Template for the Synthesis of Octahedral Cobalt Vanadate for an Oxygen Evolution Reaction. *ACS Sustainable Chemistry & Engineering* 2018, 6 (12), 16255-16266; and Xing, Z.; Wu, H.; Wu, L.; Wang, X.; Zhong, H.; Li, F.; Shi, J.; Song, D.; Xiao, W.; Jiang, C.; Ren, F., A multifunctional vanadium-doped cobalt oxide layer on silicon photoanodes for efficient and stable photoelectrochemical water oxidation. *Journal of Materials Chemistry A* 2018, 6 (42), 21167-21177, each incorporated herein by reference in their entirety.

Thus, a recent trend is the straightforward, low temperature, and fast fabrication of Co—V mixed oxide films having amorphous character to provide abundant defects in a distinctive molecular structure. See Chakrapani, K.; Bendt, G.; Hajiyani, H.; Lunkenbein, T.; Greiner, M. T.; Masliuk, L.; Salamon, S.; Landers, J.; Schlogl, R.; Wende, H.; Pentcheva, R.; Schulz, S.; Behrens, M., The Role of Composition of Uniform and Highly Dispersed Cobalt Vanadium Iron Spinel Nanocrystals for Oxygen Electrocatalysis. *ACS Catalysis* 2018, 8 (2), 1259-1267; and Peng, X.; Wang, L.; Hu, L.; Li, Y.; Gao, B.; Song, H.; Huang, C.; Zhang, X.; Fu, J.; Huo, K.; Chu, P. K., In situ segregation of cobalt nanoparticles on VN nanosheets via nitriding of $CO_2V_2O_7$ nanosheets as efficient oxygen evolution reaction electrocatalysts. *Nano Energy* 2017, 34, 1-7, each incorporated herein by reference in their entirety. Accordingly, Liardet et al synthesized amorphous electrocatalysts based on Co—V mixed oxides with different metallic ratios while approximating their position on the volcano plots, and showed the highly active nature of the resulting materials (e.g., a-$Co_{0.58}V_{0.42}O_x$) when deposited over glassy carbon electrodes and nickel foams. See Liardet, L.; Hu, X., Amorphous Cobalt Vanadium Oxide as a Highly Active Electrocatalyst for Oxygen Evolution. *ACS Catalysis* 2018, 8 (1), 644-650, incorporated herein by reference in its entirety. Liu et al has also shown a similar catalytic activity of amorphous Co—V (hydroxy)oxide ultrathin films when supported on gold foams.

Typically, two strategies are implemented in the rational design of amorphous catalytic materials: (i) a solid-state reaction (SSR) route using pure metals or metal salts, and (ii) wet chemistry synthetic methods such as hydrothermal synthesis or co-precipitation techniques. See Schmalzried, H., Solid-State Reactions. *Angewandte Chemie International Edition in English* 1963, 2 (5), 251-254; Jiang, X.; Zhang, T.; Lee, J. Y., A Polymer-Infused Solid-State Synthesis of a Long Cycle-Life $Na_3V_2(PO_4)_3$/C Composite. *ACS Sustainable Chemistry & Engineering* 2017, 5 (9), 8447-8455; Liardet et al. (2018); Kim, J. S.; Kim, S. Y.; Kim, D. H.; Ott, R. T.; Kim, H. G.; Lee, M. H., Effect of hydrothermal condition on the formation of multi-component oxides of Ni-based metallic glass under high temperature water near the critical point. *AIP Advances* 2015, 5 (7), 077132; Liu et al. (2018); and Dolla, T. H.; Billing, D. G.; Sheppard, C.; Prinsloo, A.; Carleschi, E.; Doyle, B. P.; Pruessner, K.; Ndungu, P., Mn substituted $Mn_xZn_{1-x}Co_2O_4$ oxides synthesized by co-precipitation; effect of doping on the structural, electronic and magnetic properties. *RSC Advances* 2018, 8 (70), 39837-39848, each incorporated herein by reference in their entirety. The SSR routes are limited by a high temperature processing and long reaction times because of the long diffusion distances. See Fister, L.; Johnson, D. C., Controlling solid-state reaction mechanisms using diffusion length in ultrathin-film superlattice composites. *Journal of the American Chemical Society* 1992, 114 (12), 4639-4644, incorporated herein by reference in its entirety. Still, the procedure has a lesser control on the size and morphology of the final product. Typically, SSR for cobalt vanadate is performed at high temperatures of >720° C. for as long as 40 h using vanadium oxides and hydrated cobalt oxalates. On the other hand, wet chemical methods provide controllable synthesis and intriguing morphologies with product formation occurring at relatively low temperatures, yet require long reaction times and expensive instruments such as high pressure reactors. Further adding to this laborious work is the coating of resulting products onto substrates in separate manipulation steps. Therefore, the scale up of the final product becomes a limiting factor for these processes.

In view of the forgoing, one objective of the present invention is to provide an aerosol assisted chemical vapor deposition (AACVD) protocol, which uses solution-based precursors with a deposition step on a pre-heated substrate. During deposition via AACVD, the particle growth and sintering processes simultaneously occur on the substrate surface to develop well interconnected morphological features and produce adhesive film electrodes in a matter of minutes. This was used to generate films of Co—V mixed oxide for effective and stable water oxidation.

BRIEF SUMMARY OF THE INVENTION

According to a first aspect, the present disclosure relates to a composite thin film electrode, which comprises a $CoVO_x$ layer having an average thickness of 500 nm-5 μm in contact with a substrate, the $CoVO_x$ layer comprising amorphous $CoVO_x$ having a Co:V molar ratio in a range of 1.0:1.2-1.5:1.0.

In one embodiment, the $CoVO_x$ layer is porous with a pore size in a range of 2-200 nm.

In one embodiment, the composite thin film electrode has an electrochemically active surface area in a range of 12-22 $mF/cm^2$.

In one embodiment, the $CoVO_x$ layer consists essentially of amorphous $CoVO_x$.

In one embodiment, the $CoVO_x$ layer has an O:Co molar ratio in a range of 4:1 to 9:1.

In one embodiment, the substrate is a transparent conducting film selected from the group consisting of FTO, ITO, AZO, GZO, IZO, IZTO, IAZO, IGZO, IGTO, and ATO.

According to a second aspect, the present disclosure relates to a method of making the composite thin film electrode of the first aspect. The method involves contacting an aerosol with the substrate to deposit the $CoVO_x$ layer to form the composite thin film electrode. The aerosol comprises a carrier gas, and a cobalt complex and a vanadium complex dissolved in a solvent. The substrate has a temperature in a range of 425-525° C. during the contacting.

In one embodiment, the cobalt complex and the vanadium complex each independently comprise at least one ligand selected from the group consisting of acetylacetonate, acetate ligand, trifluoroacetate, isopropanol, and tetrahydrofuran.

In one embodiment, the cobalt complex is Co(II) acetylacetonate, and the vanadium complex is V(III) acetylacetonate.

In one embodiment, before the contacting, the aerosol consists essentially of the carrier gas, the cobalt complex, the vanadium complex, and the solvent.

In one embodiment, a weight ratio of the cobalt complex to the solvent in the aerosol, and/or a weight ratio of the vanadium complex to the solvent in the aerosol is in a range of 1:1,000-1:5.

In one embodiment, the aerosol is contacted with the substrate for a time period of 10-30 min.

In one embodiment, the carrier gas has a flow rate in a range of 20-250 cm$^3$/min during the contacting.

According to a third aspect, the present disclosure relates to an electrochemical cell comprising the composite thin film electrode of the first aspect, a counter electrode, and an electrolyte solution in contact with both electrodes.

In one embodiment, the composite thin film electrode has an overpotential in a range of 270-335 mV at a current density of 9-11 mA/cm$^2$.

In one embodiment, the composite thin film electrode has a current density of 1.0-10.0 mA/cm$^2$ when the electrodes are subjected to a bias potential of 1.45-1.55 V.

In one embodiment, the electrolyte solution comprises water and an inorganic base having a concentration of 0.1-1.0 M.

In one embodiment, the composite thin film electrode has a mass activity in range of 38-50 A/g at 350 mV.

According to a fourth aspect, the present disclosure relates to a method for decomposing water into $H_2$ and $O_2$. This involves subjecting the electrodes of the electrochemical cell of claim 14 with a potential of 0.5-2.0 V.

In one embodiment, the method also involves separately collecting $H_2$-enriched gas and $O_2$-enriched gas.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
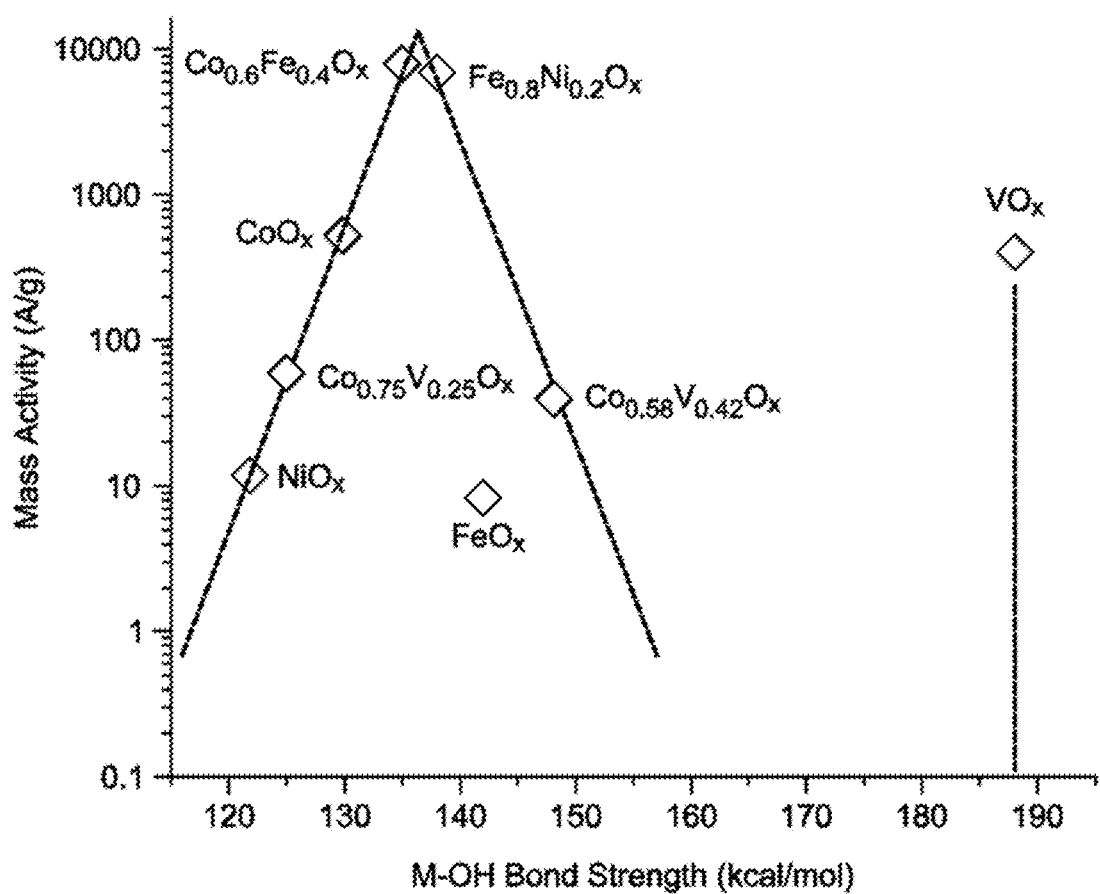
FIG. 1 is a volcano plot describing mass activity of oxygen evolution reactions against M-OH bond strength.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of cobalt include $^{56}Co$, $^{57}Co$, $^{58}Co$, $^{59}Co$, and $^{60}Co$. Isotopes of vanadium include $^{48}V$, $^{9}V$, $^{50}V$, and $^{51}V$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As defined here, an aerosol is a suspension of solid or liquid particles in a gas. An aerosol includes both the particles and the suspending gas. Primary aerosols contain particles introduced directly into the gas, while secondary aerosols form through gas-to-particle conversion. There are several measures of aerosol concentration. Environmental science and health fields often use the mass concentration (M), defined as the mass of particulate matter per unit volume with units such as $\mu g/m^3$. Also commonly used is the number concentration (N), the number of particles per unit volume with units such as $number/m^3$ or $number/cm^3$. The size of particles has a major influence on their properties, and the aerosol particle radius or diameter ($d_p$) is a key property used to characterize aerosols. Aerosols vary in their dispersity. A monodisperse aerosol, producible in the laboratory, contains particles of uniform size. Most aerosols, however, as polydisperse colloidal systems, exhibit a range of particle sizes. Liquid droplets are almost always nearly spherical, but scientists use an equivalent diameter to characterize the properties of various shapes of solid particles, some very irregular. The equivalent diameter is the diameter of a spherical particle with the same value of some physical property as the irregular particle. The equivalent volume diameter ($d_e$) is defined as the diameter of a sphere of the same volume as that of the irregular particle. Also commonly used is the aerodynamic diameter. The aerodynamic diameter of an irregular particle is defined as the diameter of the spherical particle with a density of $1000 \ kg/m^3$ and the same settling velocity as the irregular particle.

As defined here, an electrode is an electrically conductive material comprising a metal and is used to establish electrical contact with a nonmetallic part of a circuit. An "electrically-conductive material" as defined here is a substance with an electrical resistivity of at most $10^{-6}$ Ω·m, preferably at most $10^{-7}$ Ω·m, more preferably at most $10^{-8}$ Ω·m at a temperature of 20-25° C. The electrically-conductive material comprise platinum-iridium alloy, iridium, titanium, titanium alloy, stainless steel, gold, cobalt alloy, copper, aluminum, tin, iron, and/or some other metal.

According to a first aspect, the present disclosure relates to a composite thin film electrode. The composite thin film electrode comprises a $CoVO_x$ layer having an average thickness in a range of 500 nm-5 μm, preferably 700 nm-4 μm, more preferably 800 nm-3 μm, even more preferably 900 nm-2 μm, or about 1 μm. In one embodiment, the thickness of the layer may vary from location to location on the electrode by 1-30%, preferably 5-20%, relative to the average thickness of the layer. The $CoVO_x$ layer is a mixed metal oxide and may also be called a cobalt vanadium oxide layer, or a vanadium cobalt oxide layer.

In one embodiment, the $CoVO_x$ layer comprises amorphous $CoVO_x$. The amount of amorphous $CoVO_x$ may be measured by X-ray diffraction patterns. In one embodiment, the $CoVO_x$ layer consists essentially of amorphous $CoVO_x$, meaning that the $CoVO_x$ layer comprises at least 99 wt %, preferably 99.9 wt %, more preferably 99.95 wt % $CoVO_x$ in an amorphous (non-crystalline) state, relative to a total weight of the $CoVO_x$ layer.

While the name "$CoVO_x$" when read literally implies a 1:1 molar ratio of Co:V, in some embodiments, this molar ratio may not be 1:1. In one embodiment, the $CoVO_x$ layer comprises or consists essentially of $CoVO_x$ having a Co:V molar ratio in a range of 1.0:1.2-1.5:1.0, preferably 1.0:1.2-1.2:1.0 or 1.0:1.2-1.1:1.0, more preferably 1.0:1.18-1.05:1.0, or about 1.0:1.16, or about 1:1. Here, the $CoVO_x$ layer consisting essentially of $CoVO_x$ means that at least 99 wt %, preferably at least 99.9 wt %, more preferably at least 99.95 wt %, or about 100 wt % of the $CoVO_x$ layer, relative to a total weight is either cobalt, vanadium, or oxygen.

In one embodiment, the $CoVO_x$ layer has an O:Co molar ratio in a range of 4:1 to 9:1, preferably 5:1-8.5:1, more preferably 6:1-8:1, or about 7.8:1. In one embodiment, the $CoVO_x$ layer has an O:V molar ratio in a range of 4:1 to 9:1, preferably 5:1-8:1, more preferably 6:1-7:1, or about 6.7:1.

Figure 2A:
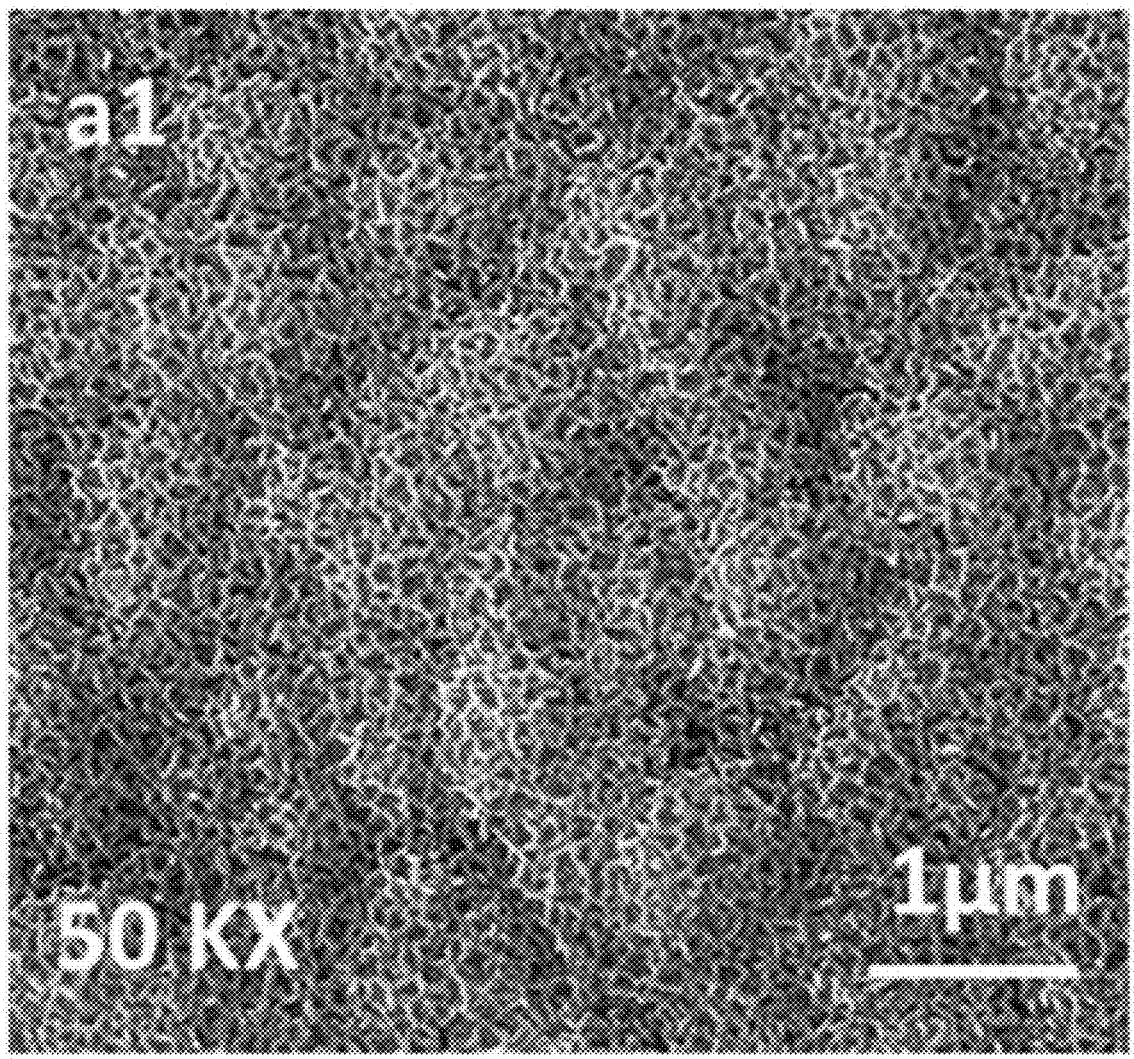
FIG. 2A is a large area, low resolution (10K×) FESEM of the CoVO$_x$-20 film.
Figure 2B:
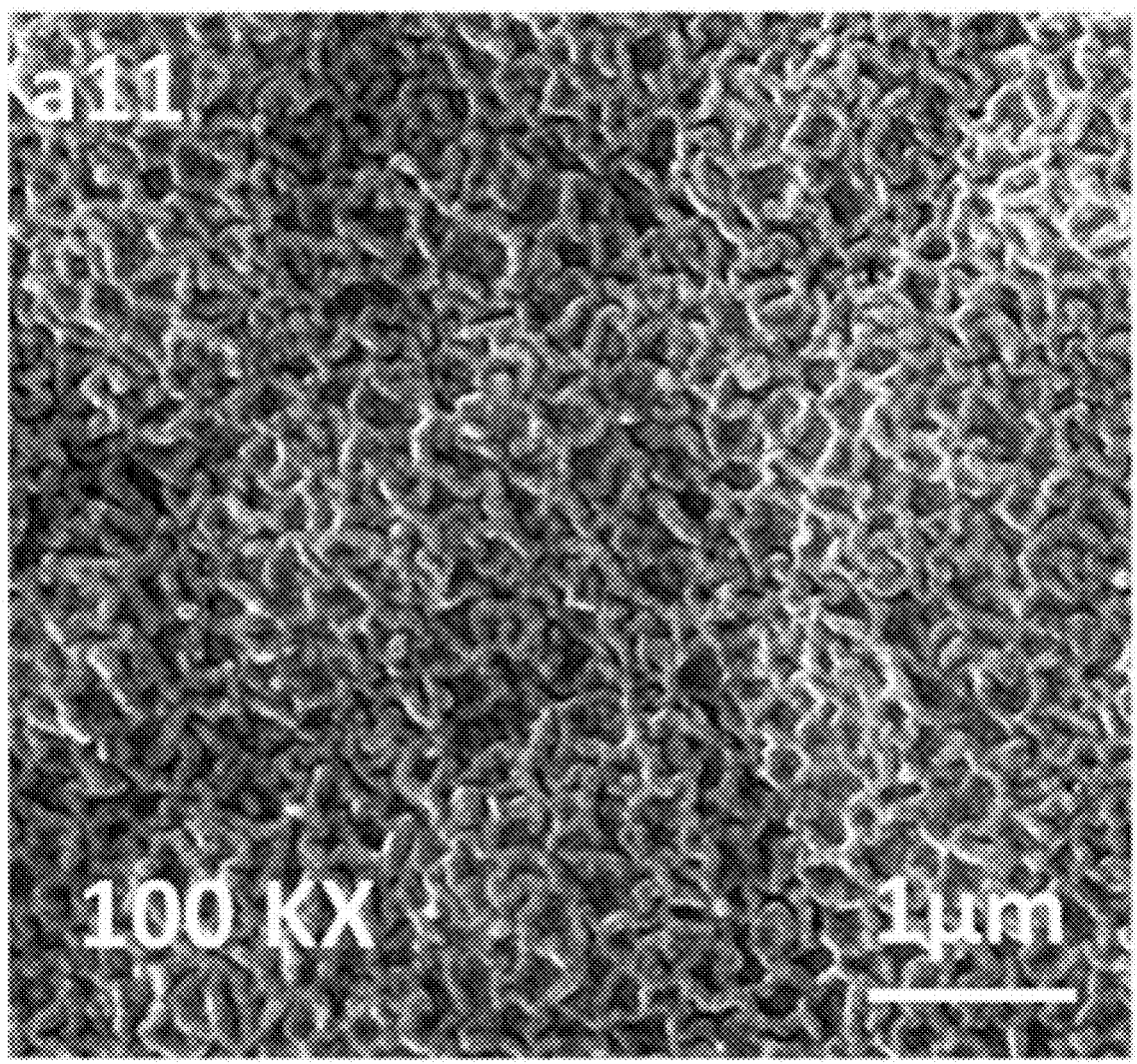
FIG. 2B is a high resolution (50K×) FESEM of the CoVO$_x$-20 film.
Figure 2C:
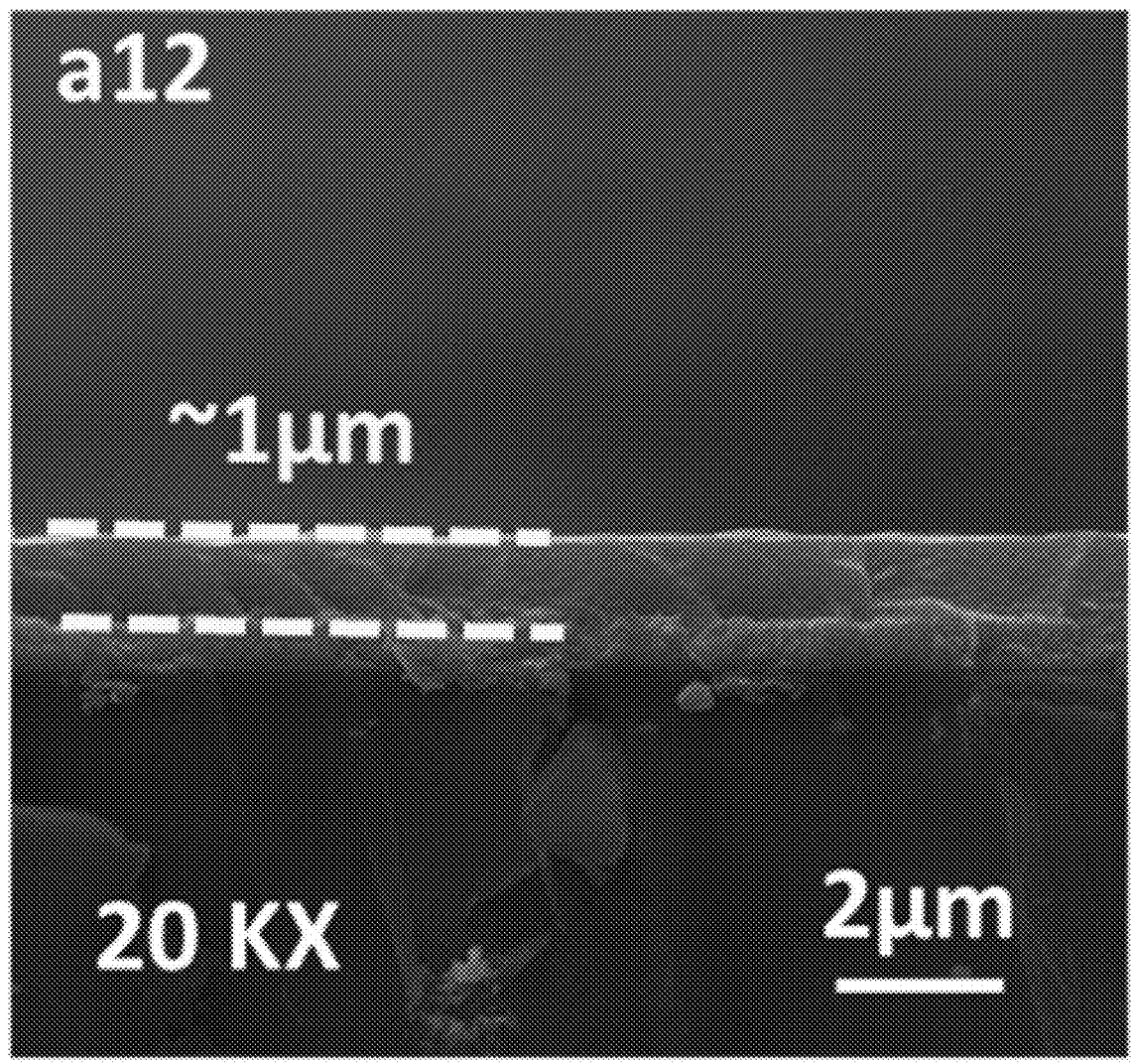
FIG. 2C is a cross-section FESEM of the CoVO$_x$-20 film on a FTO glass substrate.
Figure 2D:
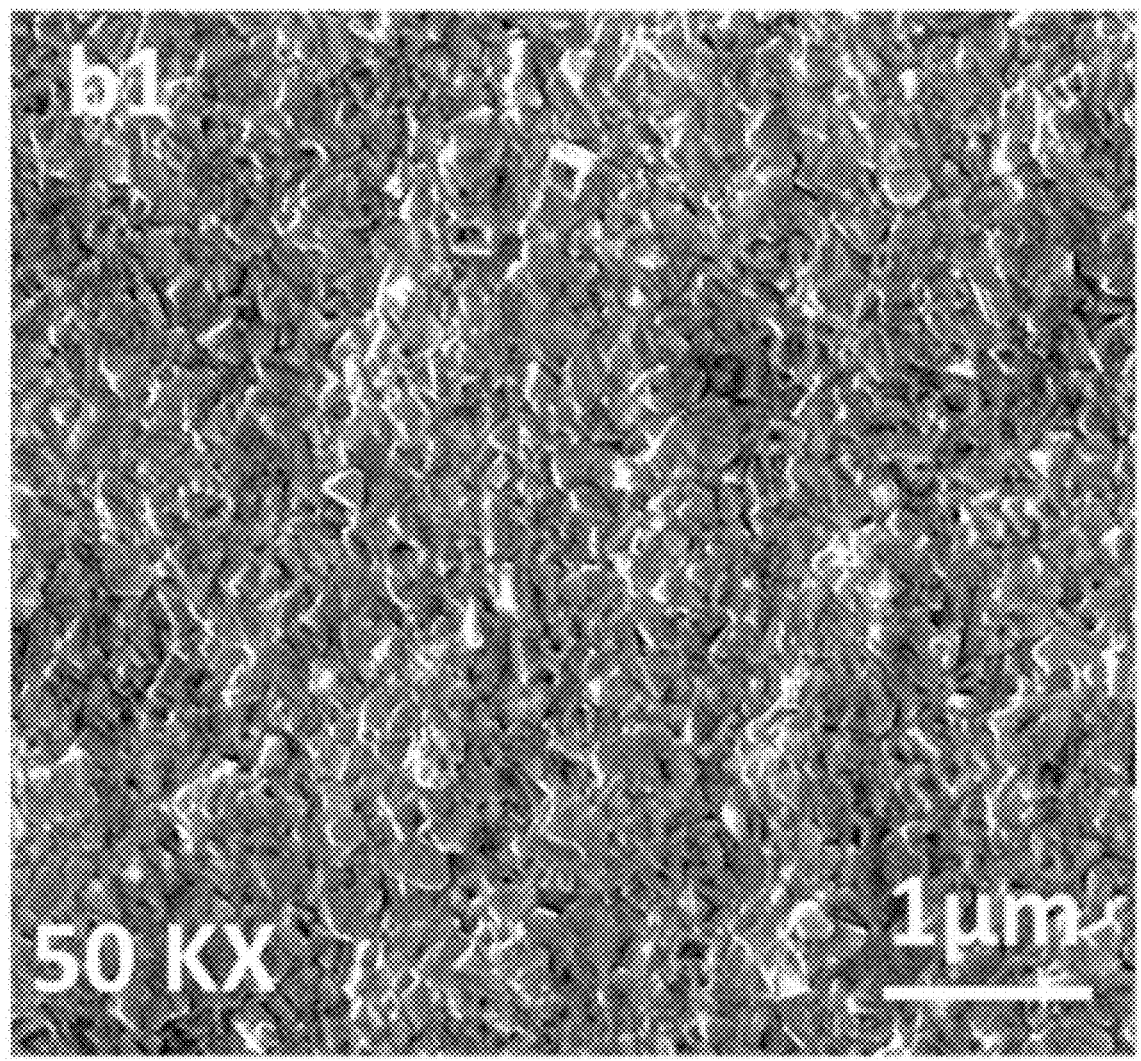
FIG. 2D is a large area, low resolution (10K×) FESEM of the CoVO$_x$-40 film.
Figure 2E:
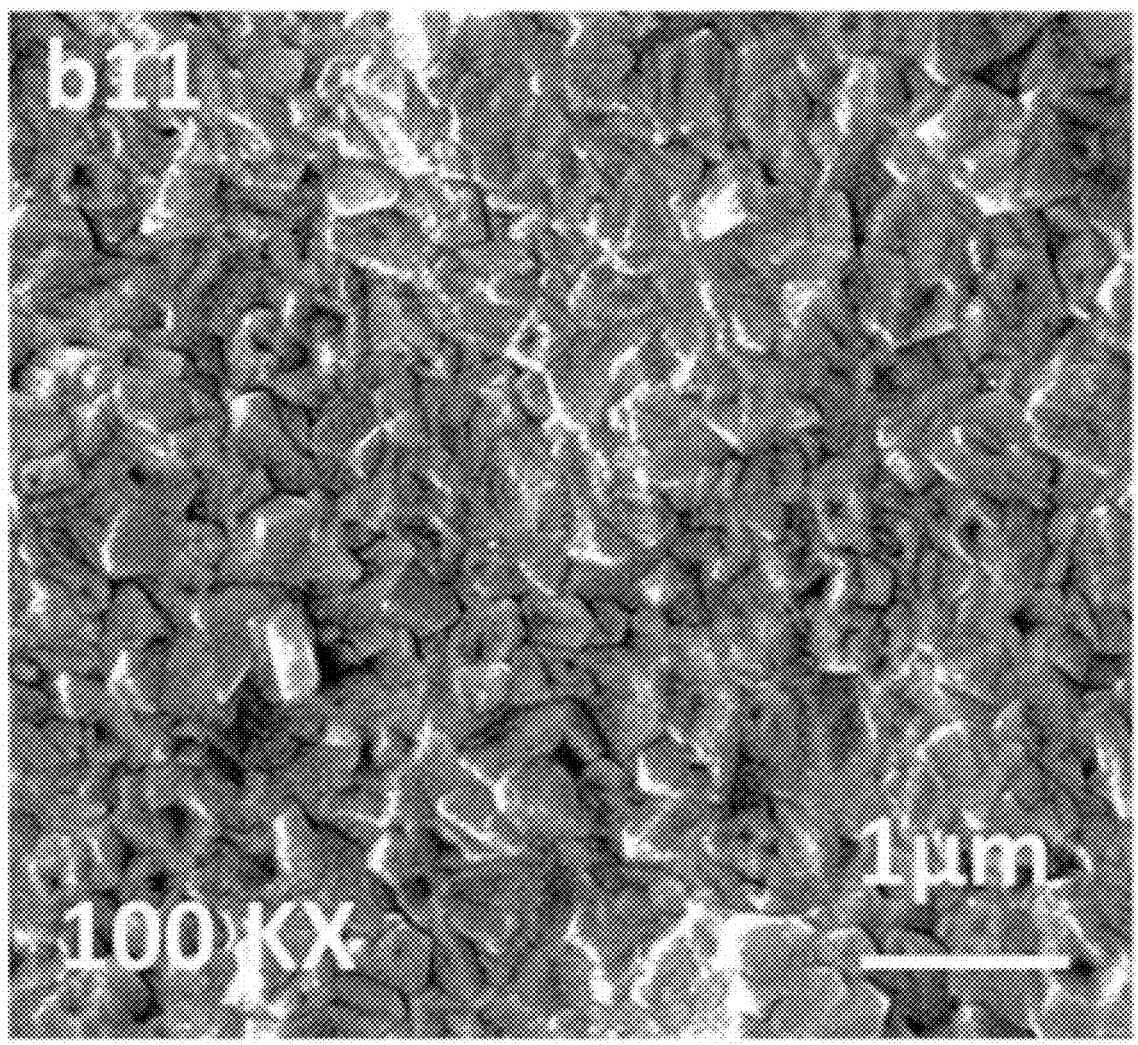
FIG. 2E is a high resolution (50K×) FESEM of the CoVO$_x$-40 film.
Figure 2F:
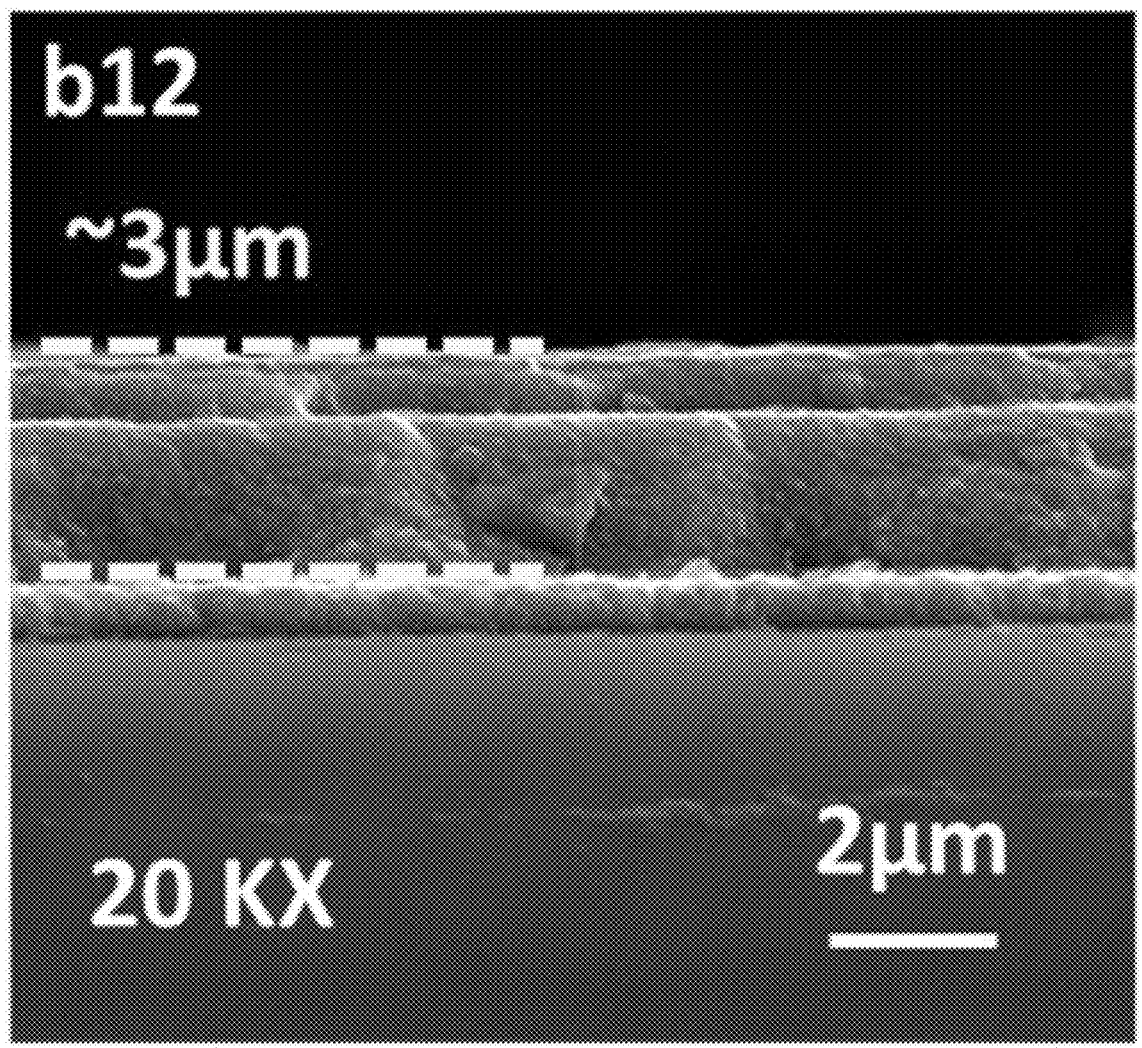
FIG. 2F is a cross-section FESEM of the CoVO$_x$-40 film on a FTO glass substrate.
Figure 2G:
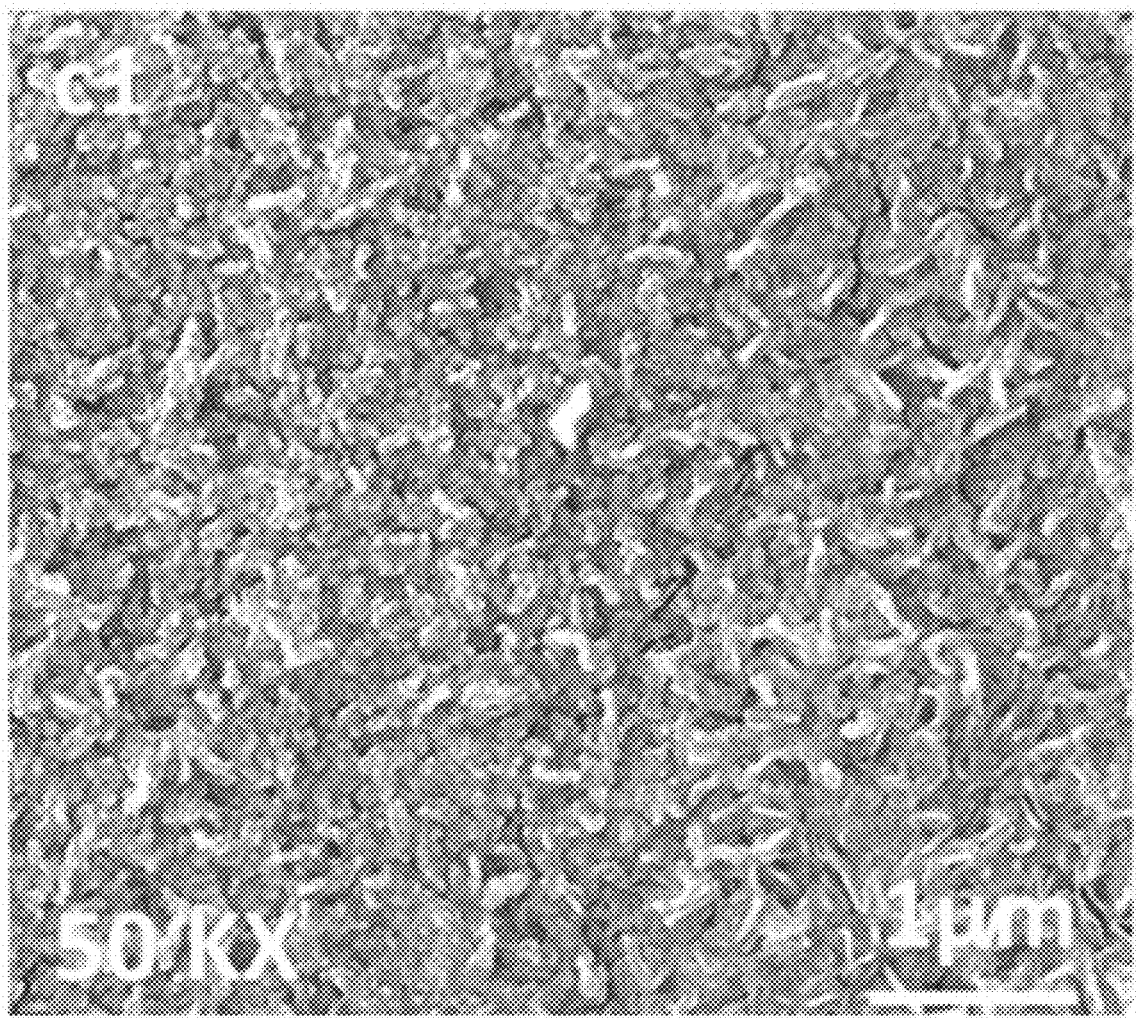
FIG. 2G is a large area, low resolution (10K×) FESEM of the CoVO$_x$-60 film.

The $CoVO_x$ layer may be in the form of a mesh, exfoliated surface, and/or blistered surface. FIG. 2B shows one such embodiment. The $CoVO_x$ layer may have pores or open spaces. In one embodiment, the $CoVO_x$ layer may have a porosity in a range of 10-70%, preferably 20-60%. In a related embodiment, the $CoVO_x$ layer may have a surface area per mass $CoVO_x$ layer of 80-350 $m^2/g$, preferably 100-250 $m^2/g$, even more preferably 120-220 $m^2/g$. In an alternative embodiment, the $CoVO_x$ layer may be in the form of particles, cylinders, boxes, spikes, flakes, plates, ellipsoids, toroids, stars, ribbons, discs, rods, granules, prisms, cones, flakes, platelets, sheets, or some other shape.

In one embodiment, the $CoVO_x$ layer is porous with a pore size in a range of 2-200 nm, preferably 2-100 nm, more preferably 3-50 nm, even more preferably 3-10 nm, or 2-10 nm, or 2-5 nm. In one embodiment, the $CoVO_x$ layer is monolithic, meaning that all parts of the layer are attached to one another as a single structure, as opposed to the layer being fragmented or in the form of particles. In one embodiment, the $CoVO_x$ layer is in the form of a mesh having strands or wires of $CoVO_x$ with diameters in a range of 100-250 nm, 120-220 nm, the strands or wires being joined together. FIG. 2B shows one such example.

In one embodiment, the pores of the $CoVO_x$ layer are monodisperse in diameter, having a coefficient of variation or relative standard deviation, expressed as a percentage and defined as the ratio of the pore diameter standard deviation ($\sigma$) to the pore diameter mean ($\mu$), multiplied by 100%, of less than 25%, preferably less than 10%, preferably less than 8%, preferably less than 6%, preferably less than 5%. In a preferred embodiment, the pores are monodisperse having a pore diameter distribution ranging from 80% of the average pore diameter to 120% of the average pore diameter, preferably 85-115%, preferably 90-110% of the average pore diameter. In another embodiment, the pore diameters are not monodisperse.

In one embodiment, the $CoVO_x$ layer is in contact with a substrate. In one embodiment, the substrate is a transparent conducting film selected from the group consisting of FTO (fluorine-doped tin oxide), ITO (indium tin oxide), AZO (aluminum-doped zinc oxide), GZO (gallium-doped zinc oxide), IZO (indium zinc oxide), IZTO (indium zinc tin oxide), IAZO (indium aluminum zinc oxide), IGZO (indium gallium zinc oxide), IGTO (indium gallium tin oxide), and ATO (antimony tin oxide). In other embodiments, transparent conducting polymers (such as PEDOT) or carbon nanotubes may be used with or in place of the compounds previously mentioned. In a preferred embodiment, the substrate is FTO. The transparent conducting film may have an average thickness of 1 μm-1 mm, preferably 10 μm-900 μm, more preferably 200 μm-800 μm, or about 600 μm. Alternatively, the transparent conducting film may have an average thickness of 500 nm-200 μm, preferably 1 μm-100 μm, more preferably 10 μm-50 μm. However, in some embodiments, the transparent conducting film may have an average thickness of less than 500 nm. For instance, the transparent conducting film may have an average thickness of 50-500 nm, 80-300 nm, or 100-250 nm. Preferably the transparent conducting film is attached to an additional support, such as a glass slide. However, in other embodiments, the substrate may be glass, quartz, ceramic, a metal, a composite material, or a polymeric material having temperature resistance at least up to the temperature of the substrate heating. Where the substrate comprises glass, the glass may be boro-aluminosilicate glass, sodium borosilicate glass, fused-silica glass, soda lime glass, or some other type of glass.

In a preferred embodiment, the substrate is substantially flat, smooth, and planar. Here, the substrate may have a thickness at any and every point on the substrate that varies by less than 4 nm, preferably by less than 3 nm, more preferably by less than 2 nm, even more preferably by less than 1 nm, less than 0.5 nm, or less than 0.3 nm than the average thickness. In one embodiment, the substrate is smooth and without pores, nanostructures, or microstructures. In a related embodiment, the substrate is rectangular and essentially smooth so that the substrate and a three dimensional convex hull of the substrate occupy essentially the same volume. In another related embodiment, the bulk volume of the substrate is the same as its actual volume, its actual volume being measured by fluid displacement or some other method.

In one embodiment, the substrate has a sheet resistance in a range of 1-40 $\Omega sq^{-1}$, preferably 2-20 $\Omega sq^{-1}$, more preferably 4-12 $\Omega sq^{-1}$, or about 8 $\Omega sq^{-1}$. Preferably, the $CoVO_x$ layer in contact with the substrate forms an electrically-conductive material with the transparent conducting film. An "electrically-conductive material" as defined here is a substance with an electrical resistivity of at most $10^{-6}$ $\Omega \cdot m$, preferably at most $10^{-7}$ $\Omega \cdot m$, more preferably at most $10^{-8}$ $\Omega \cdot m$ at a temperature of 20-25° C.

In one embodiment, the composite thin film electrode has an electrochemically active surface area (ECSA, or electroactive surface area) in a range of 12-22 $mF/cm^2$, preferably 13-20 $mF/cm^2$, more preferably 14-19 $mF/cm^2$, or about 17.6 $mF/cm^2$.

In one embodiment, the composite thin film electrode does not comprise a nickel foam, a gold foam, or some other metallic foam. In another embodiment, the composite thin film electrode does not comprise carbon. In one embodiment, the composite thin film electrode consists essentially of Co, V, O, and FTO coated glass.

According to a second aspect, the present disclosure relates to a method of making the composite thin film electrode of the first aspect. This method involves contacting an aerosol with a substrate to deposit the $CoVO_x$ layer to form the composite thin film electrode. As described here, "contacting an aerosol with a substrate" is considered to be synonymous with "contacting a substrate with an aerosol." Both phrases mean that the substrate is exposed to the aerosol, so that a portion of the suspended particles of the aerosol directly contact the substrate. Contacting may also be considered equivalent to "introducing" or "depositing," such as "depositing an aerosol on a substrate." In one embodiment, the contacting may be considered aerosol-assisted chemical vapor deposition (AACVD). In one embodiment, the method of making the composite thin film electrode may be considered a one-step method, as the formation of the CoVO$_x$ layer takes place immediately following and/or during the contacting of the aerosol with the substrate.

In one embodiment, the temperature of the substrate during the contacting is in a range of 425-550° C., preferably 450-525° C., more preferably 460-500° C., even more preferably 465-480° C., or about 475° C. In one embodiment, the temperature of the substrate during the contacting never reaches a temperature of greater than 550° C., preferably no greater than 500° C., more preferably no greater than 480° C.

The aerosol comprises a carrier gas, a cobalt complex, a vanadium complex, and a solvent. In one embodiment, the aerosol consists of, or consists essentially of, a carrier gas, a cobalt complex, a vanadium complex, and a solvent before the contacting, preferably immediately before the contacting. Preferably, the cobalt complex and vanadium complex are dissolved or dispersed in the solvent. In some embodiments, the cobalt complex and vanadium complex are dissolved in the same aerosol droplets. In other embodiments, some aerosol droplets may consist of the cobalt complex and solvent, and other aerosol droplets may consist of vanadium complex and solvent. Similarly, some aerosol droplets may consist of only solvent.

In one embodiment, the cobalt complex has an acetylacetone or acetylacetonate (acac) ligand, a trifluoroacetate (TFA) ligand, an acetate ligand (OAc), an isopropanol ($^i$PrOH) ligand, a tetrahydrofuran (THF) ligand, and/or a water (H$_2$O) ligand. In one embodiment, a molar ratio of acetylacetonate ligands to Co in the cobalt complex is in a range of 1:1-3:1, or about 2:1. In one embodiment, the cobalt complex is Co(II) acetylacetonate, or Co(acac)$_2$. In alternative embodiments, the cobalt complex may be bromopentaamminecobalt(III) bromide, caesium hexafluorocobaltate (IV), chloro(pyridine)cobaloxime, chloropentamminecobalt chloride, cis-dichlorobis(ethylenediamine)cobalt(III) chloride, trans-dichlorobis(ethylenediamine)cobalt(III) chloride, hexamminecobalt(III) chloride, nitropentaamminecobalt(III) chloride, tetracobalt dodecacarbonyl, tris(ethylenediamine)cobalt(III) chloride or some other cobalt complex or cobalt salt. In these alternative embodiments, the cobalt may have a II, III, or IV oxidation state.

In one embodiment, the vanadium complex has an acetylacetone or acetylacetonate (acac) ligand, a trifluoroacetate (TFA) ligand, an acetate ligand (OAc), an isopropanol ($^i$PrOH) ligand, a tetrahydrofuran (THF) ligand, and/or a water (H$_2$O) ligand. In one embodiment, the vanadium complex is V(III) acetylacetonate, or V(acac)$_2$. In one embodiment, a molar ratio of acetylacetone ligands to V in the vanadium complex is in a range of 1:1-4:1, 2:1-4:1, or about 3:1. In alternative embodiments, without limitation, the vanadium complex may be vanadium acetylacetonate, vanadium hexacarbonyl, vanadocene, vanadyl perchlorate, vanadyl acetylacetonate, ammonium metavanadate, vanadocene dichloride, or some other vanadium complex or vanadium salt, such as a vanadium halide. In these alternative embodiments, the vanadium may have a II, III, IV, or V oxidation state.

In alternative embodiments, the cobalt complex and/or the vanadium complex may not comprise one or more of the ligands acetylacetonate, trifluoroacetate, acetate, isopropanol, tetrahydrofuran, or water, and in other embodiments, one or more ligands may be substituted with other ligands, such as ethanol. In one embodiment, other ligands may be present in the cobalt complex and/or the vanadium complex, including but not limited to acetonitrile, methyl isocyanide, phosphine, bipyridine, nitrilotriacetic acid, and diimine.

In one embodiment, the cobalt complex and the solvent are present in the aerosol at a cobalt complex to solvent weight ratio of 1:1,000-1:5, preferably 1:800-1:50, more preferably 1:600-1:70, even more preferably 1:500-1:100, or about 1:365.

In one embodiment, the vanadium complex and the solvent are present in the aerosol at a vanadium complex to solvent weight ratio of 1:1,000-1:5, preferably 1:800-1:50, more preferably 1:600-1:70, even more preferably 1:500-1:100, or about 1:322.

In one embodiment, the cobalt complex and the vanadium complex are present in the aerosol at a cobalt to vanadium molar ratio of 1.0:1.2-1.5:1.0, preferably 1.0:1.2-1.4:1.0, or 1.0:1.2-1.2:1.0, or 1.0:1.2-1.1:1.0, more preferably 1.0:1.18-1.05:1.0, or about 1.0:1.16, or about 1.36:1.0, or about 1.16:1.0, or about 1:1.

In an alternative embodiment, rather than a cobalt complex and a vanadium complex existing as separate molecules, a single molecule comprising both vanadium and cobalt may be used in the aerosol.

In one embodiment, the carrier gas is N$_2$, He, compressed air, and/or Ar. Preferably the carrier gas is N$_2$.

In one embodiment, the solvent may be toluene, tetrahydrofuran, acetic acid, acetone, acetonitrile, butanol, dichloromethane, chloroform, chlorobenzene, dichloroethane, diethylene glycol, diethyl ether, dimethoxy-ethane, dimethyl-formamide, dimethyl sulfoxide, ethanol, ethyl acetate, ethylene glycol, heptane, hexamethylphosphoramide, hexamethylphosphorous triamide, methanol, methyl t-butyl ether, methylene chloride, pentane, cyclopentane, hexane, cyclohexane, benzene, dioxane, propanol, isopropyl alcohol, pyridine, triethyl amine, propandiol-1,2-carbonate, ethylene carbonate, propylene carbonate, nitrobenzene, formamide, γ-butyrolactone, benzyl alcohol, n-methyl-2-pyrrolidone, acetophenone, benzonitrile, valeronitrile, 3-methoxy propionitrile, dimethyl sulfate, aniline, n-methylformamide, phenol, 1,2-dichlorobenzene, tri-n-butyl phosphate, ethylene sulfate, benzenethiol, dimethyl acetamide, N,N-dimethylethaneamide, 3-methoxypropionnitrile, diglyme, cyclohexanol, bromobenzene, cyclohexanone, anisole, diethylformamide, 1-hexanethiol, ethyl chloroacetate, 1-dodecanthiol, di-n-butylether, dibutyl ether, acetic anhydride, m-xylene, o-xylene, p-xylene, morpholine, diisopropyl etheramine, diethyl carbonate, 1-pentandiol, n-butyl acetate, and/or 1-hexadecanthiol. In one embodiment, the solvent comprises pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pentane, hexane, decalin, dioxane, benzene, toluene, xylene, o-dichlorobenzene, diethyl ether, methyl t-butyl ether, methanol, ethanol, ethylene glycol, isopropanol, propanol, and/or n-butanol. In a preferred embodiment, the solvent is acetone, methanol, ethanol, and/or isopropanol. More preferably the solvent is methanol, and in another embodiment, the solvent consists essentially of methanol.

In one embodiment, the solvent may comprise water. The water used as a solvent or for other purposes may be tap water, distilled water, bidistilled water, deionized water, deionized distilled water, reverse osmosis water, and/or some other water. In one embodiment the water is bidistilled or treated with reverse osmosis to eliminate trace metals. Preferably the water is bidistilled, deionized, deionized distilled, or reverse osmosis water, and at 25° C. has a conductivity of less than 10 μS·cm$^{-1}$, preferably less than 1 μS·cm$^{-1}$; a resistivity of greater than 0.1 MA cm, preferably greater than 1 MA cm, more preferably greater than 10 MA cm; a total solid concentration of less than 5 mg/kg, preferably less than 1 mg/kg; and a total organic carbon concentration of less than 1000 μg/L, preferably less than 200 μg/L, more preferably less than 50 μg/L.

Preferably the solvent and the cobalt complex and/or vanadium complex are able to form an appropriately soluble solution that can be dispersed in the carrier gas as aerosol particles. For instance, the cobalt complex and/or vanadium complex may first be dissolved in a volume of solvent, and then pumped through a jet nozzle in order to create an aerosol mist. In other embodiments, the mist may be generated by a piezoelectric ultrasonic generator. Other nebulizers and nebulizer arrangements may also be used, such as concentric nebulizers, cross-flow nebulizers, entrained nebulizers, V-groove nebulizers, parallel path nebulizers, enhanced parallel path nebulizers, flow blurring nebulizers, and piezoelectric vibrating mesh nebulizers. In one embodiment, the mixtures of the cobalt complex and solvent, and the vanadium complex and solvent, are introduced as separate aerosols, for instance, produced by separate nozzles or nebulizers. Preferably, however, the cobalt complex and vanadium complex are mixed together in the same solvent prior to producing the aerosol.

In one embodiment, the aerosol may have a mass concentration M, of 10 μg/m$^3$-1,000 mg/m$^3$, preferably 50 μg/m$^3$-1,000 μg/m$^3$. In one embodiment, the aerosol may have a number concentration N, in a range of 10$^3$-10$^6$, preferably 10$^4$-10$^5$ cm$^3$. In other embodiments, the aerosol may have a number concentration of less than 10$^3$ or greater than 10$^6$. The aerosol particles or droplets may have an equivalent volume diameter ($d_e$) in a range of 20 nm-100 μm, preferably 0.5-70 μm, more preferably 1-50 μm, though in some embodiments, aerosol particles or droplets may have an average diameter of smaller than 0.2 μm or larger than 100 μm.

In an alternative embodiment, the oxidation state of the vanadium in the vanadium complex, and/or the cobalt in the cobalt complex, may be reduced or oxidized in the process of the deposition and formation of the CoVO$_x$ layer. In one embodiment, the aerosol and substrate do not comprise or contact hydrogen gas or a reducing agent during the contacting and/or depositing. In a related embodiment, the aerosol and substrate do not comprise or contact hydrogen gas or a reducing agent immediately prior to the contacting and/or depositing. In one embodiment, the reaction chamber where the depositing takes place is essentially free of hydrogen gas and a reducing agent immediately prior to the contacting. In one embodiment, an intermediate reducing agent is created during the contacting.

In a related embodiment, before the contacting and/or depositing, the aerosol consists essentially of the carrier gas, the solvent, the vanadium complex, and the cobalt complex, meaning that at least 99.9 wt %, preferably at least 99.99 wt %, or 100 wt % of the aerosol is carrier gas, solvent, vanadium complex, or cobalt complex, relative to a total weight of the aerosol.

In one embodiment, the aerosol is contacted with the substrate for a time period of 10-30 min, preferably 12-28 min, more preferably 15-25 min, even more preferably 17-23 min, or about 20 min.

In one embodiment, during the contacting of the aerosol, the carrier gas has a flow rate in a range of 20-250 cm$^3$/min, preferably 50-230 cm$^3$/min, more preferably 75-200 cm$^3$/min, even more preferably 100-150 cm$^3$/min, or about 120 cm$^3$/min. Preferably, the aerosol has a flow rate similar to the carrier gas, with the exception of the portion of aerosol that gets deposited on the substrate. In one embodiment, the aerosol may enter the chamber and the flow rate may be stopped, so that a portion of aerosol may settle on the substrate.

In one embodiment, the aerosol is contacted with the substrate in a reaction chamber. The flow of the carrier gas and aerosol may have a gas hourly space velocity in a range of 10-1,000 h$^{-1}$, preferably 50-500 h$^{-1}$, more preferably 100-130 h$^{-1}$.

The contacting and/or introducing may take place within a closed chamber or reactor, and the aerosol may be generated by dispersing a solution of the cobalt complex and/or vanadium complex and solvent. In one embodiment, this dispersing may be increased by fans, jets, or pumps. However, in another embodiment, an aerosol may be formed in a closed chamber with a substrate where the aerosol particles are allowed to diffuse towards or settle on the substrate. The substrate may have an area in a range of 0.5-4 cm$^2$, preferably 1.0-3 cm$^2$, more preferably 1.5-3 cm$^2$. In one embodiment, the closed chamber or reactor may have a length of 10-100 cm, preferably 12-30 cm, and a diameter or width of 1-10 cm, preferably 2-5 cm. In other embodiments, the closed chamber or reactor may have an interior volume of 0.2-100 L, preferably 0.3-25 L, more preferably 0.5-10 L. In one embodiment, the closed chamber or reactor may comprise a cylindrical glass vessel, such as a glass tube.

Being in a closed chamber, the interior pressure of the chamber (and thus the pressure of the aerosol) may be controlled. The pressure may be practically unlimited, but need not be an underpressure or an overpressure. Preferably the chamber and substrate are heated and held at a temperature prior to the contacting, so that the temperature may stabilize. The chamber and substrate may be heated for a time period of 5 min-1 hr, preferably 10-20 min prior to the contacting.

During the contacting of the aerosol, the CoVO$_x$ layer may form at a rate of 0.1 to 20, 0.2 to 18, 0.4 to 16, 0.5 to 14, 0.6 to 12, 0.7 to 10, 0.8 to 9, 3 to 15, 1.0 to 8, 1.5 to 5, or 2 to 3 nm/s, and/or at least 0.01, 0.05, 0.1, 0.2, 0.4, 0.5, 0.6, 0.8, 1.0, 1.5, 1.75, 2, 2.5, 3.33, 3.5, 4, 4.5, 5, 6.5, 7, 7.5, 7.75, 8, 8.25, 8.5, 8.75, 9, or 10 nm/s. In one embodiment, the layer may form at a rate in a range of 0.1-2.0 nm/s, 0.2-1.9 nm/s, 0.3-1.8 nm/s, 0.4-1.7 nm/s, 0.5-1.6 nm/s, 0.6-1.5 nm/s, 0.7-1.3 nm/s, or about 0.8 nm/s, or about 1.1 nm/s, or about 1.3 nm/s.

In one embodiment, the method of making the composite thin film electrode may further comprise a step of cooling the composite thin film electrode after the contacting. The composite thin film electrode may be cooled to a temperature between 10 to 45° C., 20 to 40° C., or 25 to 35° C. under an inert gas (such as N$_2$ or Ar) over a time period of 0.5 to 5 h, 0.75 to 4 h, 1 to 3 h, 1.25 to 2.5 h, or 1.5 to 2 h. In one embodiment, the composite thin film electrode may be left in the chamber and allowed to cool.

In one embodiment, the method of making the composite thin film electrode may further comprise a step of preparing the cobalt complex before the contacting. The cobalt complex may be synthesized by methods described herein, or by mixing Co(OAc)$_2$, Ti($^i$Pro)$_4$, and trifluoroacetic acid in THF to form a mixture. The mixture may be stirred for 0.5-6 h, preferably 1-3 h under an inert atmosphere of N$_2$ or Ar gas. The reaction mixture may then be dried to yield the cobalt complex, or alternatively, the reaction mixture may be dried, resuspended in THF, and then dried a second time to yield the cobalt complex.

Figure 10:
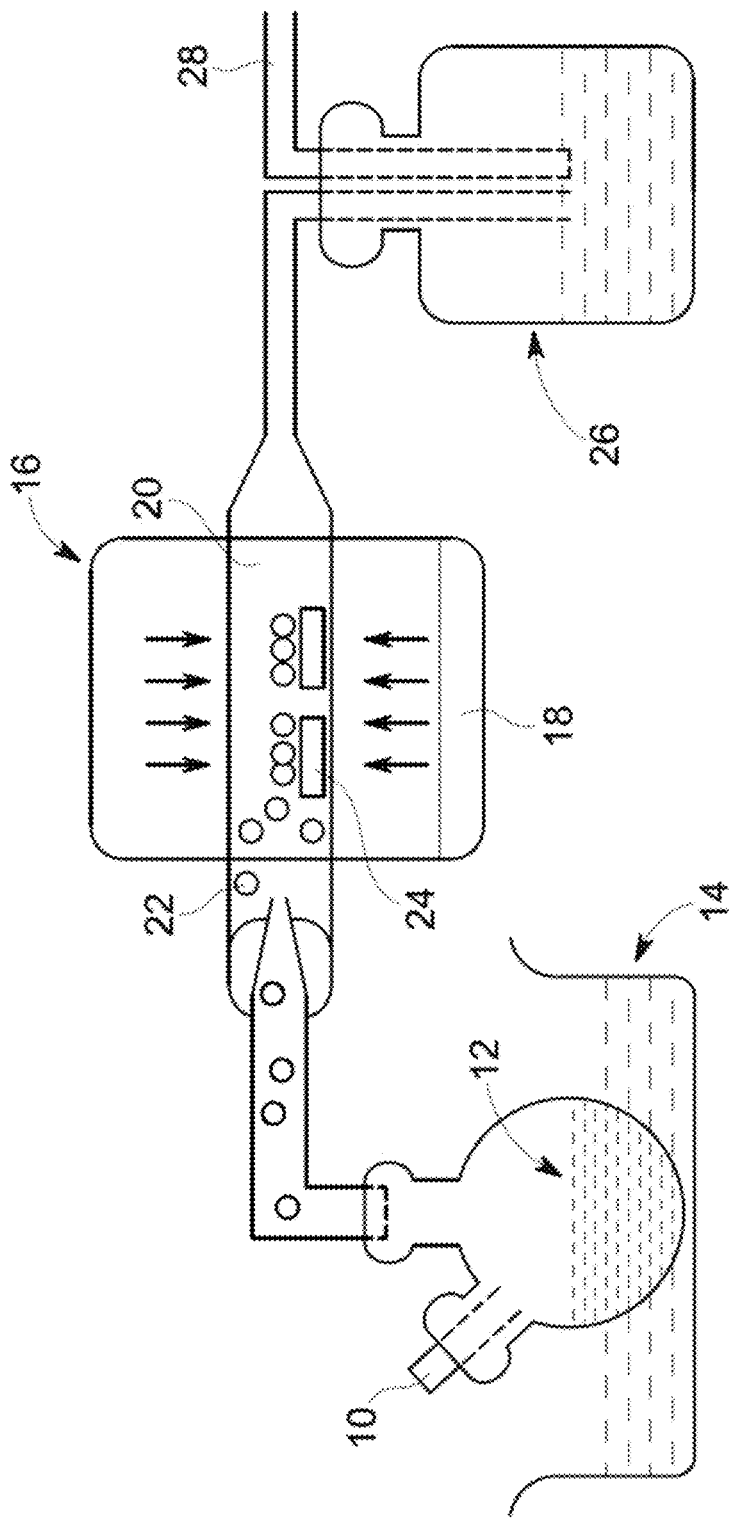
FIG. 10 is a schematic of the AACVD setup used for the synthesis of the CoVO$_x$ films.

An example AACVD setup is illustrated in FIG. 10. Here, a container of the Co—V precursor solution 12 (of solvent, cobalt complex, and vanadium complex) is connected to a carrier gas supply 10 and placed in an ultrasonic humidifier 14. Aerosol droplets 22 are transferred into a reactor tube 20. The reactor tube 20 is positioned in a tube furnace 16 with heating zones 18. The aerosol droplets 22 deposit on substrate slides 24 within the reactor tube 20. To support a flow of aerosol, the reactor tube 20 is also connected to a gas trap 26 and an exhaust line 28.

In an alternative embodiment, the composite thin film electrode may be formed by drop-drying or immobilizing $CoVO_x$ on a conductive substrate, such as onto an ITO film or a gold film, or on a carbon substrate. In an alternative embodiment, the composite thin film electrode, or some other electrode involving nanostructured $CoVO_x$, may be formed by lithography, more preferably nanolithography. Nanolithography techniques may be categorized as in series or parallel, mask or maskless/direct-write, top-down or bottom-up, beam or tip-based, resist-based or resist-less methods all of which are acceptable in terms of the present disclosure. Exemplary nanolithography techniques include, but are not limited to, optical lithography, photolithography, directed self-assembly, extreme ultraviolet lithography, electron beam lithography, electron beam direct write lithography, multiple electron beam lithography, nanoimprint lithography, step-and-flash imprint lithography, multiphoton lithography, scanning probe lithography, dip-pen nanolithography, thermochemical nanolithography, thermal scanning probe lithography, local oxidation nanolithography, molecular self-assembly, stencil lithography, X-ray lithography, laser printing of single nanoparticles, magnetolithography, nanosphere lithography, proton beam writing, charged particle lithography, ion projection lithography, electron projection lithography, neutral particle lithography and mixtures thereof. In another alternative embodiment, the composite thin film electrode may be formed by a sol-gel, solvothermal synthesis, or chemical vapor deposition method. In another alternative embodiment, the composite thin film electrode may be synthesized by two or more techniques, for instance, a nanolithography method and then an electrodeposition method.

In another alternative embodiment, a layer of $CoVO_x$ may be formed as an electrode, and then etched to form a nanostructured surface having an increased surface area appropriate for electrocatalysis.

According to a third aspect, the present disclosure relates to an electrochemical cell comprising the composite thin film electrode of the first aspect, a counter electrode, and an electrolyte solution in contact with both electrodes. As used herein, the composite thin film electrode may be considered the working electrode.

In one embodiment, the electrochemical cell is a vessel having an internal cavity for holding the electrolyte solution. The vessel may be cylindrical, cuboid, frustoconical, spherical, or some other shape. The vessel walls may comprise a material including, but not limited to, glass, polypropylene, polyvinyl chloride, polyethylene, and/or polytetrafluoroethylene, and the vessel walls may have a thickness of 0.1-3 cm, preferably 0.1-2 cm, more preferably 0.2-1.5 cm. The internal cavity may have a volume of 2 mL-100 mL, preferably 2.5 mL-50 mL, more preferably 3 mL-20 mL. In another embodiment, for instance, for small scale or benchtop water oxidation, the internal cavity may have a volume of 100 mL-50 L, preferably 1 L-20 L, more preferably 2 L-10 L. In another embodiment, for instance, for pilot plant water oxidation, the internal cavity may have a volume of 50 L-10,000 L, preferably 70 L-1,000 L, more preferably 80 L-2,000 L. In another embodiment, for instance, for industrial plant-scale water oxidation, the internal cavity may have a volume of 10,000 L-500,000 L, preferably 20,000 L-400,000 L, more preferably 40,000 L-100,000 L. In one embodiment, one or more electrochemical cells may be connected to each other in parallel and/or in series. In another embodiment, the electrolyte solution may be in contact with more than one working electrode and/or more than one counter electrode.

In one embodiment, the counter electrode comprises gold, platinum, or carbon. In a further embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures.

In another further embodiment, where the counter electrode comprises platinum, the counter electrode is in the form of rod, wire, or a coiled wire. Alternatively, the counter electrode may comprise some other electrically-conductive material such as platinum-iridium alloy, iridium, titanium, titanium alloy, stainless steel, gold, cobalt alloy and/or some other electrically-conductive material, where an "electrically-conductive material" as defined here is a substance with an electrical resistivity of at most $10^{-6}$ Ω·m, preferably at most $10^{-7}$ Ω·m, more preferably at most $10^{-8}$ Ω·m at a temperature of 20-25° C. In another alternative embodiment, the working electrode may not comprise FTO, but may comprise any of the previously mentioned metals.

In a preferred embodiment, the counter electrode has at least one outer surface comprising an essentially inert, electrically conducting chemical substance, such as platinum, gold, or carbon. In another embodiment, the counter electrode may comprise solid platinum, gold, or carbon. The form of the counter electrode may be generally relevant only in that it needs to supply sufficient current to the electrolyte solution to support the current required for electrochemical reaction of interest. The material of the counter electrode should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or might lead to undesirable contamination of either electrode.

In a further embodiment, where the counter electrode comprises platinum, the counter electrode may be in the form of a mesh. In one embodiment, the counter electrode in the form of a mesh may have a nominal aperture or pore diameter of 0.05-0.6 mm, preferably 0.1-0.5 mm, more preferably 0.2-0.4 mm, and/or a wire diameter of 0.01-0.5 mm, preferably 0.08-0.4 mm, more preferably 0.1-0.3 mm. In other embodiments, the counter electrode may be considered a gauze with a mesh number of 40-200, preferably 45-150, more preferably 50-100. In other embodiments, the counter electrode may be in the form of a perforated sheet or a sponge. In one embodiment, the counter electrode may be in the form of a mesh with one or more bulk dimensions (length, width, or thickness) as previously described for the composite thin film electrode.

In one embodiment, the counter electrode is in the form of a rod or wire. The rod or wire may have straight sides and a circular cross-section, similar to a cylinder. A ratio of the length of the rod or wire to its width may be 1,500:1-1:1, preferably 500:1-2:1, more preferably 300:1-3:1, even more preferably 200:1-4:1. The length of the rod or wire may be 0.5-50 cm, preferably 1-30 cm, more preferably 3-20 cm, and a long wire may be coiled or bent into a shape that allows the entire wire to fit into an electrochemical cell. The diameter of the rod or wire may be 0.5-20 mm, preferably 0.8-8 mm, more preferably 1-3 mm. In one embodiment, the diameter of the rod or wire may be smaller, for instance, with a diameter in a range of 0.1-1 mm, preferably 0.2-0.5 mm, or about 0.25 mm. In some embodiments, a rod may have an elongated cross-section, similar to a ribbon or strip of metal.

In one embodiment, the electrolyte solution comprises water and an inorganic base at a concentration of 0.1-1.0 M, preferably 0.2-0.8 M, more preferably 0.3-0.7 M, or about 0.5 M, though in some embodiments, the inorganic base may be present at a concentration of less than 0.1 M or greater than 1.0 M. For long term electrocatalysis, the organic base may be present at a concentration in a range of 0.05-0.5 M, preferably 0.08-0.2 M, more preferably about 0.1 M. The inorganic base may be KOH, LiOH, NaOH, $Be(OH)_2$, $Mg(OH)_2$, $Ca(OH)_2$, $Sr(OH)_2$, $Ba(OH)_2$, or some other inorganic base. Preferably the inorganic base is KOH. In an alternative embodiment, an organic base may be used, such as sodium acetate. In another alternative embodiment, an acid may be used instead of a base.

The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deionized distilled, or reverse osmosis water and at 25° C. has a conductivity at less than 10 $\mu S \cdot cm^{-1}$, preferably less than 1 $\mu S \cdot cm^{-1}$, a resistivity greater than 0.1 MA cm, preferably greater than 1 MA cm, more preferably greater than 10 MA cm, a total solid concentration less than 5 mg/kg, preferably less than 1 mg/kg, and a total organic carbon concentration less than 1000 $\mu g/L$, preferably less than 200 $\mu g/L$, more preferably less than 50 $\mu g/L$.

In one embodiment, the composite thin film electrode has a current density of 1.0-10 $mA/cm^2$, preferably 1.2-9.8 $mA/cm^2$, more preferably 2-9 $mA/cm^2$ when the electrodes are subjected to a bias potential of 1.45-1.55 V, preferably 1.47-1.53 V.

In one embodiment, composite thin film electrode has an overpotential in a range of 270-335 mV, preferably 280-325 mV, more preferably 290-320 mV, or about 310 mV at a current density of 9-11 $mA/cm^2$, 9.5-10.5 $mA/cm^2$.

Preferably, to maintain uniform concentrations and/or temperatures of the electrolyte solution, the electrolyte solution may be stirred or agitated during the step of the subjecting. The stirring or agitating may be done intermittently or continuously. This stirring or agitating may be by a magnetic stir bar, a stirring rod, an impeller, a shaking platform, a pump, a sonicator, a gas bubbler, or some other device. Preferably the stirring is done by an impeller or a magnetic stir bar.

Figure 5A:
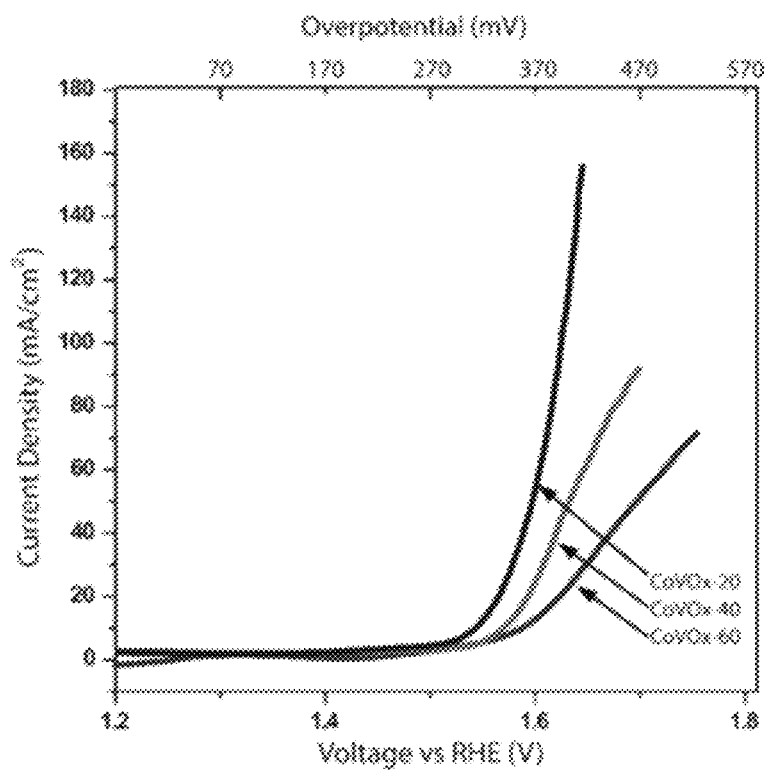
FIG. 5A is a graph of the forward potential sweeps for fabricated mixed oxide electrocatalytic materials in 0.5 M KOH electrolyte solution and at the scan rate of 10 mV s$^{-1}$.

In one embodiment, a composite thin film electrode may have a higher current density than a bare FTO, where the FTO electrode has essentially the same structure without the $CoVO_x$ layer. For example, the bare carbon electrode may comprise bare carbonized paper, and may be housed in a similar electrode assembly. Here, over the same range of electrical potential and in similar electrochemical cells, the composite thin film electrode may have a current density that is greater by a factor of 3-12, preferably 4-10, than the current density of the bare carbon electrode. This difference in current densities may lead to the composite thin film electrode supporting a faster chemical reaction rate in an electrochemical cell. In one embodiment, a composite thin film electrode formed from a shorter deposition time may have a greater current density than another composite thin film electrode formed with a longer deposition time, as illustrated in FIG. 5A. This may be due to the increased surface area and increased electroactive surface area of the composite thin film electrode formed with the shorter deposition time.

In one embodiment, the electrochemical cell further comprises a reference electrode in contact with the electrolyte solution. A reference electrode is an electrode which has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a silver chloride electrode (Ag/AgCl), while for long term electrocatalysis, a saturated calomel electrode (Hg/HgO) was used. However, in some embodiments, the electrochemical cell does not comprise a third electrode.

According to a fourth aspect, the present disclosure relates to a method for decomposing water into $H_2$ and $O_2$. This method involves the step of subjecting the electrodes of the electrochemical cell of the third aspect with a potential of 0.5-2.0 V, preferably 0.6-1.8 V, more preferably 0.8-1.7 V. Here, "the electrodes" refers to the composite thin film electrode and the counter electrode. However, in some embodiments, the electrodes may be subjected to a potential of less than 0.5 V or greater than 2.0 V.

Preferably the composite thin film electrode functions as the anode, receiving a positive potential to oxidize $OH^-$ into $O_2$ gas and $H_2O$, while the counter electrode functions as the cathode, receiving a negative potential to reduce water into $H_2$ gas and $OH^-$. This is summarized by the following reactions:

Cathode (reduction): $2H_2O_{(l)} + 2e^- \rightarrow H_{2(g)} + 2OH^-_{(aq)}$

Anode (oxidation): $4OH^-_{(aq)} \rightarrow O_{2(g)} + 2H_2O_{(l)} + 4e^-$

Overall reaction: $2H_2O_{(l)} \rightarrow 2H_{2(g)} + O_{2(g)}$

In another embodiment, the potentials may be switched, wherein the composite thin film electrode functions as the cathode and receives a negative potential, and the counter electrode functions as the anode and receives a positive potential. In an alternative embodiment, the electrodes may be subjected to an alternating current (AC) in which the anode and cathode roles are continually switched between the two electrodes.

In one embodiment, the potential may be applied to the electrodes by a battery, such as a battery comprising one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an AC adaptor, which is plugged into a standard building or home electric utility line. In one embodiment, the potentiostat may connect with a reference electrode in the electrolyte solution. Preferably the potentiostat is able to supply a relatively stable voltage or potential. For example, in one embodiment, the electrochemical cell is subjected to a voltage that does not vary by more than 5%, preferably by no more than 3%, preferably by no more than 1.5% of an average value throughout the subjecting. In another embodiment, the voltage may be modulated, such as being increased or decreased linearly, being applied as pulses, or being applied with an alternating current. Preferably, the composite thin film electrode may be considered the working electrode with the counter electrode being considered the auxiliary electrode. However, in some embodiments, the composite thin film electrode may be considered the auxiliary electrode with the counter electrode being considered the working electrode.

In one embodiment, the composite thin film electrode has a mass activity in range of 38-50 A/g, preferably 40-48 A/g, more preferably 42-46 A/g at $\eta=350$ mV. The specific potential value may be 1.45-1.60 V, more preferably 1.48-1.58 V, or 1.58 V vs. RHE.

In one embodiment, the method also involves the step of separately collecting $H_2$-enriched gas and $O_2$-enriched gas. In one embodiment, the space above each electrode may be confined to a vessel in order to receive or store the evolved gases from one or both electrodes. The collected gas may be further processed, filtered, or compressed. Preferably the $H_2$-enriched gas is collected above the cathode, and the $O_2$-enriched gas is collected above the anode. The electrochemical cell, or an attachment, may be shaped so that the headspace above the composite thin film electrode is kept separate from the headspace above the reference electrode. In one embodiment, the $H_2$-enriched gas and the $O_2$-enriched gas are not 100 vol % $H_2$ and 100 vol % $O_2$, respectively. For example, the enriched gases may also comprise $N_2$ from air, and water vapor and other dissolved gases from the electrolyte solution. The $H_2$-enriched gas may also comprise $O_2$ from air. The $H_2$-enriched gas may comprise greater than 20 vol % $H_2$, preferably greater than 40 vol % $H_2$, more preferably greater than 60 vol % $H_2$, even more preferably greater than 80 vol % $H_2$, relative to a total volume of the receptacle collecting the evolved $H_2$ gas. The $O_2$-enriched gas may comprise greater than 20 vol % $O_2$, preferably greater than 40 vol % $O_2$, more preferably greater than 60 vol % $O_2$, even more preferably greater than 80 vol % $O_2$, relative to a total volume of the receptacle collecting the evolved $O_2$ gas. In some embodiments, the evolved gases may be bubbled into a vessel comprising water or some other liquid, and higher concentrations of $O_2$ or $H_2$ may be collected. In one embodiment, evolved $O_2$ and $H_2$, or $H_2$-enriched gas and $O_2$-enriched gas, may be collected in the same vessel.

Several parameters for the method for decomposing water may be modified to lead to different reaction rates, yields, and other outcomes. These parameters include, but are not limited to, electrolyte type and concentration, pH, pressure, solution temperature, current, voltage, stirring rate, electrode surface area, texture and nanostructure of the $CoVO_x$ layer, substrate conductivity, and exposure time. A variable DC current may be applied at a fixed voltage, or a fixed DC current may be applied at a variable voltage. In some instances, AC current or pulsed current may be used. A person having ordinary skill in the art may be able to adjust these and other parameters, to achieve different desired nanostructures. In other embodiments, the electrochemical cell may be used for other electrochemical reactions or analyses.

In an alternative embodiment, the composite thin film electrode may be used in the field of batteries, fuel cells, photochemical cells, water splitting cells, electronics, water purification, hydrogen sensors, semiconductors (such as field effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis. Similarly, in one embodiment, the composite thin film electrode may be coated with another material. For example, the composite thin film electrode may be coated with a layer of gold. A gold-coated composite thin film electrode may then be used for analyte detection using surface enhanced Raman scattering (SERS).

The examples below are intended to further illustrate protocols for preparing, characterizing the $CoVO_x$ films, and uses thereof, and are not intended to limit the scope of the claims.

EXAMPLE 1

Film Electrode Fabrication

The film electrode fabrication was achieved through AACVD method. All chemicals were obtained from Sigma Aldrich and were used as received: Cobalt(II) acetylacetonate ($Co(acac)_2$), vanadium(III) acetylacetonate ($V(acac)_3$), methanol (99.9%), and nitrogen gas (99.99%). The synthesis of Co:V oxide films in a 1:1 stoichiometry was achieved by dissolving 500 mg, (0.19 mmol) of $Co(acac)_2$ and 500 mg (0.14 mmol) $V(acac)_3$ in methanol (20 mL) in a schlenk tube connected with a vacuum line. The transparent dark brown solution was stirred for 30 min and solvent was evaporated under reduced pressure to give a brown solid which was re-dissolved in methanol (10 mL). The transparent solution was further stirred for 10 min and was used in AACVD for films deposition. Prior to the deposition, an FTO glass substrate was cut to an area of $1.0\times2.0$ $cm^2$ (W×L) and sequentially washed using soapy water, acetone, and ethanol. The substrate was then laid horizontally inside the reactor tube and heated up to the deposition temperature of 475° C. for 10 min to stabilize the temperature before carrying out the deposition. An aerosol mist of the precursor solution was generated using a piezoelectric ultrasonic humidifier. Nitrogen gas was used as a carrier gas to transport the aerosol to the heated substrate at a rate of 120 $cm^3$/min. The reactor exhaust was vented into a fume hood. When the precursor solution and associated aerosol mist had been completely emptied from the flask, the coated substrate was cooled under a continuous flow of $N_2$ gas. The coated substrate was not removed from the reactor until it reached a temperature of below 40° C.

The deposition experiments were carried out for different time periods such as 20 min, 40 min, and 60 min, and the resultant film electrodes are named as $CoVO_x$-20, $CoVO_x$-40, and $CoVO_x$-60, respectively.

EXAMPLE 2

Film Characterization

The structural properties of cobalt vanadium oxide thin films were analyzed by recording X-ray diffraction (XRD) patterns using a PANanalytical, X'PertHighScore® diffractometer with primary monochromatic high intensity $CuK_\alpha$ ($\lambda$=1.5418 Å) radiation. The surface micrographs of the films were examined using a Lyra 3® Tescan, field emission gun (FEG)-SEM at an accelerating voltage of 5 kV and a working distance of 10 mm. The Co/V atomic ratios were determined from Energy dispersive X-ray (EDX, INCA Energy 200®, Oxford Inst.) spectrometer. X-ray photoelectron spectroscopy (XPS) was done using an ULVAC-PHI Quantera II® with a 32-channel Spherical Capacitor Energy Analyzer under vacuum ($1\times10^{-6}$ Pa) using monochromatic Al K$\alpha$ radiation (1486.8 eV) with a natural energy width of 680 meV. The carbonaceous C is line (284.6 eV) was used as a reference to calibrate the binding energies.

EXAMPLE 3

Electrochemical Measurements

All the electrochemical measurements were performed on a computer-controlled AUTOLAB® potentiostat employing $CoVO_x$ thin film electrodes as the working electrode. A Pt wire shaped into a spiral (thickness=0.25 mm) was used as the counter electrode and saturated silver-silver chloride (Ag/AgCl in saturated solution of KCl) was used as the reference electrode. For long-term electrocatalysis, a saturated calomel electrode (Hg/HgO) reference electrode was employed in 0.1 M KOH solutions. However, all the potentials are referred to reversible hydrogen electrode (RHE) following the Nernst equation:

$$E_{RHE}=E_{REF}+E_{0\ REF}+0.059(pH).$$

Before placing into the electrochemical cell, the platinum wire was cleaned by immersing in a 20% solution of $HNO_3$ for a few minutes following washing with MilliQ® water. All the glassware and electrochemical cell were cleaned by boiling in a 1:3 mixture of $H_2SO_4$ and $HNO_3$ followed by boiling in water. The electrochemical cell was then carefully rinsed with acetone and dried by keeping in oven at 100° C. for 1 hour as described previously. See Yu, F.; Li, F.; Zhang, B.; Li, H.; Sun, L., Efficient Electrocatalytic Water Oxidation by a Copper Oxide Thin Film in Borate Buffer. *ACS Catalysis* 2015, 5 (2), 627-630, incorporated herein by reference in its entirety. Electrochemical investigations such as cyclic voltammetry, EIS and controlled potential bulk electrolysis experiments were performed in 0.5 M KOH electrolyte solution having a pH≈13.6. Water used to make all the solutions for electrochemical studies was distilled and deionized using a MilliQ® system from Millipore. Linear sweep voltammetry was used in order to find the overpotentials and current density profiles of the films during water oxidation reaction whereas the charge transfer resistances were determined by EIS. The details of measurement parameters such as the calculation of mass activity and the electrochemically active surface area (ECSA) are provided herein.

EXAMPLE 4

Scheme of Synthesis with Structural and Morphological Analysis:

The schematic description for the fabrication of mixed metal oxide films of cobalt and vanadium is provided in FIG. 10. The fabrication was performed using an AACVD protocol, the operation of which is critically related to the solubility of the precursors in common organic solvents. Moreover, the precursor solutions must be homogenous, clear, and precipitation free, especially in the case of mixed metal oxides. Therefore, for the fabrication of Co—V films, acetylacetonate precursors of both metals were chosen, which are commercially available and known for their higher solubility in methanol without using any solubility enhancing reagents such as trifluoroacetic acid. With this selection of same ligand system for both metals, the possibility of exchange reactions was ruled out, which may cause solution inhomogeneity with the passage of time. This results in a superior particle-particle or particle-conducting layer connection during direct deposition to force well adhered films, possibly on a variety of available substrates. The deposition of these films was done directly on the FTO electrodes at a relatively low temperature of 475° C. without any need of further immobilization as in the case of hydrothermal synthesis, colloidal approaches, or other wet chemistry protocols. See Tan, C.; Zhang, H., Wet-chemical synthesis and applications of non-layer structured two-dimensional nanomaterials. *Nature Communications* 2015, 6, 7873, incorporated herein by reference in its entirety. Three different films were prepared at deposition times of 20, 40, and 60 minutes, and this time is multiple orders lesser than wet chemistry protocols often needing 24-48 hours for the reaction to complete. These films were correspondingly named $CoVO_x$-20, $CoVO_x$-40, and $CoVO_x$-60.

Figure 2H:
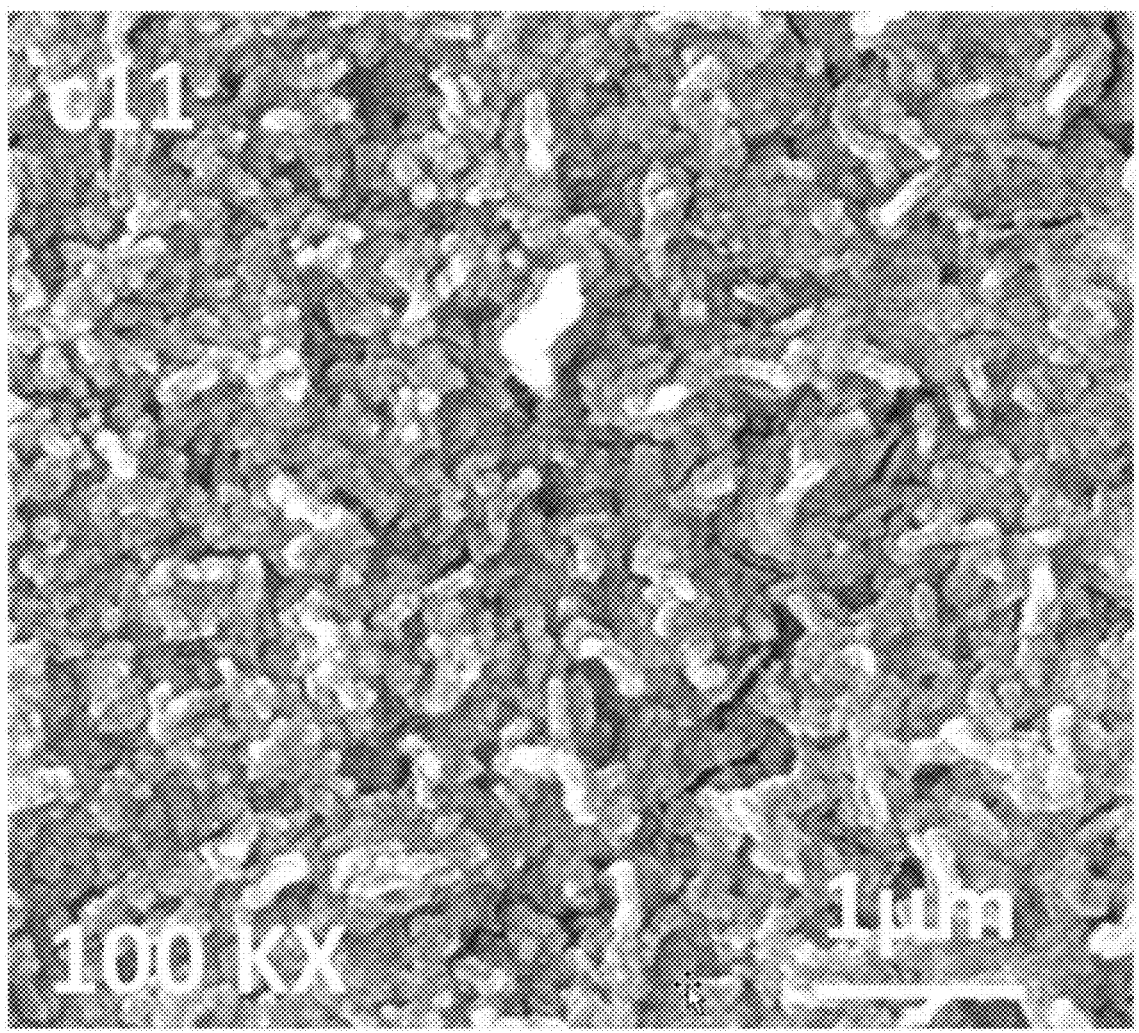
FIG. 2H is a high resolution (50K×) FESEM of the CoVO$_x$-60 film.
Figure 2I:
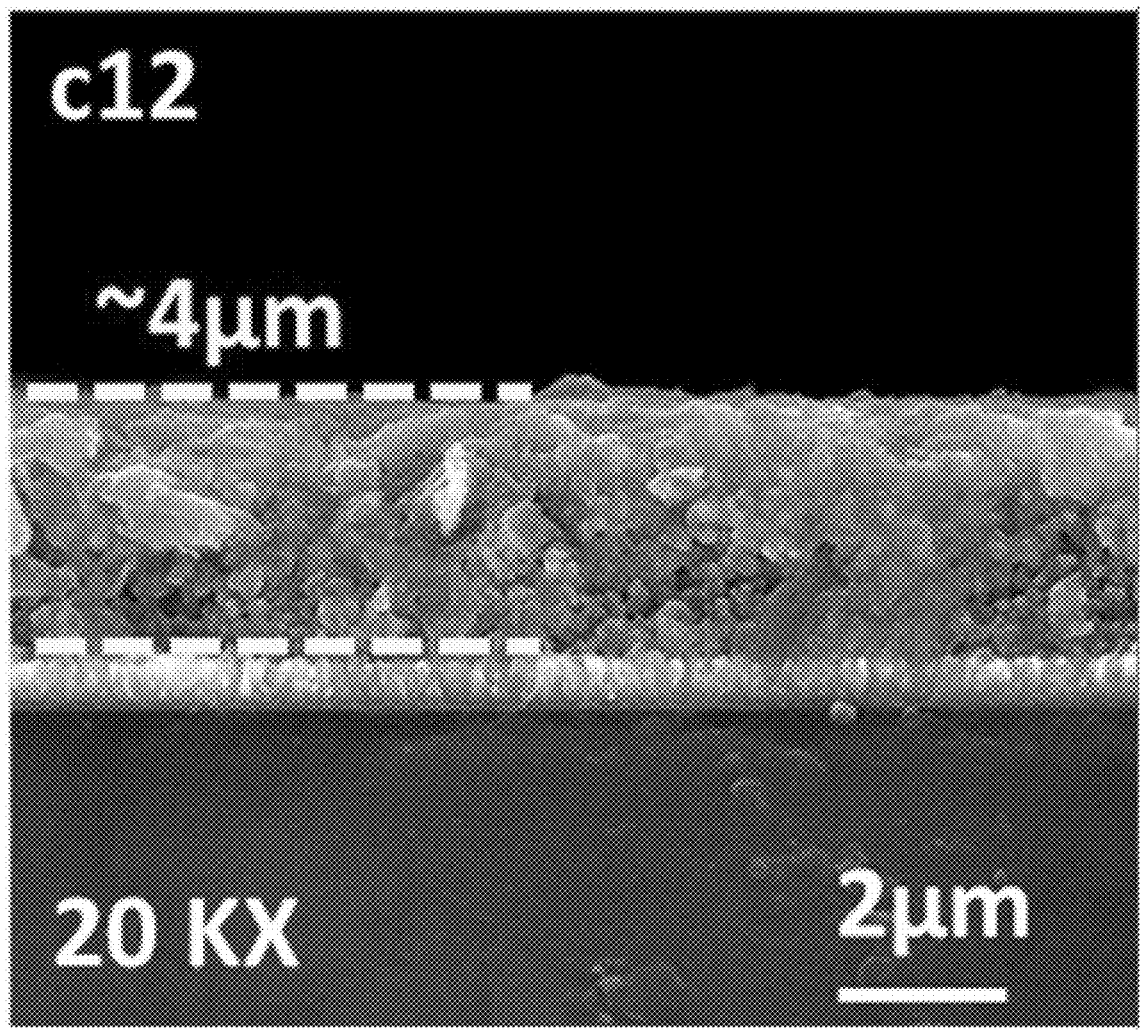
FIG. 2I is a cross-section FESEM of the CoVO$_x$-60 film on a FTO glass substrate.

Surface morphology and the corresponding cross sectional images of the prepared films were investigated by FE-SEM, and the data is provided in FIGS. 2A-2I. Large area analysis of all the films (FIGS. 2A, 2D, 2G) shows a uniform and homogenous surface character, even for the extended deposition time up to 60 min. However, the morphology of the surface becomes more varied as the time of deposition increases. It is clearly seen that $CoVO_x$-20 film attains a spongy character with growth in all dimensions (FIG. 2A), which appeared to be a network of interwoven nanofibers stacked over each other at a higher resolution scan (FIG. 2B). The pore size in this case was found to be 3-4 nm with extremely homogenous distribution. Such a porous and high surface area structure provides a higher access of the active sites to the reacting substrates, which is extremely useful for the electrocatalytic reactions. In $CoVO_x$-40 film, the networked surface structure has transformed into nanoflakes (FIG. 2E) which, with further growth in case of $CoVO_x$-60, has changed into a thick continuous film with flakes protruding out of it (FIG. 2H). However, the imprints of networked $CoVO_x$-20 structure remained visible in other two films, showing a coalesced growth. It is observed that the porous womb-like structure self-propagated into dense thick layer of $CoVO_x$. The cross sectional image of $CoVO_x$-20 shows that a 1 µm thick film (FIG. 2C) has already been fabricated in just 20 min, which was then grown into 3 µm and 4 µm thickness for $CoVO_x$-40 (FIG. 2F) and $CoVO_x$-60 (FIG. 2I) respectively. However, this growth pattern has not disrupted the homogeneity of the formed films as shown by continuous thickness of all the cross sections.

Figure 11:
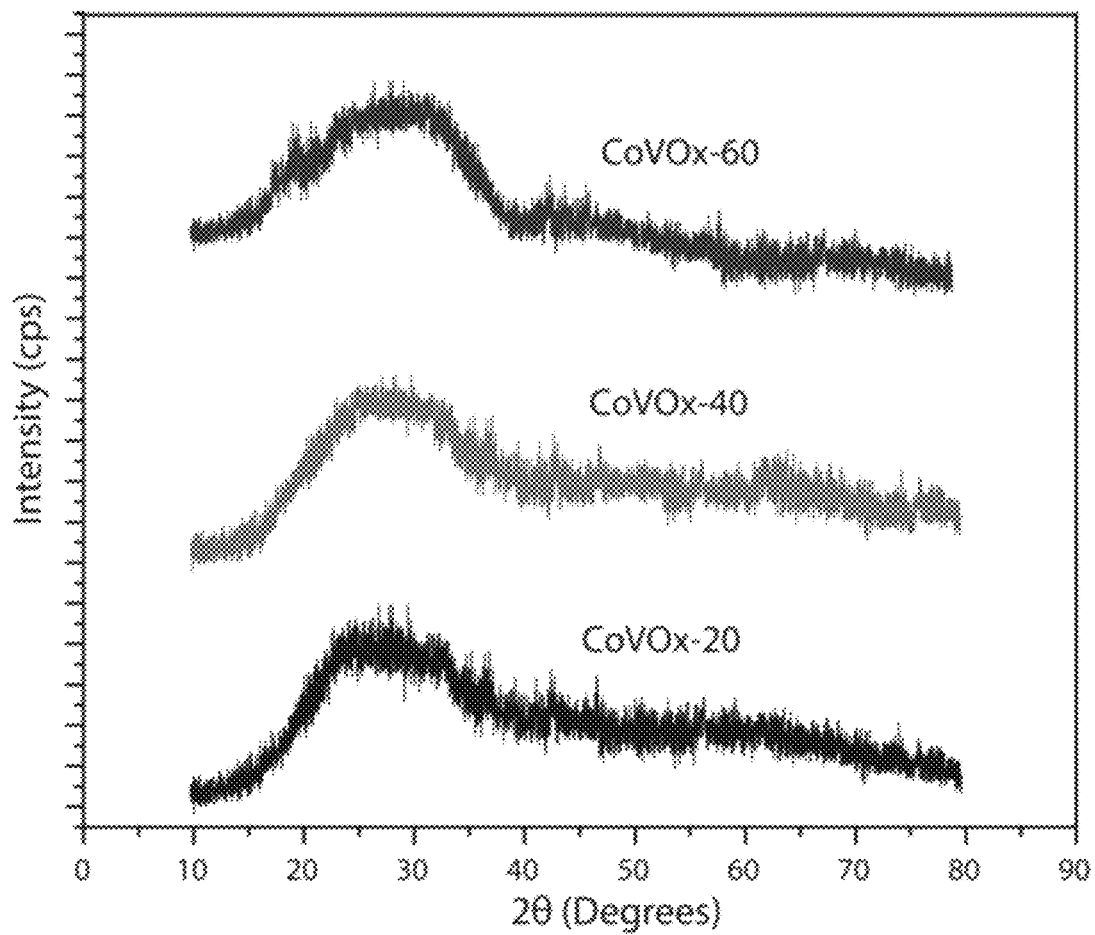
FIG. 11 shows XRD patterns of Co—V mixed oxide film electrodes, CoVO$_x$-20, CoVO$_x$-40, and CoVO$_x$-60 fabricated in 20, 40, and 60 min of deposition time at 475° C.
Figure 12A:
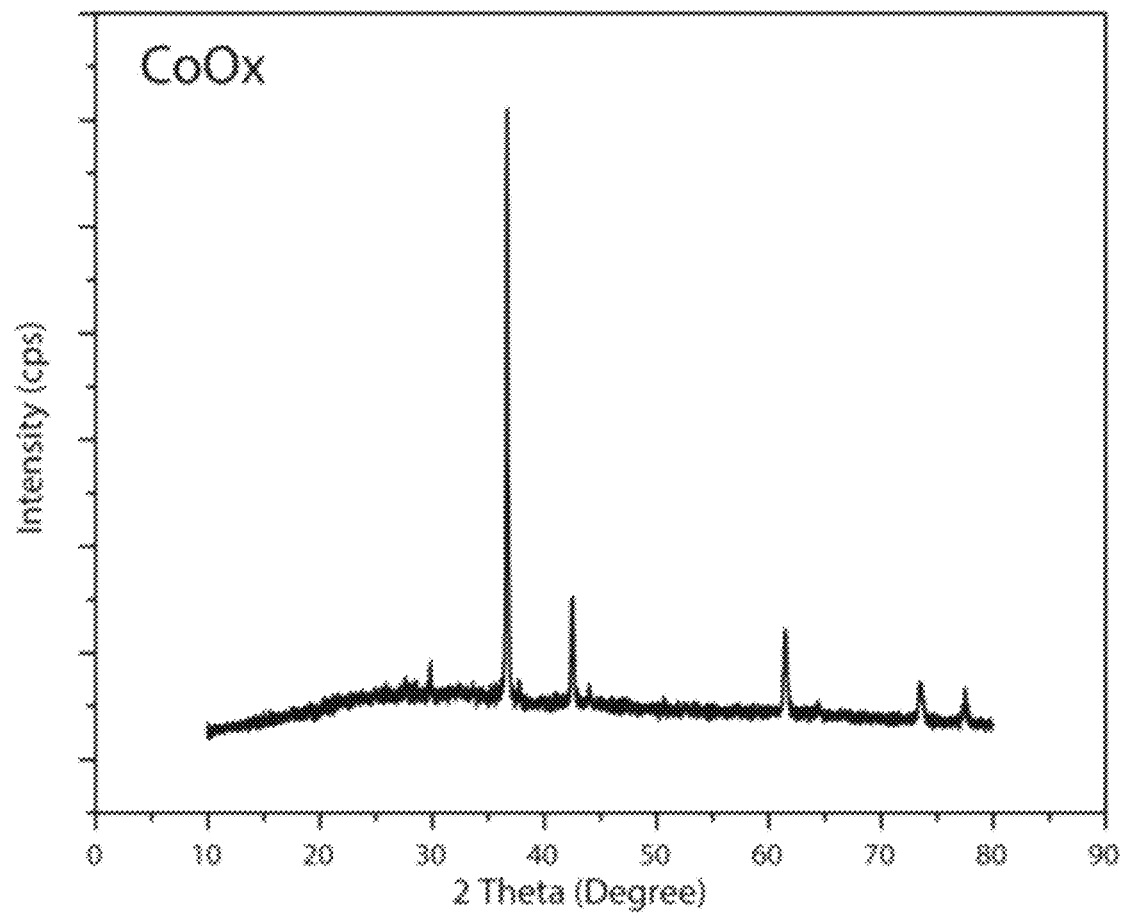
FIG. 12A shows XRD patterns from films produced using the Co(acac)$_2$ precursor and without the V(acac)$_3$ precursor.
Figure 12B:
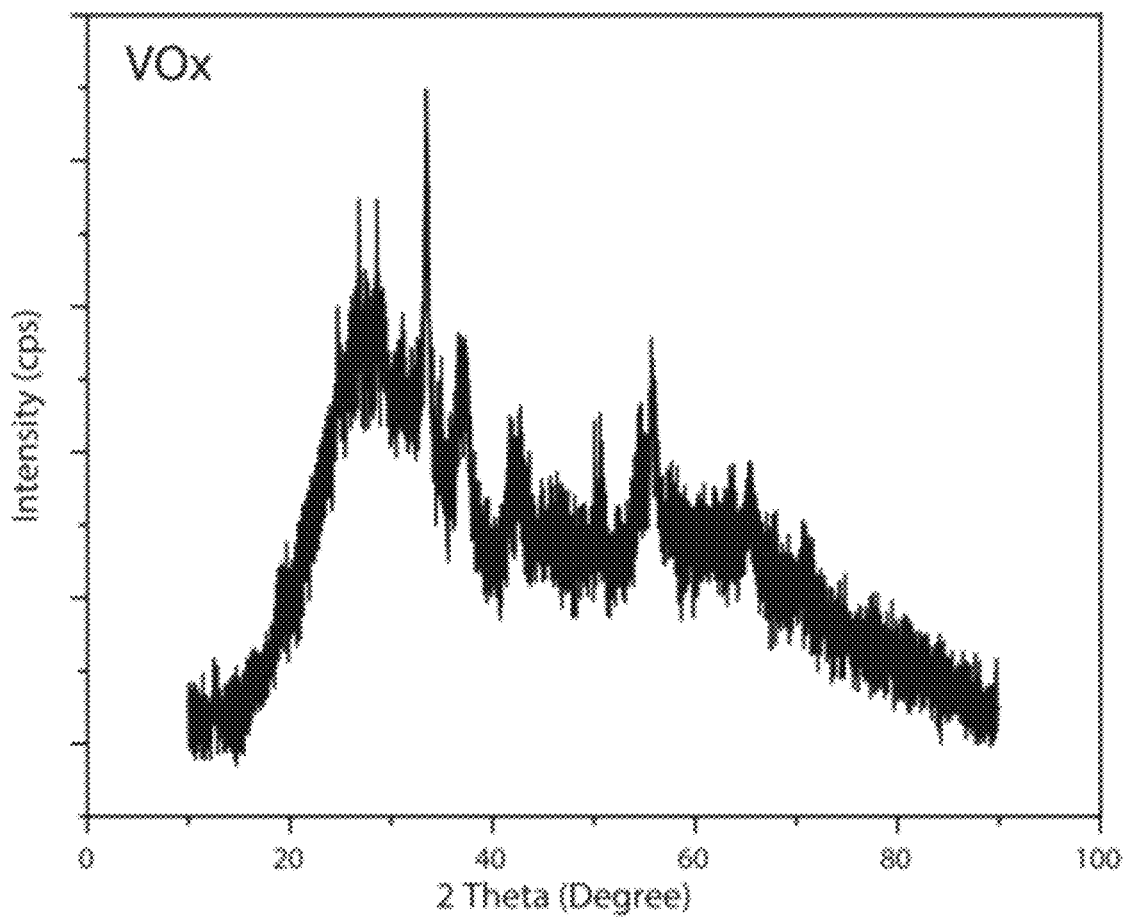
FIG. 12B shows XRD patterns from films produced using the V(acac)$_3$ precursor and without the Co(acac)$_2$ precursor.

FIG. 11 demonstrates the XRD analysis of all $CoVO_x$ films prepared on FTO substrates at 475° C. The diffractogram reveals the amorphous nature of all the films even for the extended deposition time of 60 min. While the FTO substrate is highly crystalline in nature, its crystalline peaks are suppressed due to the non-crystalline profile of the prepared materials in all cases. To confirm the amorphous nature of $CoVO_x$, the pristine films of $CoO_x$ and $VO_x$ were also prepared under similar AACVD conditions using the individual precursors (i.e., $Co(acac)_2$ and $V(acac)_3$) and their diffraction patterns are shown in FIGS. 12A and 12B. These patterns show crystalline peaks of individual $CoO_x$ and $VO_x$ in pure form. It is an indication that the mixed films thus prepared are free of crystalline impurities of Co oxide and V oxide and that only the mixed material is amorphous in nature. At the same time, this is quite in accordance with the previous reports of amorphous Co—V mixed oxide materials prepared by hydrothermal methods and co-precipitation technique, although the materials were synthesized at more extreme conditions of pressure or temperature. See Liardet et al. (2018); and Liu et al. (2018). Thus, it may be concluded that the inherent nature of mixed Co—V oxides is to be amorphous, although the synthetic schemes in previous reports claim otherwise.

Figures 3A, 3B:
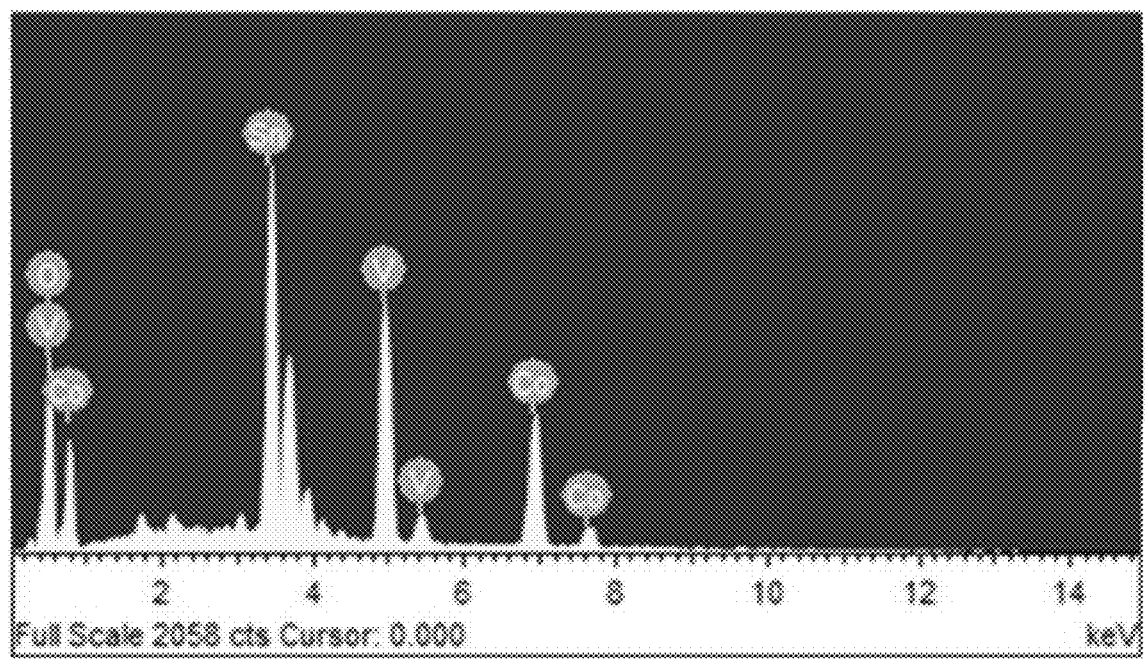
FIG. 3A is EDX spectra of the CoVO$_x$-20 film.
FIG. 3B is the atomicity recorded of the CoVO$_x$-20 film of FIG. 3A.
Figure 3C:
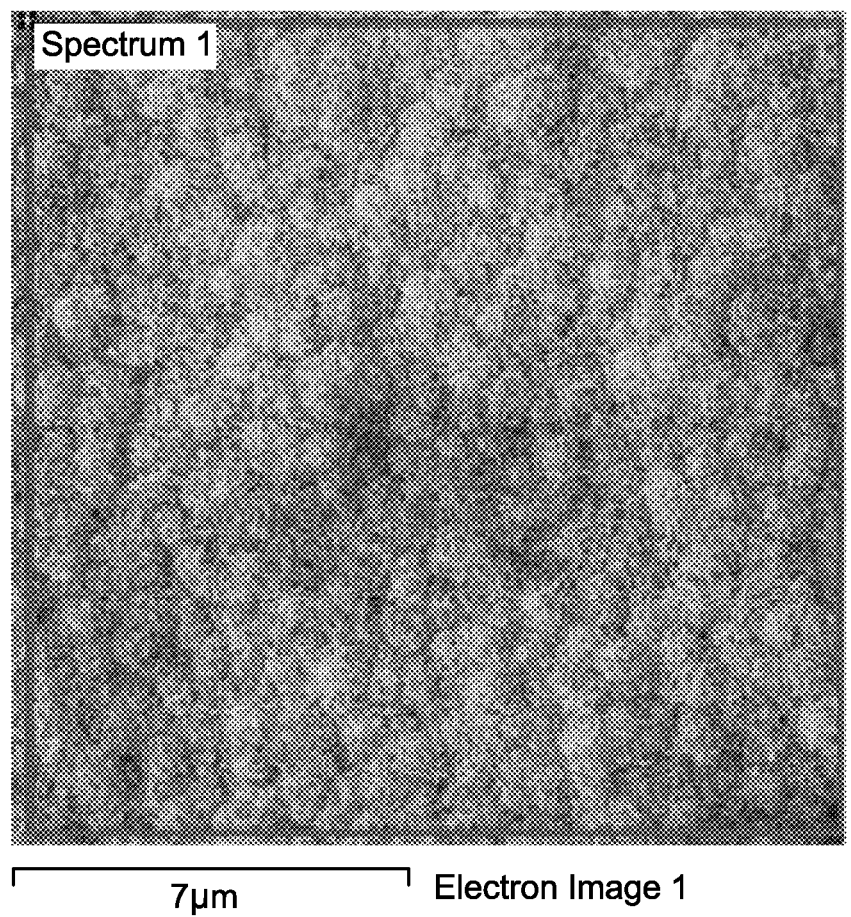
FIG. 3C is an FESEM image of the analysis area of the CoVO$_x$-20 film used for FIG. 3A.
Figures 3D, 3E:
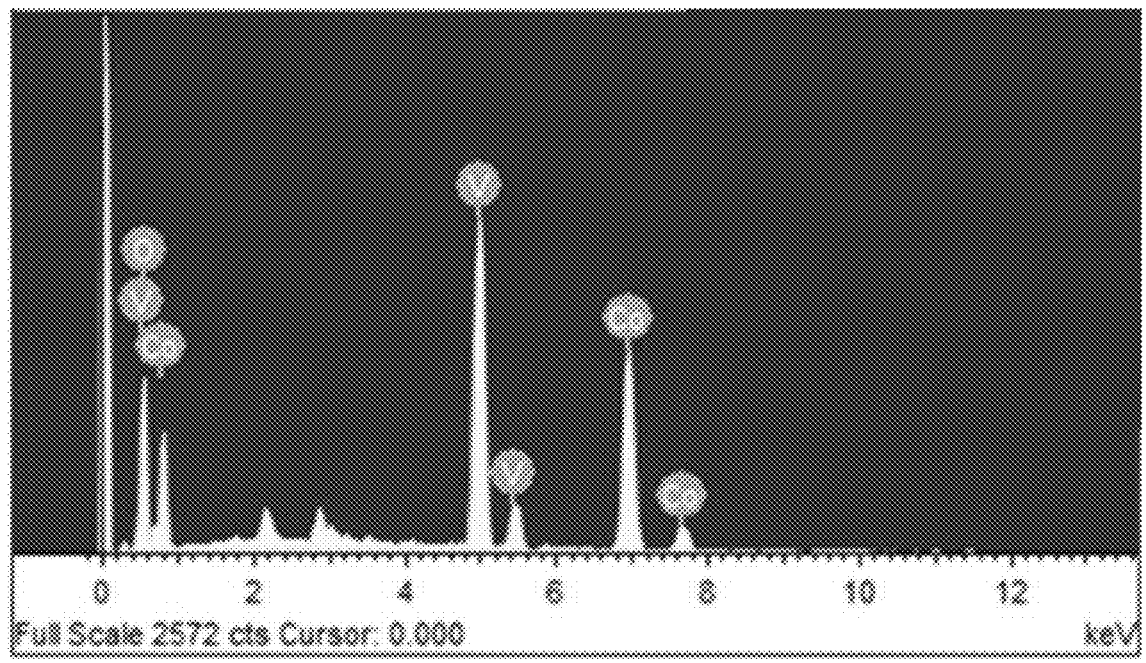
FIG. 3D is EDX spectra of the CoVO$_x$-40 film.
FIG. 3E is the atomicity recorded of the CoVO$_x$-40 film of FIG. 3D.
Figure 3F:
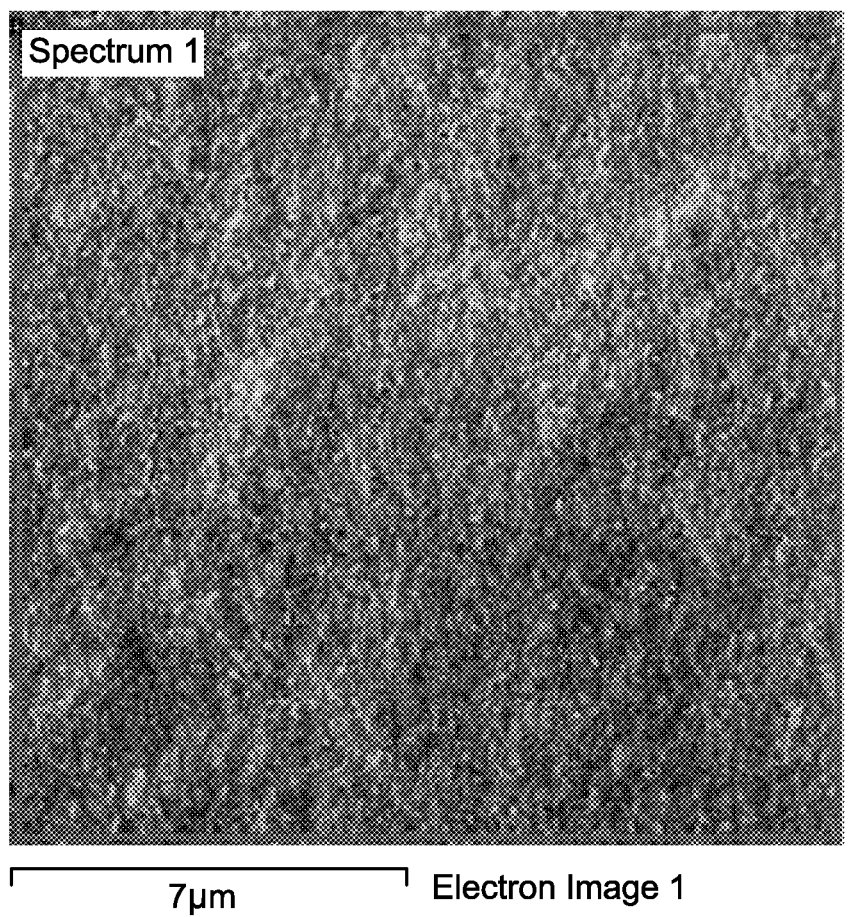
FIG. 3F is an FESEM image of the analysis area of the CoVO$_x$-40 film used for FIG. 3A.
Figures 3G, 3H:
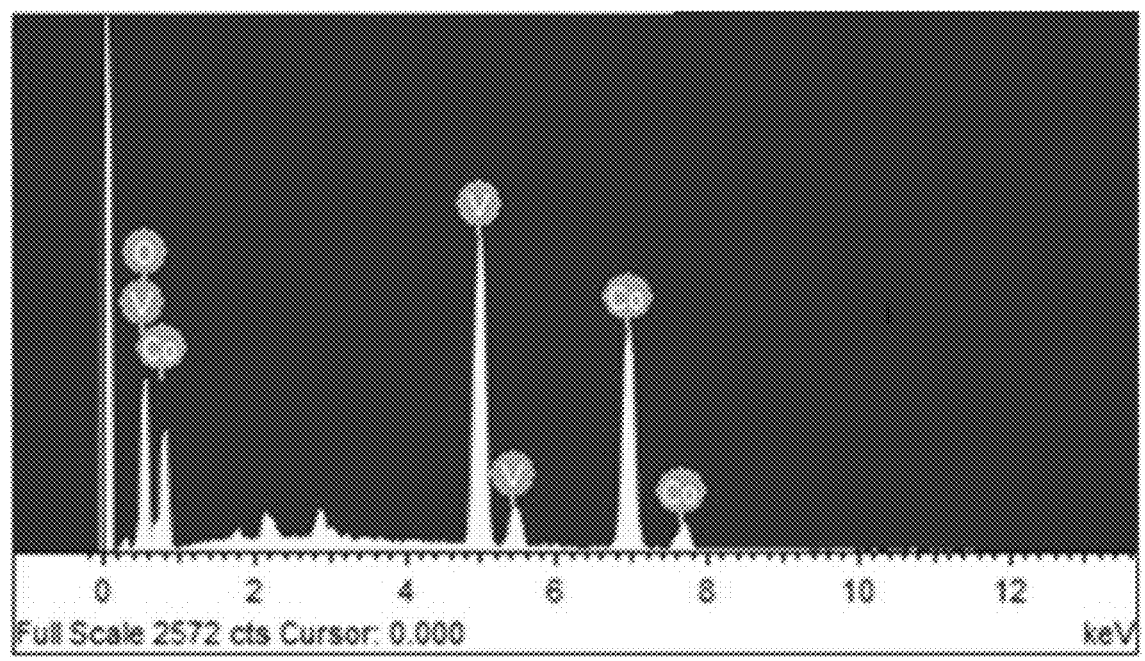
FIG. 3G is EDX spectra of the CoVO$_x$-60 film.
FIG. 3H is the atomicity recorded of the CoVO$_x$-60 film of FIG. 3G.
Figure 3I:
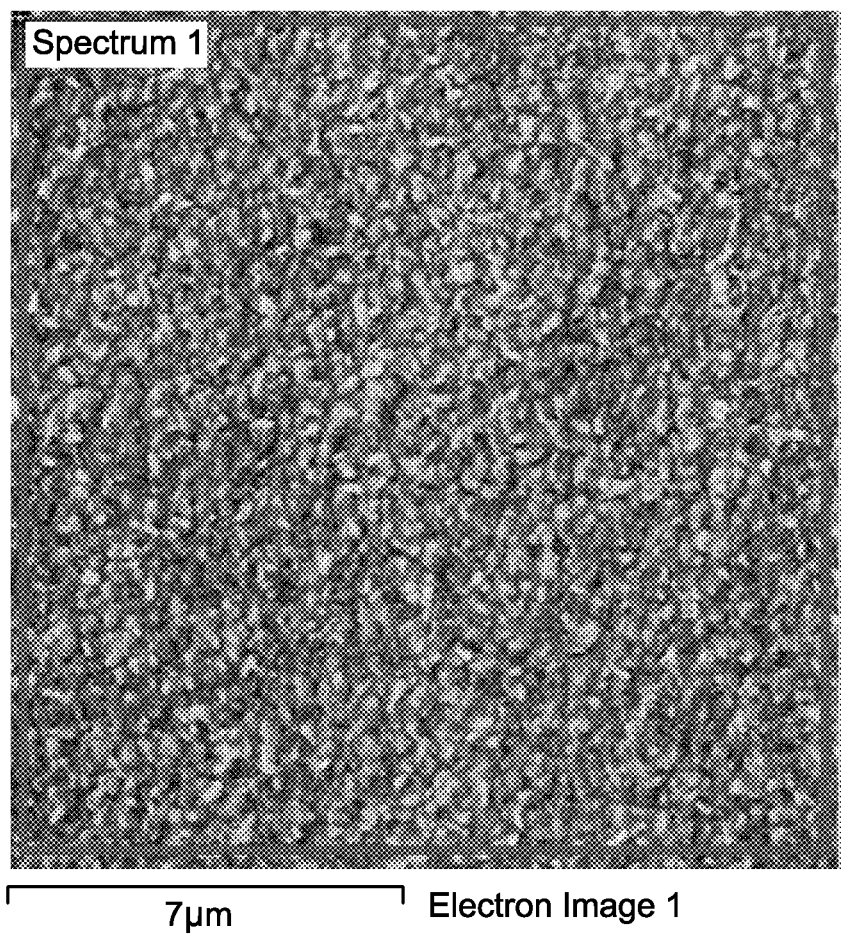
FIG. 3I is an FESEM image of the analysis area of the CoVO$_x$-60 film used for FIG. 3G.
Figure 13A:
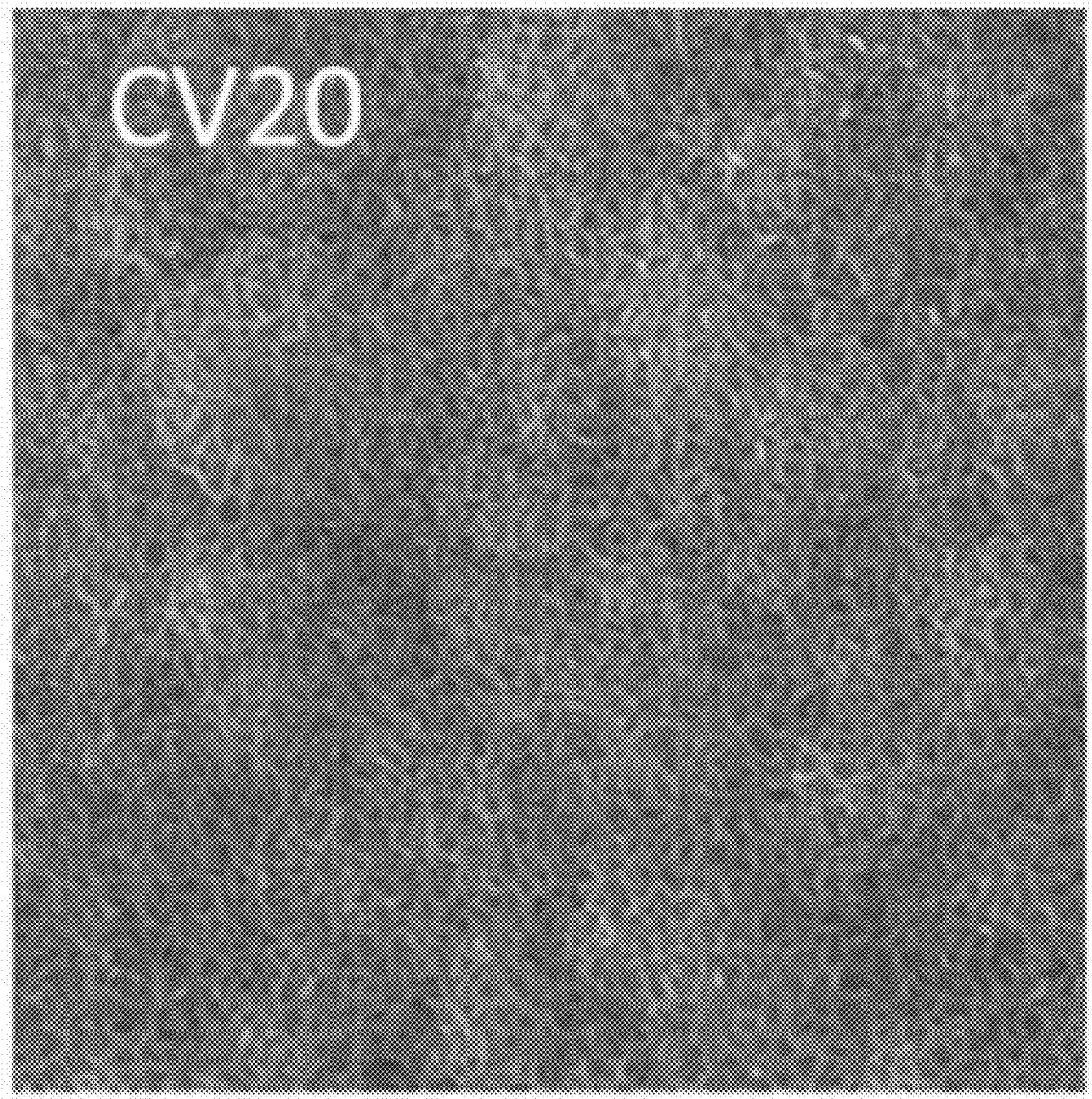
FIG. 13A shows an FESEM image of the CoVO$_x$-20 film.
Figure 13B:
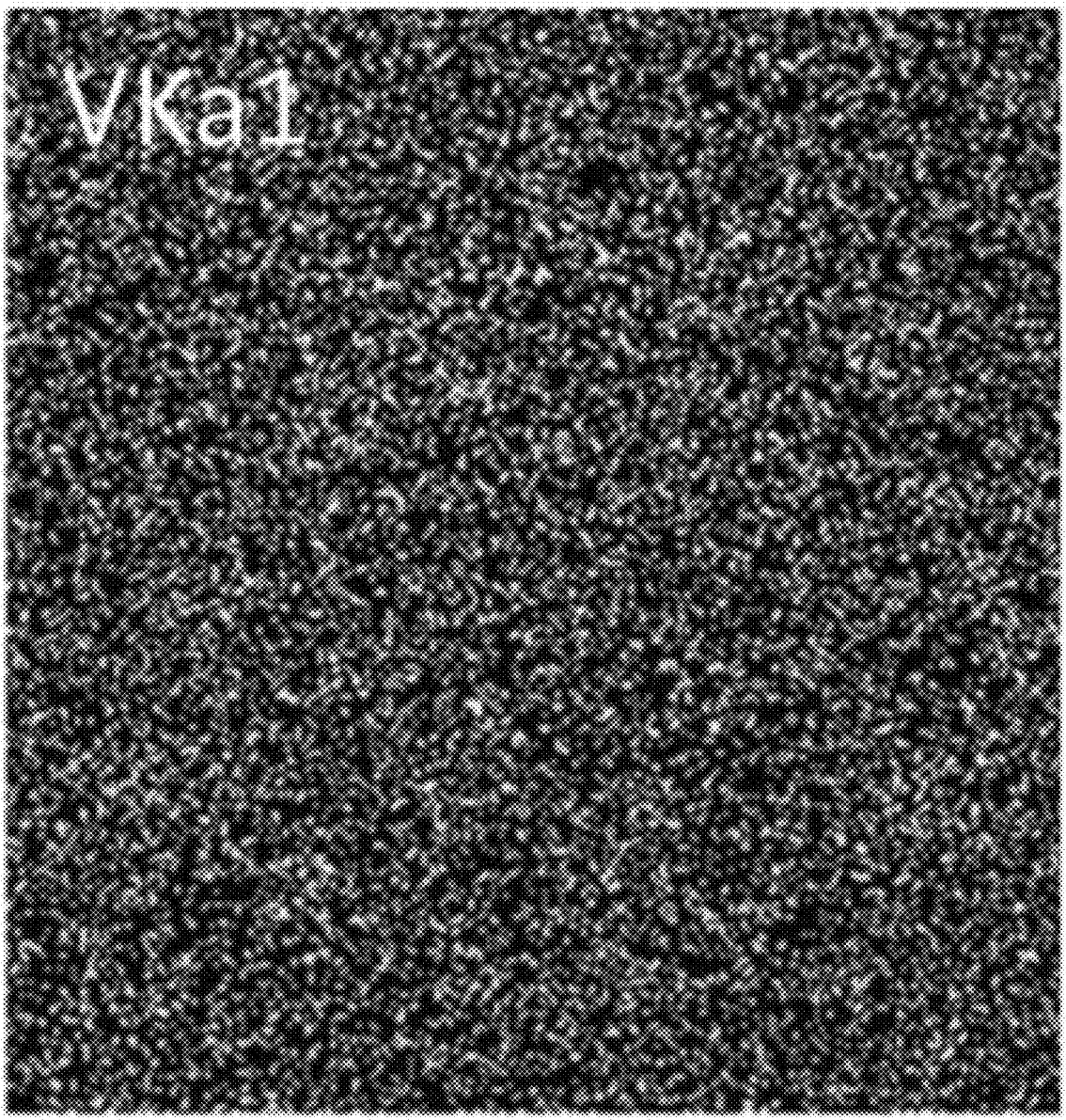
FIG. 13B is an EDX mapping of VKa1 obtained from the region shown in FIG. 13A.
Figure 13C:
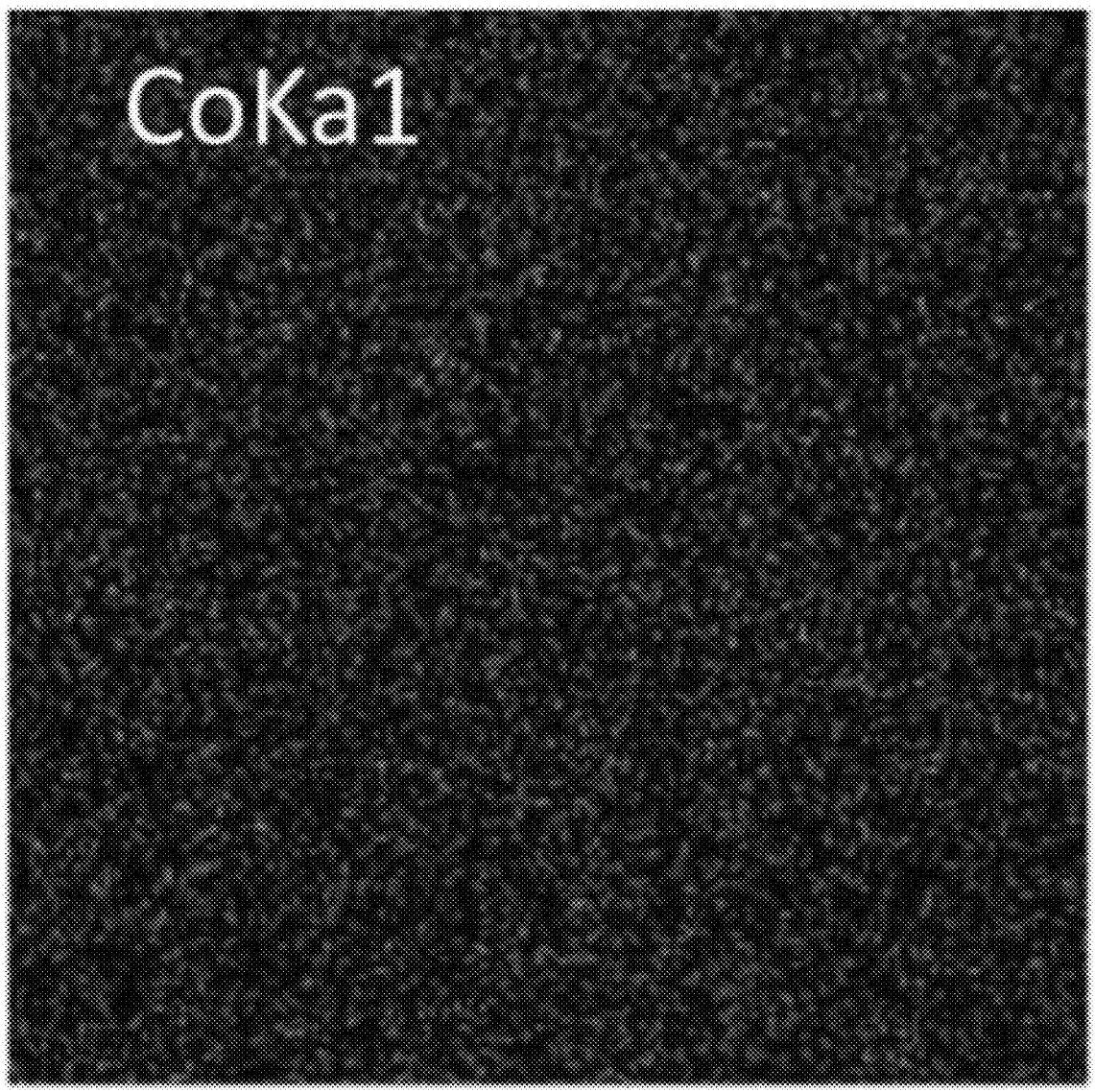
FIG. 13C is an EDX mapping of CoKa1 obtained from the region shown in FIG. 13A.
Figure 13D:
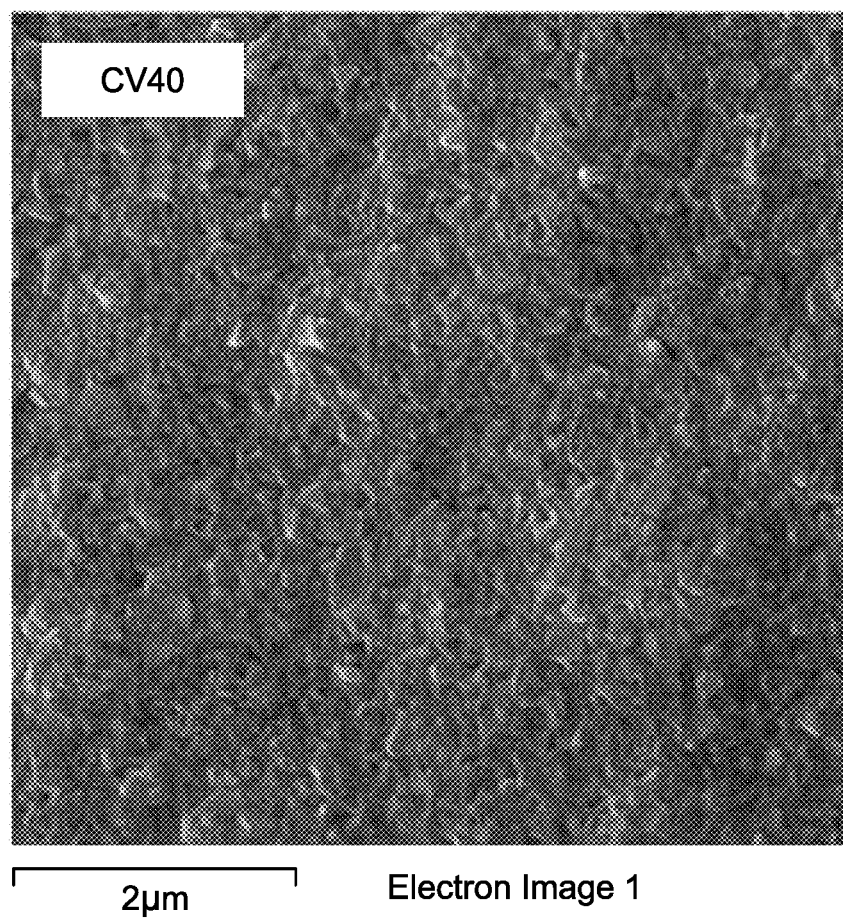
FIG. 13D shows an FESEM image of the CoVO$_x$-40 film.
Figure 13E:
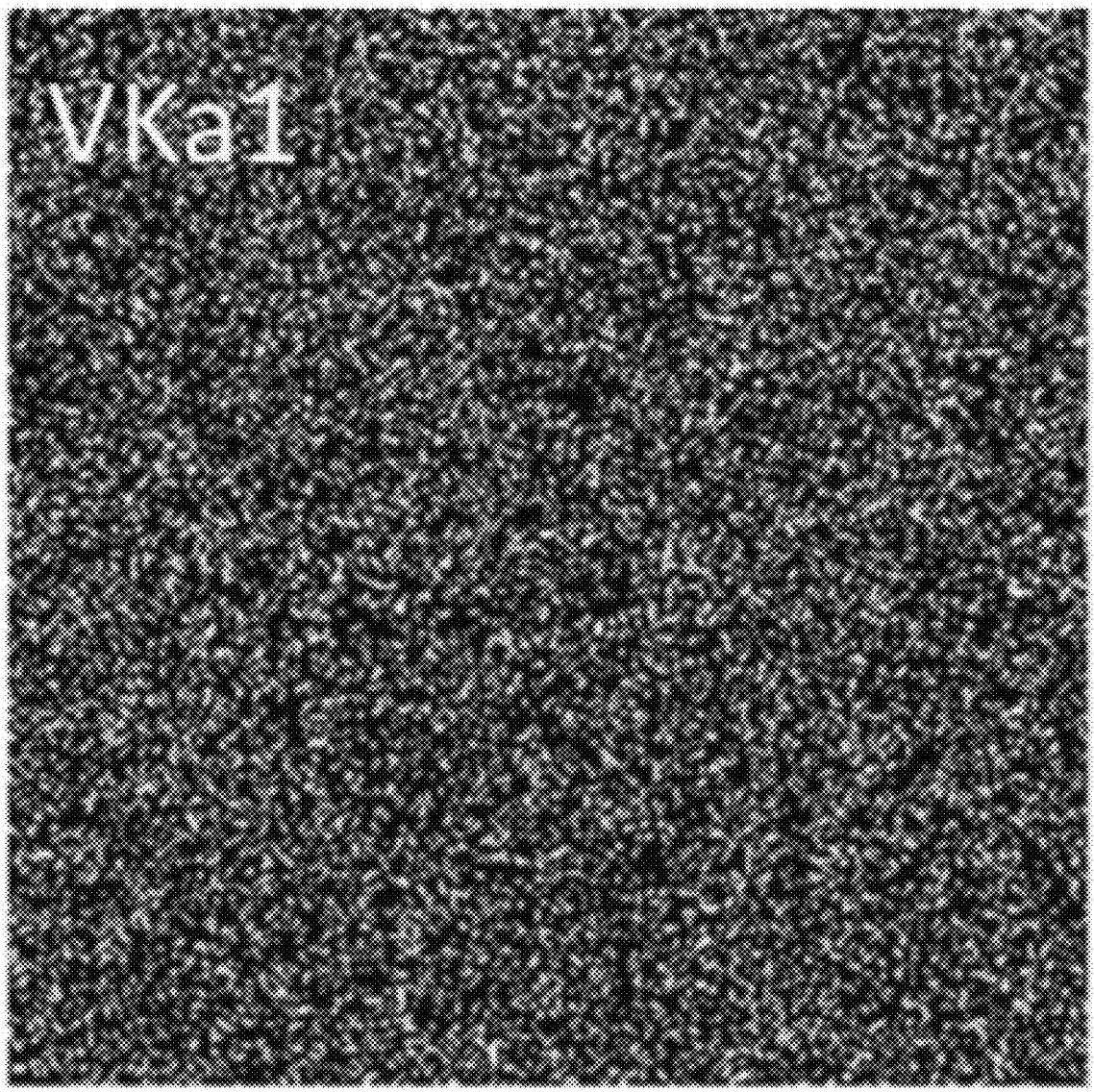
FIG. 13E is an EDX mapping of VKa1 obtained from the region shown in FIG. 13D.
Figure 13F:
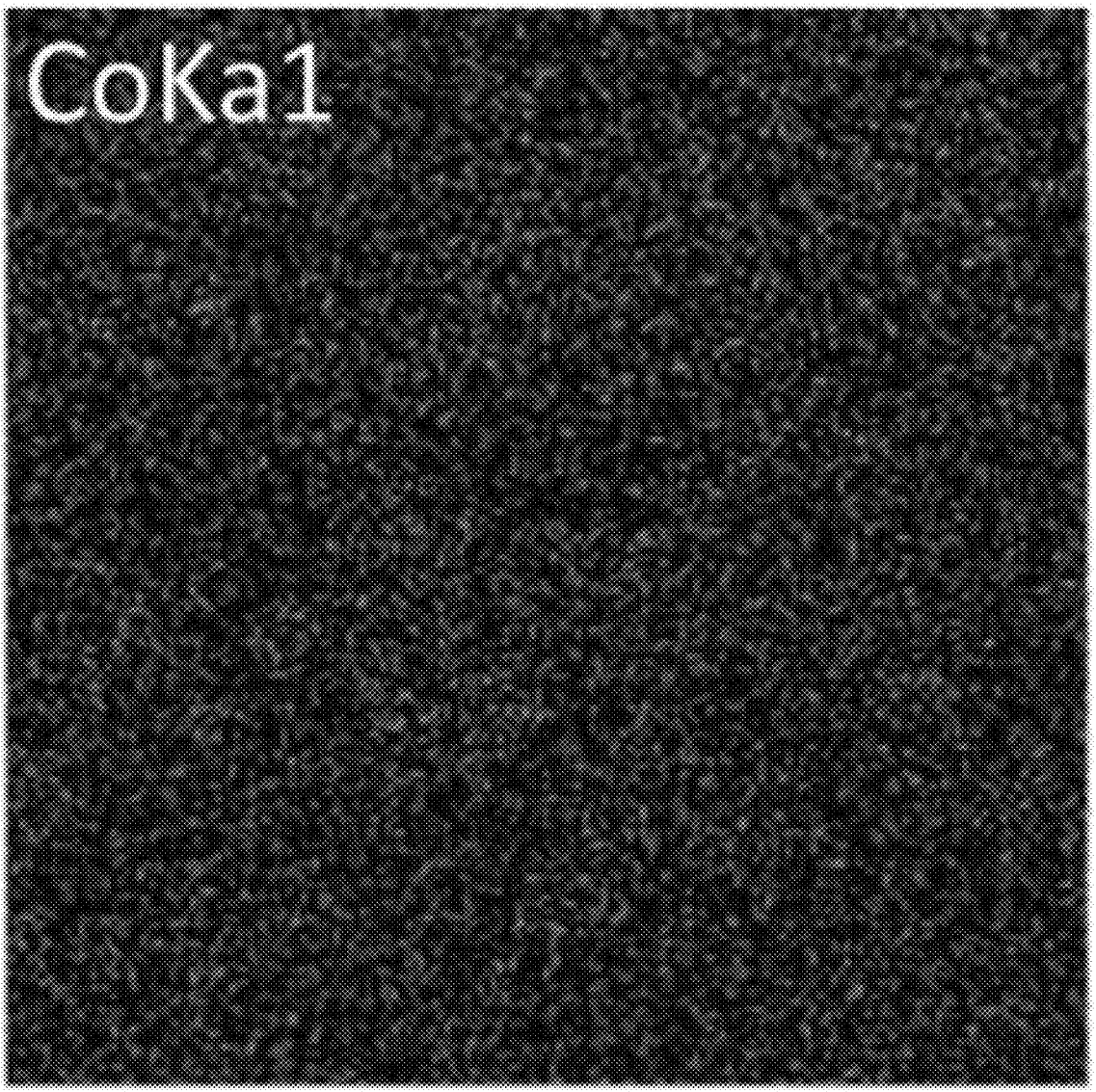
FIG. 13F is an EDX mapping of CoKa1 obtained from the region shown in FIG. 13D.
Figure 13G:
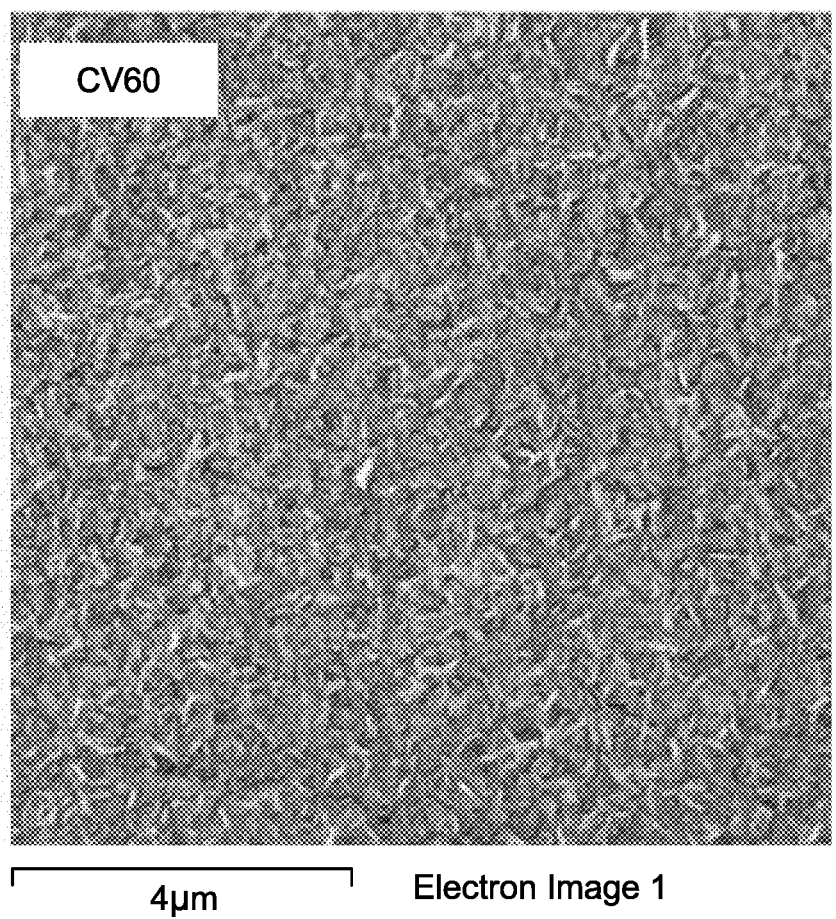
FIG. 13G shows an FESEM image of the CoVO$_x$-60 film.
Figure 13H:
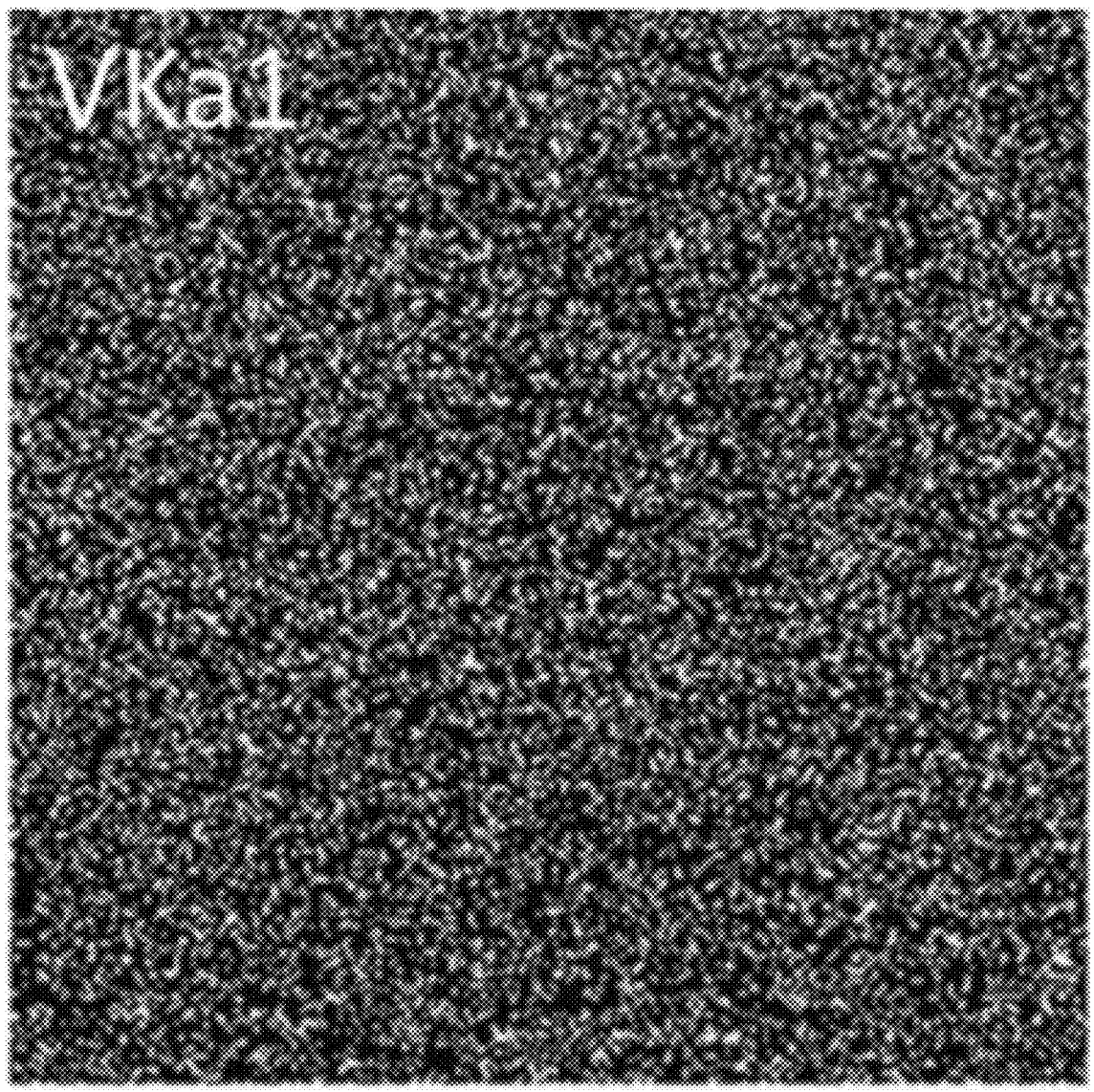
FIG. 13H is an EDX mapping of VKa1 obtained from the region shown in FIG. 13G.
Figure 13I:
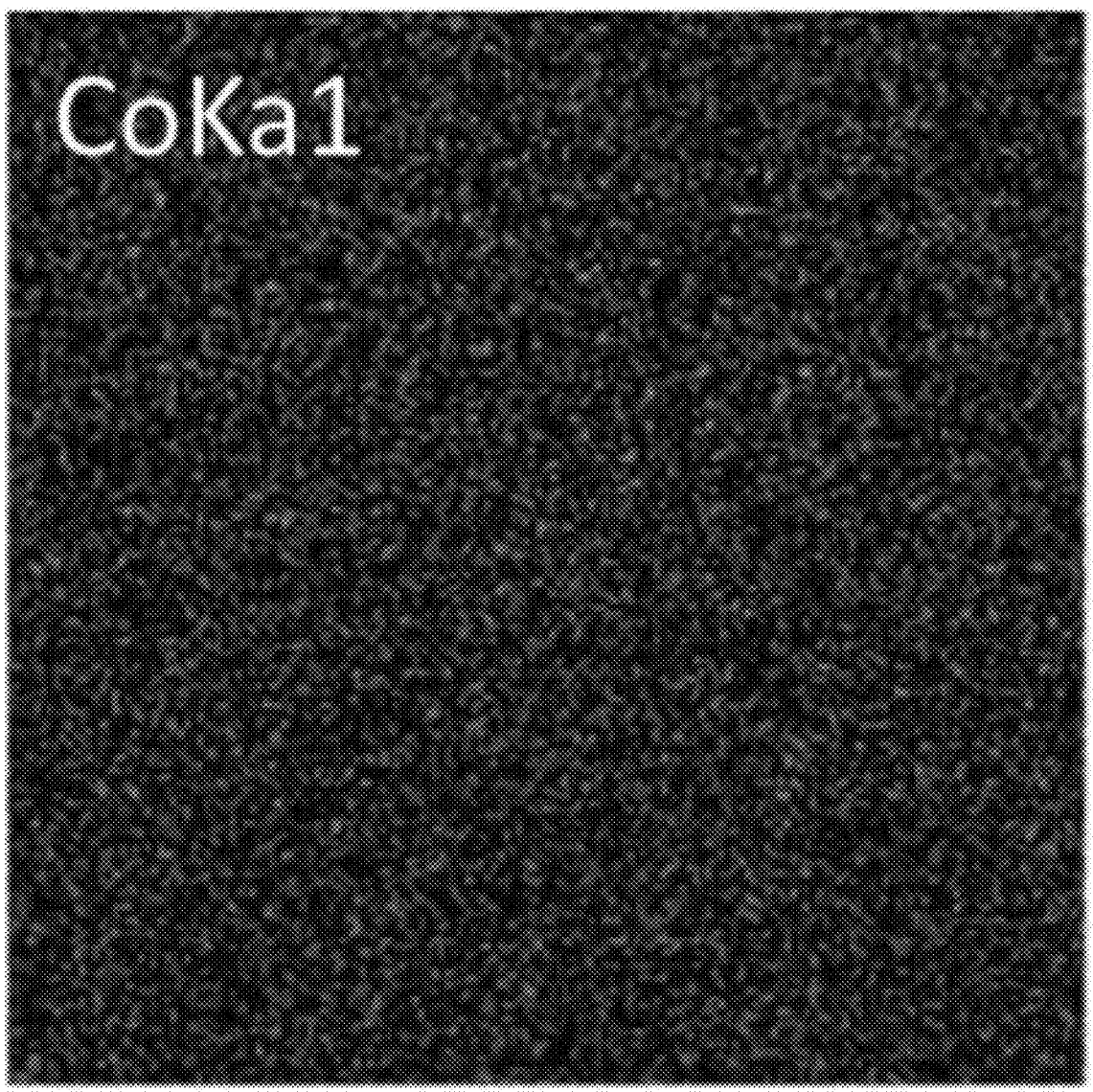
FIG. 13I is an EDX mapping of CoKa1 obtained from the region shown in FIG. 13G.

The composition and elemental stoichiometry of all the films were characterized by energy dispersive x-ray (EDX) analysis, and the resulting spectra are shown in FIGS. 3A, 3D, and 3G for the samples $CoVO_x$-20, $CoVO_x$-40, and $CoVO_x$-60, respectively, with respective spectra taken from the regions shown in FIGS. 3C, 3F, and 3I. FIGS. 3B, 3E, and 3F also show the values of percent atomicity for both metals in the films $CoVO_x$-20, $CoVO_x$-40, and $CoVO_x$-60, respectively. The Co:V ratio found in each case is nearly equal to unity. These data are provided in tabulated form in Table 1. Further, the presence of both cobalt and vanadium elements in the film was ascertained by conducting the EDX mapping. FIGS. 13A-13I indicate the uniform distribution of Co and V elements in all the films. FIGS. 13A, 13D, and 13G show FESEM images of $CoVO_x$-20, $CoVO_x$-40, and $CoVO_x$-60, respectively. FIGS. 13B, 13E, and 13H show the VKa1 signal obtained from the regions of FIGS. 13A, 13D, and 13G, respectively. FIGS. 13C, 13F, and 13I show the CoKa1 signal obtained from the regions of FIGS. 13A, 13D, and 13G, respectively.

TABLE 1

Atomicities of the two metals and their atomic ratio in the resulting film.

| Sample | % atomicity Co | % atomicity V | Co:V |
|---|---|---|---|
| CoVOx-20 | 9.10 | 10.58 | 0.86:1 |
| CoVOx-40 | 16.62 | 15.15 | 1.1:1 |
| CoVOx-60 | 20.24 | 19.53 | 1.05:1 |

Figure 4A:
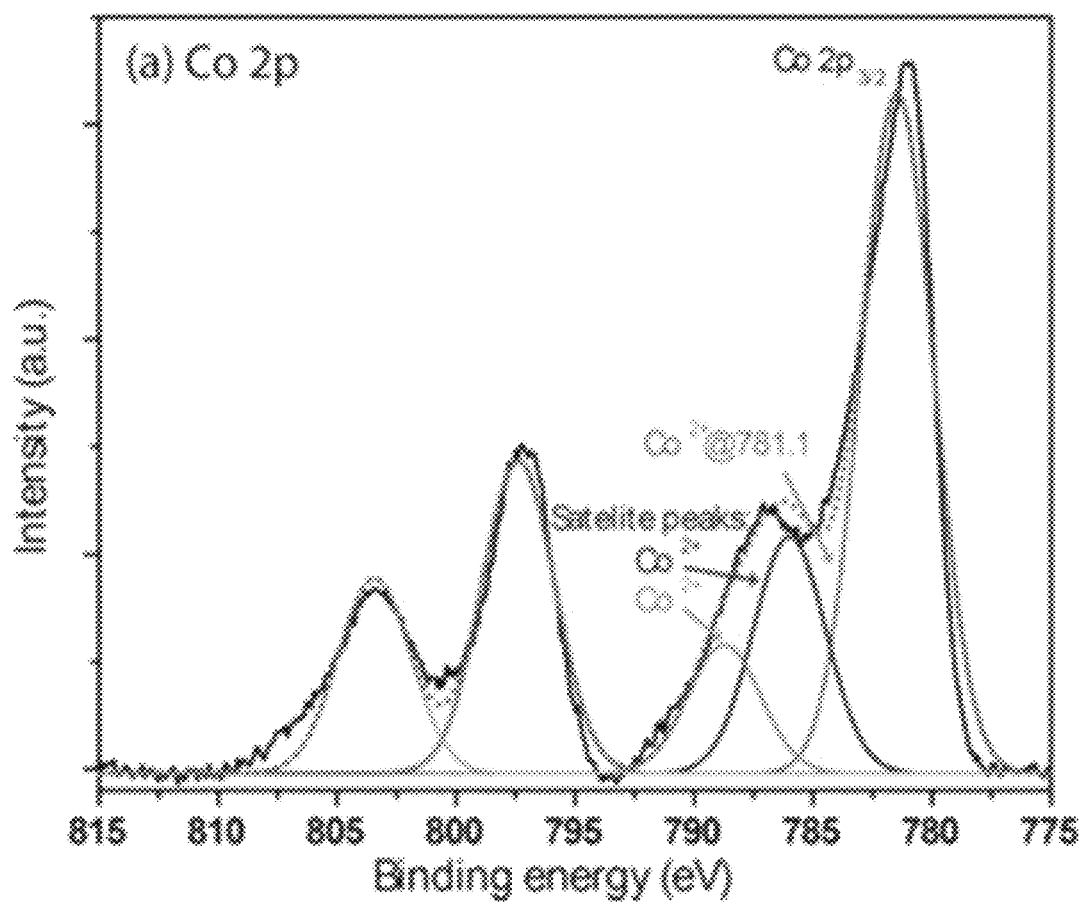
FIG. 4A is a high resolution XPS of the CoVO$_x$-20 film showing the binding energies for Co 2p.
Figure 4B:
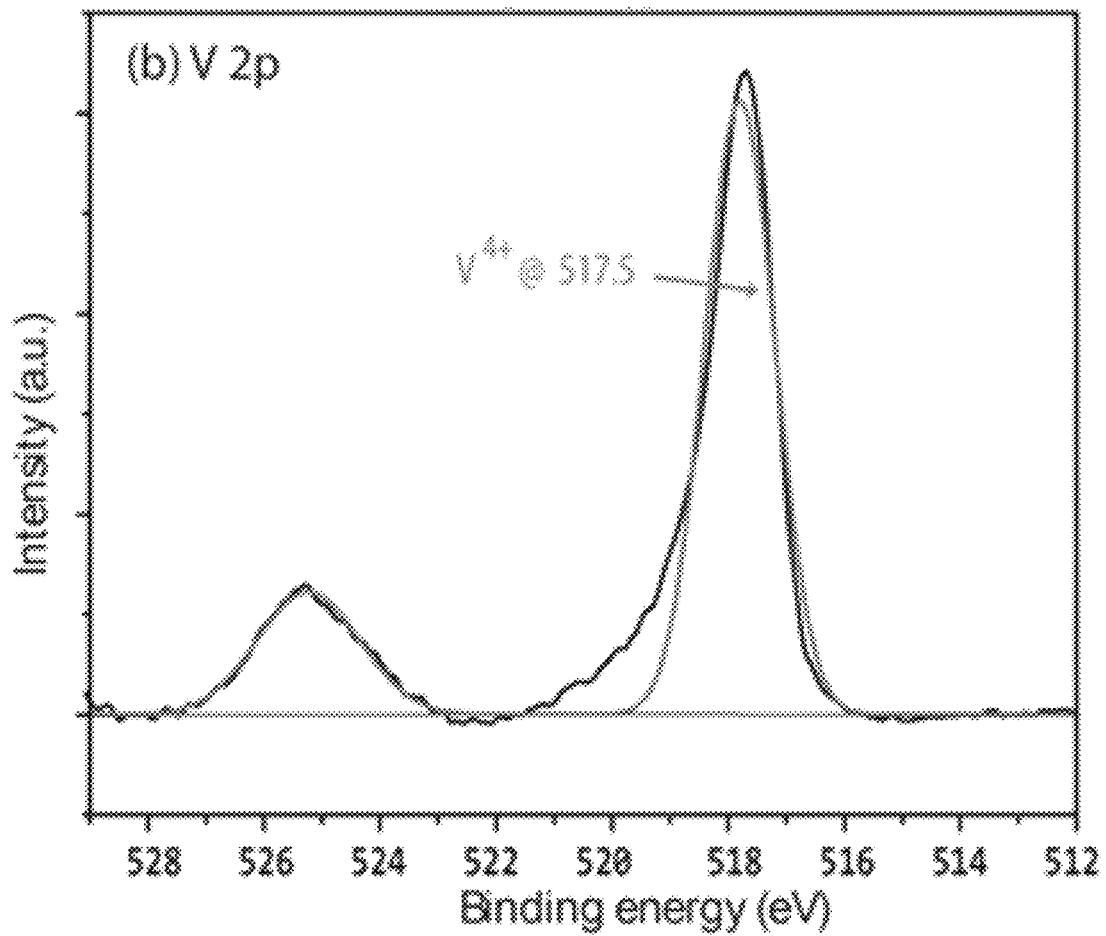
FIG. 4B is a high resolution XPS of the CoVO$_x$-20 film showing the binding energies for V 2p.
Figure 4C:
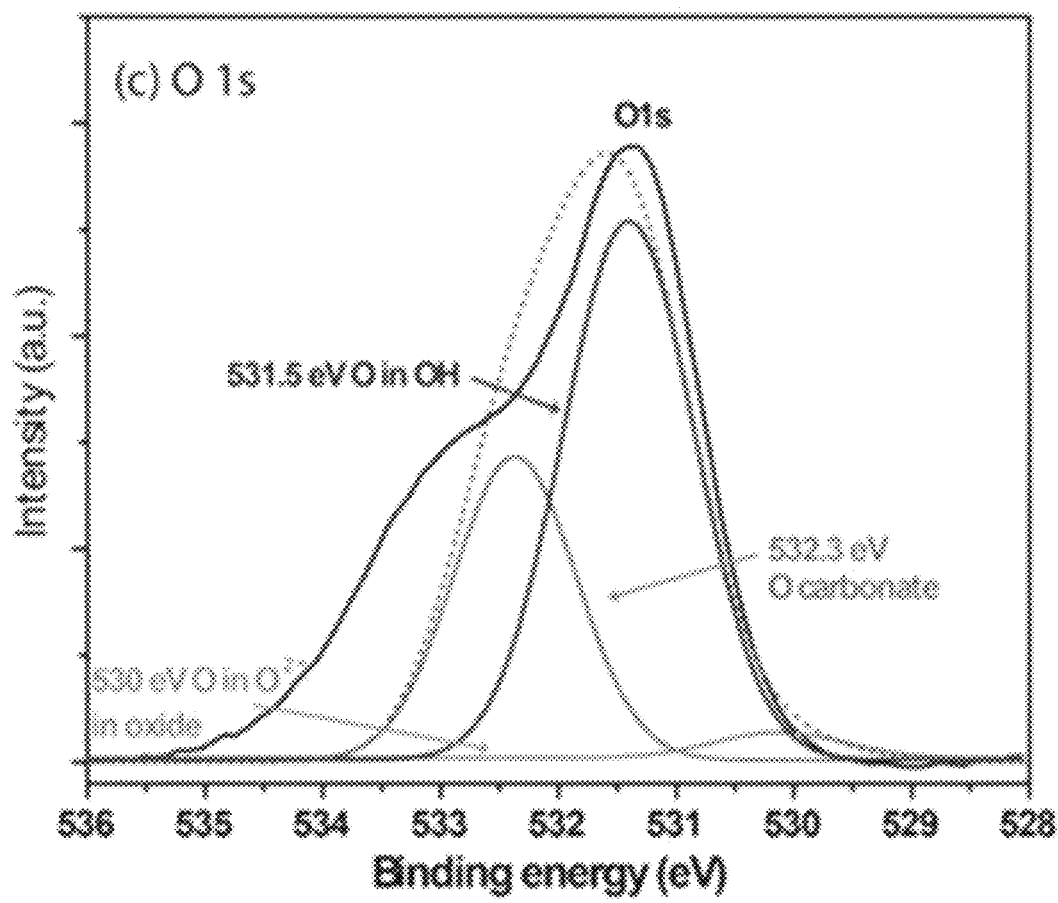
FIG. 4C is a high resolution XPS of the CoVO$_x$-20 film showing the binding energies for O 1s.

The amorphous $CoVO_x$-20 film was further characterized by X-ray photoelectron spectroscopy (XPS) in order to find out the oxidation states of the constituent elements. The survey spectrum so obtained indicated the presence of Co 2p, V 2p and O 1s in the film. The atomic ratio of cobalt to vanadium (Co:V) determined by XPS is approximately 16.56:15.95 (1:1) and is consistent with the metallic ratio of the both elements from the EDX analysis. The high resolution deconvoluted spectra of these individual elements are provided in FIGS. 4A-4C. The binding energy 781.1 eV of Co 2p spectra can be fitted to $Co^{+2}$ (FIG. 4A). Moreover, two satellite peaks are indicated at binding energies of 786 and 788 eV, which are characteristic of high-spin $Co^{2+}$. Contrarily, V 2p spectrum has a peak observed at 2p 3/2 (517.5 eV) which indicates the $V^{+4}$ oxidation state (FIG. 4B). Furthermore, the unsymmetrical peak O 1s can be further split into three peaks. The high resolution signals at binding energies of 531.5 eV and 530.0 eV in the O 1s spectrum represent oxygen atoms in hydroxyl group and oxide group, respectively. This demonstrates a characteristic feature for O that is bonded to a metal in metal oxides. The binding energy peak at 532.3 eV is again a feature of oxygen atoms in carbonate group (FIG. 4C). Although the XRD studies could not exactly reveal the chemical formula of the deposited material due to the non-crystalline nature of the fabricated material, on the basis of XPS studies the oxidation state of Co and V atoms existing in the binary oxide system can be demonstrated. These XPS studies also show a good agreement with the $CoVO_x$ materials fabricated by other synthetic strategies. See Liardet et al. (2018); and Thorat et al. (2018).

EXAMPLE 5

Electrochemical Water Oxidation Studies

Figure 5B:
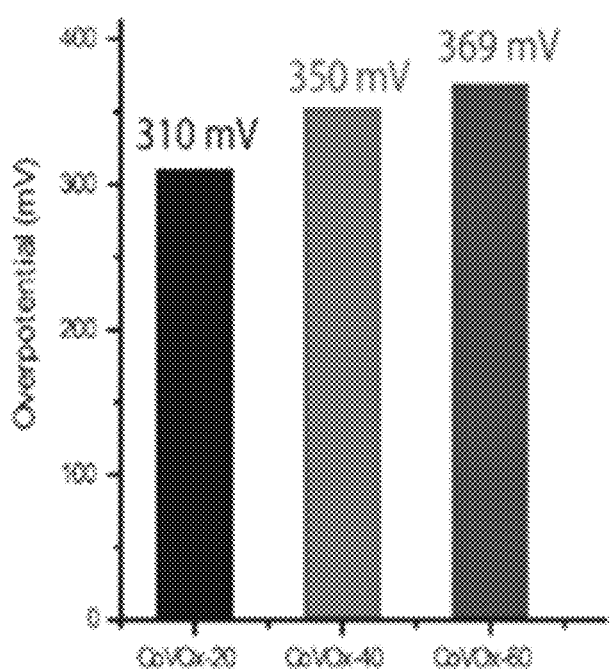
FIG. 5B is a graph of the overpotential values of the same films of FIG. 5A at a current density of 10 mA cm$^2$.

Directly deposited amorphous catalytic films of $CoVO_x$ on the FTO substrates were used for water oxidation studies without any further modification. FTO substrates are much less conductive than the reported glassy carbon and nickel foam, carbon foam, and gold foam materials used for $CoVO_x$ immobilization, but are less costly, easily available, and scalable for large area applications. See Liardet et al. (2018); Thorat et al. (2018); and Liu et al. (2018). The water oxidation experiments were performed in 0.5 M KOH using three electrode configuration under forward potentials sweeps, and the linear sweeps voltammetry (LSV) profiles were obtained. FIG. 5A indicates these profiles for all three Co—V films at a scan rate of 10 mV/sec. All the data was compared at a current density of 10 mA/cm², which is often considered as a reference for providing 10% efficiency in water splitting reactions. Here, $CoVO_x$-20 film showed remarkable performance in terms of onset overpotential (i.e., 270 mV), overpotential at 10 mA/cm² (i.e., 310 mV), and current density reaching to a value of 160 mA/cm² only at an overpotential of 410 mV. Ibis catalytic performance of $CoVO_x$-20 is even higher compared to the other two films which both show a similar onset potential but have different overpotential at a current density of 10 mA/cm². Better performance of $CoVO_x$-20 can be justified on the basis of porous nanofiber film structure indicated by the SEM topography (FIGS. 2A and 2B). This porous structure with spongy appearance facilitated the higher number of catalytic sites to be accessible for the reaction to proceed. As a consequence, the overpotential is reduced, and the current density jumps to higher values at lower potentials. With an increase in deposition time, the porosity of the film starts deteriorating, and the surface structure becomes more compact, as evident from FIG. 2E. Thus, less porous flakes of the material are formed, with an increase in overpotential (i.e., 350 mV and 369 mV for $CoVO_x$-40 and $CoVO_x$-60, respectively as shown in FIG. 5B. The current densities of these films were also shifted towards lower values. The performance of the $CoVO_x$-20 film was also compared to its forming materials and to the film structures reported using other fabrication strategies. The overpotential for $CoVO_x$-20 film is much smaller than the reported values of individual metal oxides of the combination and is lower than many cobalt vanadium oxide catalysts, such as $Co_2V_2O_7$ (340 mV), $Co_3V_2O_8$ (359 mV), and $Co_3V_2O_8$ nanoroses (391 mV). See Peng et al. (2017); and Xing, M.; Kong, L.-B.; Liu, M.-C.; Liu, L.-Y.; Kang, L.; Luo, Y.-C., Cobalt vanadate as highly active, stable, noble metal-free oxygen evolution electrocatalyst. *Journal of Materials Chemistry A* 2014, 2 (43), 18435-18443, each incorporated herein by reference in their entirety. This value is also comparable to the values reported for amorphous cobalt vanadium oxide on glassy carbon (330 mV), nickel foam (260 mV), and gold foam (215 mV), although the substrates used herein are FTO and are much less conductive than metallic foams. See Liardet et al. (2018); and Liu et al. (2018), as cited previously. A notably higher current density is also achieved without a substantial increase of overpotential, which makes this AACVD strategy more direct and viable for catalyst production.

Figure 6A:
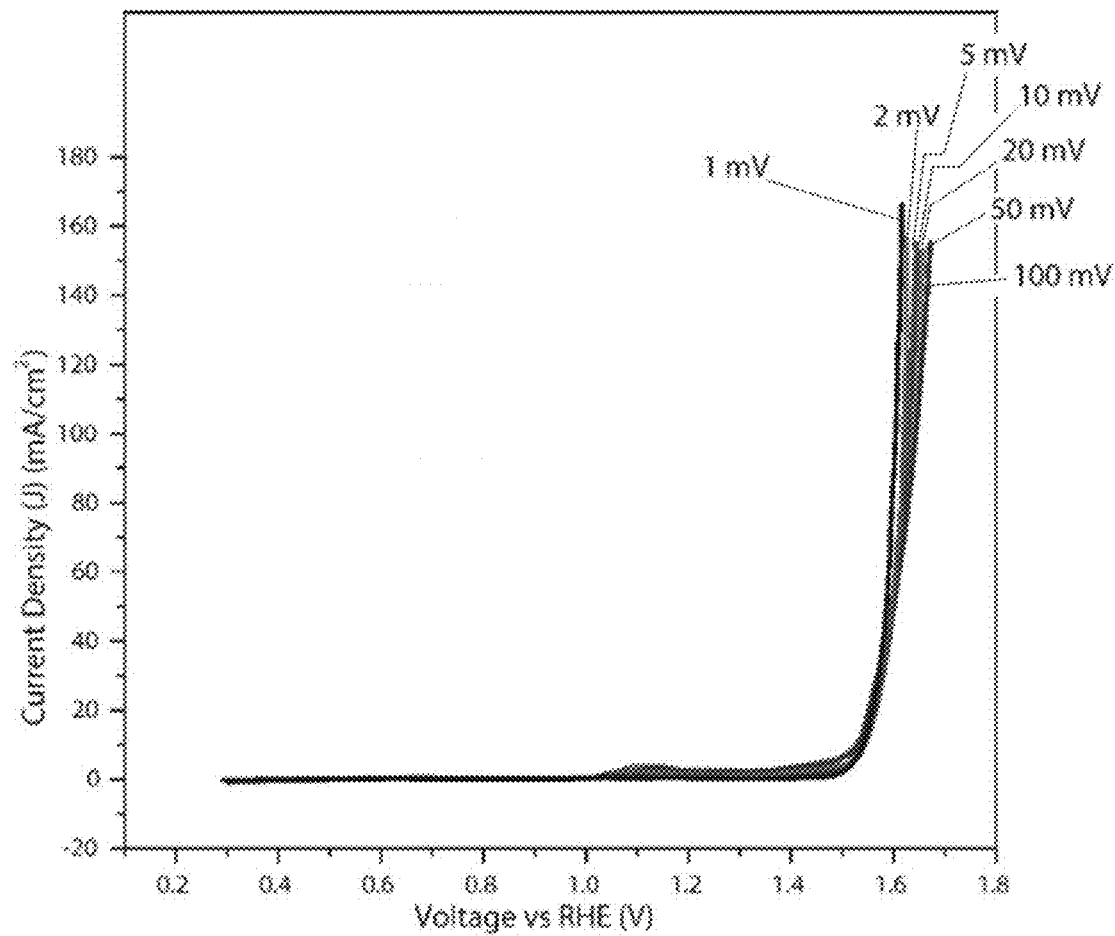
FIG. 6A shows LSV curves for the CoVO$_x$-20 film at different scan rates.
Figure 6B:
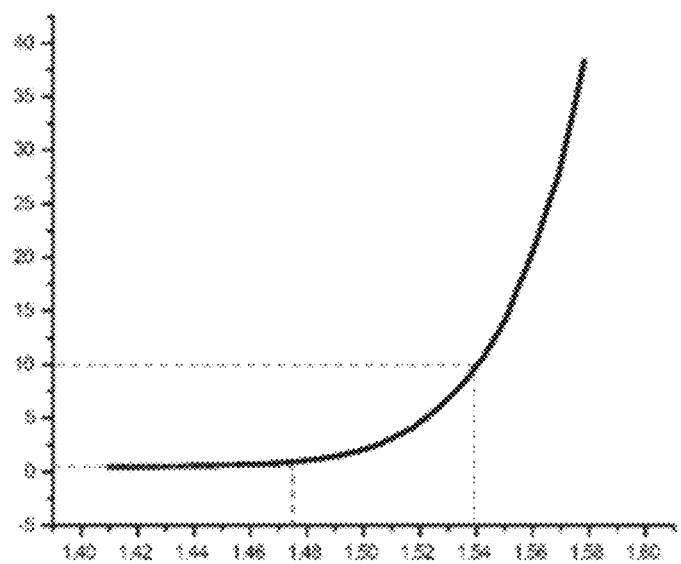
FIG. 6B shows a zoomed in LSV curve for the water oxidation reaction at a scan rate of 1 mV sec$^{-1}$.

An effect of change in the scan rate on the $CoVO_x$-20 film was also studied in FIGS. 6A and 6B. It was found that increasing the scan rate from 1 mV/sec to 100 mV/sec shifted the onset potential to more negative potential values. However, there is no substantial change in the overpotential for 10 $mA/cm^2$ current density as this value shifted from 310 mV at a scan rate of 10 mV/sec to 308 mV at a scan rate of 1.0 mV/sec, as shown in FIG. 6B. Notable here is that the current densities are higher at low scan rates, reaching a value of 175 $mA/cm^2$ for 1 mV/sec at an overpotential of just 380 mV. With a direct and rapid synthetic strategy taking only minutes for the whole preparation process, and in view of the less conductive behavior of the FTO substrates, this water splitting performance is quite remarkable.

Figure 7:
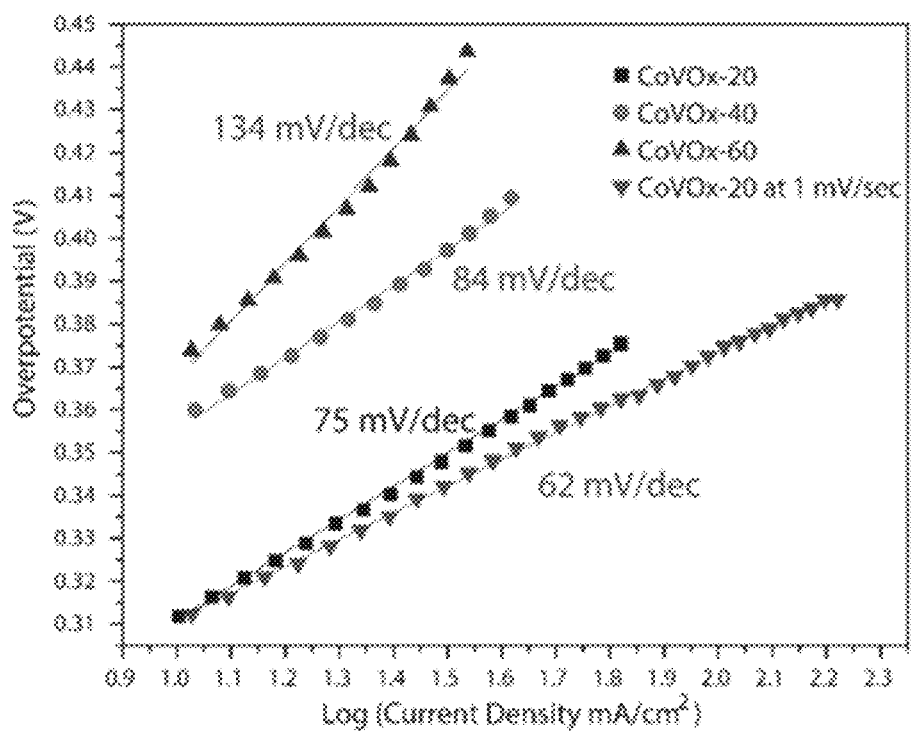
FIG. 7 is a graph illustrating the Tafel plots for different films at a scan rate of 10 mV/sec as well as CoVO$_x$-20 film at a scan rate of 1.0 mV/sec in 0.5 M KOH electrolyte solution.

In order to study the sustainability and the consistent rate of water oxidation reaction, Tafel plots were drawn for all the prepared catalyst films within the linear regions of the current voltage curves at a scan rate of 10 mV/sec and were fitted into the Tafel equation. Ibis analysis provides an indication of whether the catalyst can operate over a narrow potential range while producing high current density. A small Tafel slope is an expression of well-balanced kinetics during catalysis. See Shinagawa, T.; Garcia-Esparza, A. T.; Takanabe, K., Insight on Tafel slopes from a microkinetic analysis of aqueous electrocatalysis for energy conversion. *Scientific Reports* 2015, 5, 13801, incorporated herein by reference in its entirety. These plots with their slope values are shown in FIG. 7. All three catalytic films presented here demonstrated the enhanced kinetics while displaying appreciably low value of Tafel slopes, however, the film formed with 20 min deposition has a very large linear range with a low slope of 75 mV/dec. The $CoVO_x$-40 film also showed a similar linear range but with a higher value of the slope (i.e., 84 mV/dec). $CoVO_x$-60 film, on the other hand, staredt deviating from the linear range at log value of 1.4 with a slope of 149 mV/dec. The Tafel slope value for the $CoVO_x$-20 at a scan rate of 1.0 mV/sec was even shifted to 62 mV/dec with a linearity of response even beyond a logarithmic value of 2.2. This indicates that catalytic performance is dependent upon the porosity and surface structure of the material, and so is the kinetics of the reaction which is more visible at lower scan rates. An open structure and porous morphological features of the $CoVO_x$-20 film catalyst supports the fast mass transfer and boosts the electron transfer without undergoing any scattering losses, as a higher number of accessible catalytic sites are readily available.

Figure 14:
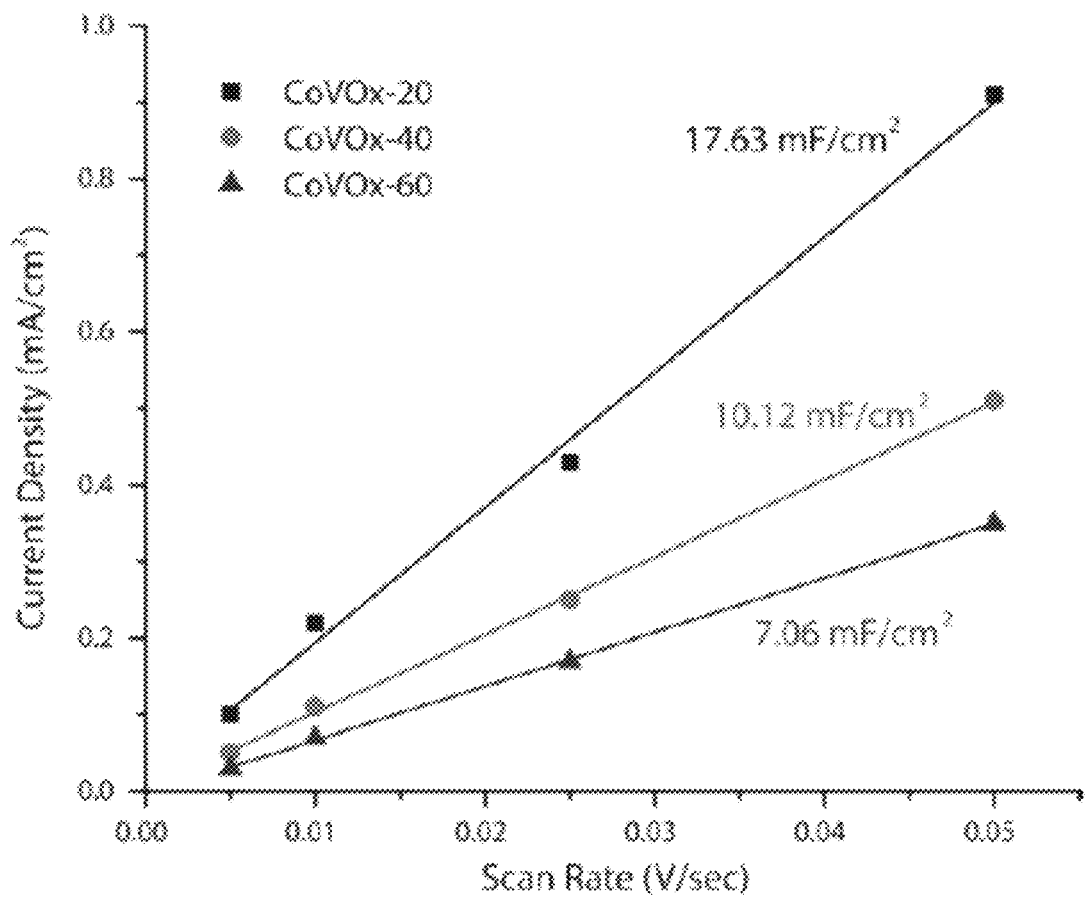
FIG. 14 shows the current density vs. the scan rate for experiments in the non-faradaic zone, and the calculated slope values for the three different films.

For a quantitative analysis of the film properties, mass activities of the catalytic films were determined at 1.55 V vs RHE as provided in Table 2. This data also corroborates the Tafel plots where the smaller Tafel slopes are linked to the higher mass activity in the same order. The higher mass activity of the $CoVO_x$-20 (i.e., 43.4 A/g) as compared to the other two films further demonstrates the high mass performance of 20 min deposition of the material. Here, a longer deposition and higher mass loading does not contribute to the catalytic activity, rather the microstructure of the film and the available catalytic sites are responsible for the OER. For an estimation of the available catalytic sites, measurement of the active surface area can be regarded as an important factor which was numerically assessed from the double-layer capacitances measurements. For that purpose, charging current density differences in a potential window of non-faradaic region were plotted against scan rates in FIG. 14, and the slopes were divided by the electrode area to get estimated ECSA values in units of $mF/cm^2$. A significantly higher linear slope value of $CoVO_x$-20 film (i.e., 16.87 $mF/cm^2$) as compared to $CoVO_x$-40, which has a value of 10.12 $mF/cm^2$, and $CoVO_x$-60 which has a value of 7.06 $mF/cm^2$, indicates that the $CoVO_x$-20 film has a higher number of active sites available, thereby making the catalytic reaction kinetically favorable.

TABLE 2

Summary of electrocatalytic activity for Co-V mixed oxide thin film electrocatalysts.

| Sample | η@10 $mA/cm^2$ [mV] | η@100 $mA/cm^2$ [mV] | Current Density at 1.60 mV vs RHE [$mA/cm^2$] | Tafel Slope [m V/dec] | Mass Activity [A/g] | ECSA [$mF/cm^2$] |
|---|---|---|---|---|---|---|
| CoVOx-20 | 310 | 370 | 48 | 75 | 43.4 | 17.63 |
| CoVOx-40 | 350 | 480 | 25 | 84 | 35.9 | 10.12 |
| CoVOx-60 | 369 | 590 | 13 | 134 | 29.2 | 7.06 |

Figure 15:
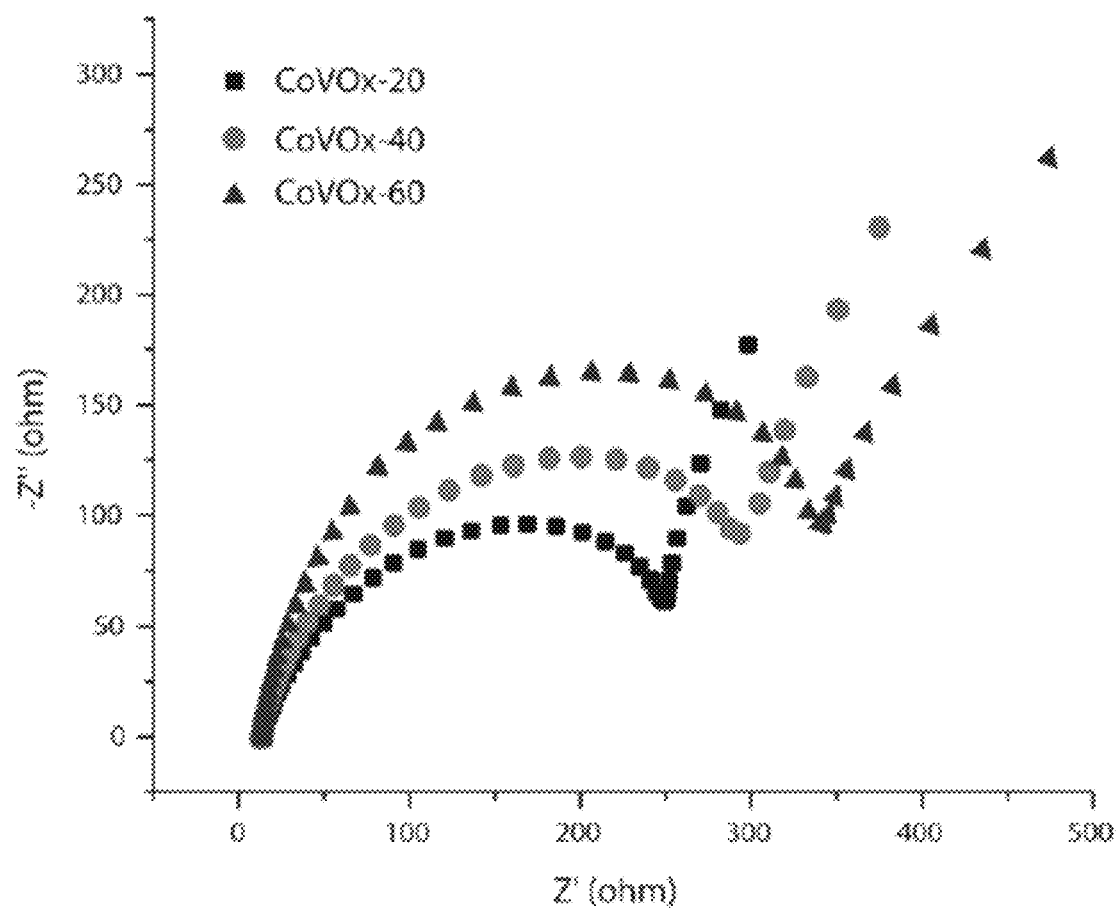
FIG. 15 shows a Nyquist plot for $CoVO_x$-20, $CoVO_x$-40, and $CoVO_x$-60 films at an applied potential of 1.48 V vs. RHE in the frequency range of 0.1 Hz to 100 KHz.

The conductivities of the sample films were estimated using impedance spectroscopy, showing a characteristic depressed semicircle of an OER charge transfer reaction for all the films. However, it was found that $CoVO_x$-20 film exhibits highest conductivity which is an indication of its lowest charge-transfer resistance compared to other two films as detailed in FIG. 15. FIG. 15 shows a Nyquist plot for $CoVO_x$-20, $CoVO_x$-40, and $CoVO_x$-60 films at an applied potential of 1.48 V vs. RHE in the frequency range of 0.1 Hz to 100 KHz. For each EIS analysis, data were fitted employing Randles circuit with Nova software. If this resistance is compared to the materials immobilized on gold foam (i.e., 10-25 ohm), nickel foam (i.e., 1.0-1.4 ohm), glassy carbon (i.e, 0.6-0.8 ohm), and carbon foam (4.0-8.0 ohm), it is at least ten times higher because of direct deposition on FTO substrate. See Liu et al. (2018); Liardet et al. (2018); and Thorat et al. (2018). Thus, the method of AACVD deposition can be regarded as highly efficient for water oxidation chemistry. Among the three AACVD films, the higher conductivity of the $CoVO_x$-20 may have originated from its thinner structure with the network of fibers having an enhanced number of active sites available. The larger number of catalytic sites transforms more and more of the cobalt species into their active form, in real time during the catalysis, thus promoting the charge transfer process. Consequently, the conductivity as well as the catalytic performance of this film is significantly improved.

Figure 8A:
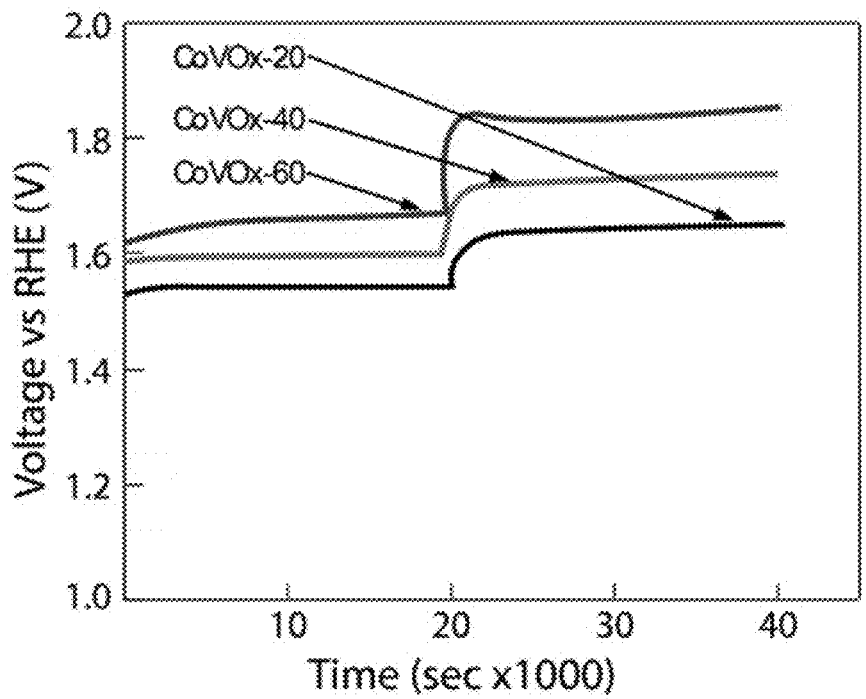
FIG. 8A shows the long term stability tests of the prepared films at constant current density of 20 mA/cm$^2$ for more than 5 h and a constant current density of 100 mA/cm$^2$ for more than 5 h.
Figure 8B:
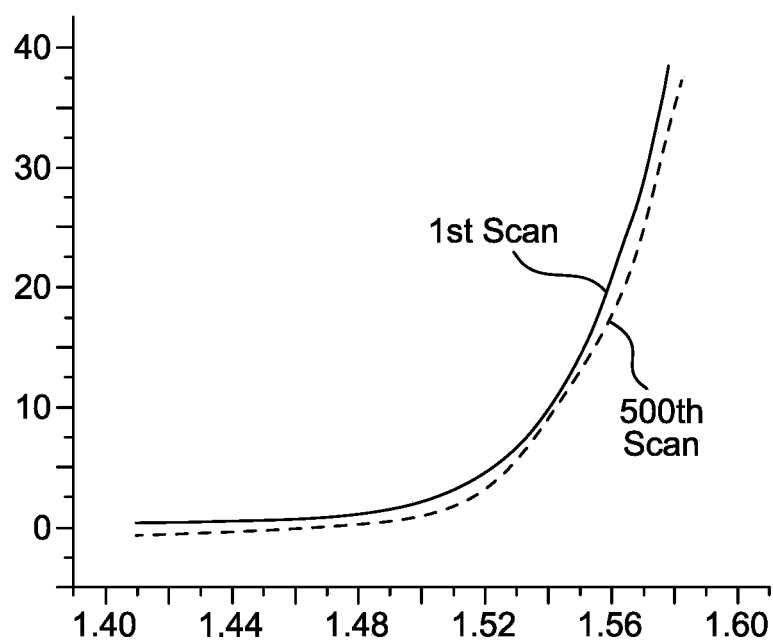
FIG. 8B shows the first and the 500th scan of LSV measurement with no significant changes in overvoltage and current density.

In addition to the enhanced catalytic activity with low conducting substrates, the $CoVO_x$ films also exhibited highly desirable catalytic durability and stability. For more than 5 h of constant anodic polarization in each case of 20 mA/cm$^2$ and 100 mA/cm$^2$ current densities, only a moderate increase of 10-30 mV in overpotential was required for all three fabricated films, as shown in FIG. 8A. This nominal shift in the overpotentials is caused by the accumulation of very high density of oxygen covering the active sites at the electrode surface. Bubbles in the form of a rich continuous stream of oxygen bubbles was also visible during the electrocatalytic experiments owing to the high rate of oxygen production at these electrodes. Moreover, the $CoVO_x$-20 electrode exhibited only a small loss of activity after 500 CV cycles as shown in FIG. 8B. All these performance parameters of the fabricated films can only be attributed to their excellent catalytic activity under the employed conditions.

EXAMPLE 6

Calculation of Different Electrocatalytic Parameters

Electrochemical Impedance Spectroscopy

EIS analysis was carried out to get more insight into electrochemical kinetics for all the thin film electrocatalysts. The data was recorded at an applied potential of 1.49 V vs. RHE considering the faradaic region of cyclic voltammogram to investigate charge transfer resistance at the so-called electrode-electrolyte double layer.

Mass Activity (MA) [mA·mg$^{-1}$]

The loading normalized current density or mass activity is calculated according to the following formula:

$$MA = \frac{J @ \eta = 0.35 \ V}{\text{Active mass of catalyst}}.$$

Here, J is current density in mA·cm$^{-2}$ at specific potential value. 1.58 V vs. RHE was chosen as the specific potential value.

Electrochemically Active Surface Area (ECSA) [mF/cm$^2$]

Electrochemically active surface area (ECSA) was calculated using CV mode by calculating double layer capacitance employing the following formula:

$$ECSA = \frac{CDL}{Cs}$$

First of all, the non-faradaic region (somewhere in between the oxygen and hydrogen region) in the CV was identified by visual analysis of cyclic voltammetry data assuming that all the current in this potential range was due to the double layer charging. Under this potential range the CV was run at different scan rates (5 mV·s$^{-1}$, 10 mV·s$^{-1}$, 20 mV·s$^{-1}$, 50 mV·s$^{-1}$). The charging current (Ic) is calculated by identifying a middle potential range, which was 0.955 V vs. RHE, and the current associated with this potential range was considered as capacitive current or charging current. A plot of scan rate versus capacitive current was constructed, and the slope of this calibration curve gave a value of double layer capacitance per unit area, which serves as the estimation of ECSA.

EXAMPLE 7

Proposed Mechanism

Figure 9:
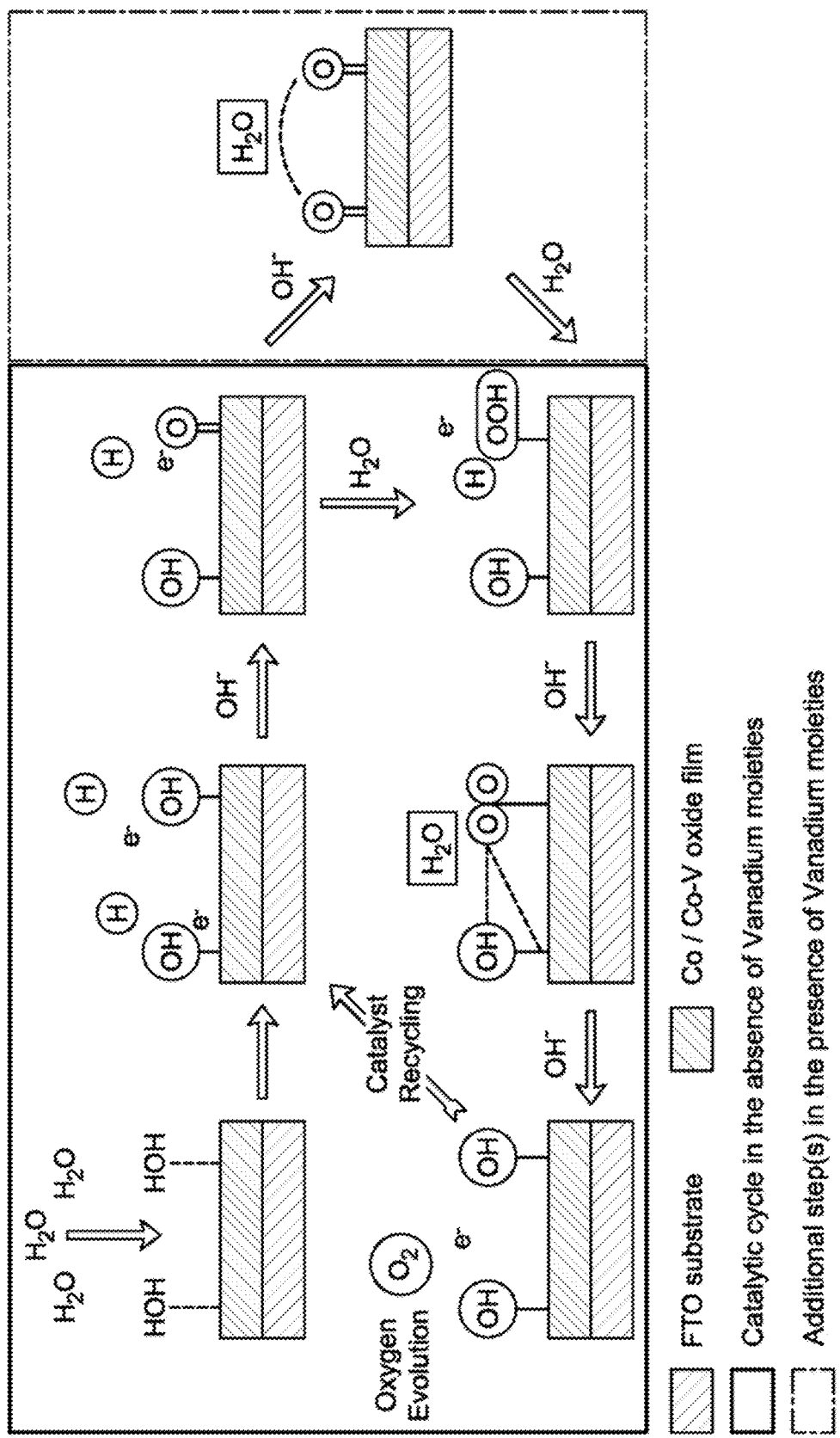
FIG. 9 is a plausible reaction mechanism for electroxidation of water in the absence and presence of vanadium in a cobalt electrocatalyst.

All of the above measurements as well as related works have led to a proposed mechanism of the catalytic process and the role of vanadium moieties in the system. See Ehsan et al. (2018); Liu et al. (2018); and Xing et al. (2018), as cited previously and incorporated herein by reference in their entirety. As shown in FIG. 9, whether V is present or absent, the first few steps of the process are same which involves the activation of Co sites in the alkaline medium. The reaction may begin with the adsorption of water and discharge of hydrogen and electrons to form adsorbed hydroxyl groups on the surface. These hydroxyl groups may react with more hydroxyl ions under the forward potential sweep, thereby leaving the oxygen atoms adsorbed onto the film substrate. In the absence of V, the reaction continues with the generation of OOH groups at the surface, which is considered as the rate limiting step. Then in the next step, a water molecule leaves the surface leaving an oxygen molecule adsorbed on the surface. This oxygen is then removed, completing the oxygen evolution reaction in the last step. However, in the presence of V, which is capable of switching its ground state, thereby modifying metal-metal and antibonding interactions in the catalytic cluster, the adsorbed oxygen species on the surface can form oxobridged entities among the neighboring oxygen atoms. This scheme of operation benefits the catalytic reaction in two ways. First, this oxobridged state is relatively more active, which leads to a thermodynamically favorable generation of a hydroperoxo intermediate and kinetically faster O—O bond formation, although it still remains a rate limiting step. Second, the oxobridged entities can also act as a catalyst, facilitating the reactions forming adsorbed hydroxyl and isolated oxygen species on the catalytic site. Thus, a favorable catalytic cycle is achieved leading to better performance of mixed oxide films. The presence of V in Co-oxide materials has also been shown to have a decreased overpotential at Co-active sites adjacent to V. However, the V-active sites show increased overpotential. This corresponds exactly to the volcano plots described earlier which show that a mixed oxide configuration can stabilize the bond strength and decrease the overpotential. This enhanced catalytic impact of V on the neighboring Co atoms can be ascribed to the coordination environment of Co atom and its modification caused by the lattice mismatch when V atoms are also present close by. In this manner, the Co-active sites can attain favorable water oxidation energies and the enhanced activity of OER catalysis is achieved.

EXAMPLE 8

Observations

Amorphous $CoVO_x$ films fabricated herein have shown a highly efficient catalytic character. Further, the target of obtaining well adhered and uniform films of all the materials was achieved directly on the substrate surfaces with changing morphological and catalytic character with variations in deposition times. The $CoVO_x$-20 film, due to its peculiar networked structure exposing larger number of catalytic sites, its high mass activity, larger ECSA, and low charge transfer resistance demonstrated lower overpotential, higher current density, and lower Tafel slope as compared to $CoVO_x$-40 and $CoVO_x$-60. These numbers were comparable to only a few $CoVO_x$ materials previously reported, however, a clear advantage was the formation of easily scalable films in just 20 min with a one-step procedure without any immobilization required. Moreover, it was unprecedented that the $CoVO_x$ films deposited on less conductive FTO substrates showed such a high catalytic activity. This characteristic paves the way for building and understanding new catalytic materials, using them in various applications besides water splitting reactions, and then moving towards commercial products.

A rapid one-step aerosol assisted chemical vapor deposition (AACVD) method was employed to synthesize amorphous and highly active Cobalt Vanadium mixed oxide catalysts ($CoVO_x$) directly over FTO substrates. Morphological and structural characterizations made by FE-SEM, XRD, EDX, and XPS revealed the formation of pure phase amorphous films with a gradual variation of topography as a function of deposition time. The most active of those films, $CoVO_x$-20, was obtained in 20 min deposition, showing a spongy network of interwoven nanofibers with a homogeneous distribution of 3-4 nm pores, achieving an overpotential of 308 mV at a 10 mA/cm² current density. A much higher current density of 175 mA/cm² could be achieved just 380 mV of overpotential with a Tafel slope as low as 62 mV/dec for this whole range while exhibiting long term stability. Mass activity, EIS data, and the estimation of ECSA all proved this high catalytic performance of $CoVO_x$-20 which is unprecedented for a low cost, up-scalable, and relatively low conductive substrate such as the FTO used herein. The findings not only highlight the benefit of using AACVD in preparing two-dimensional amorphous catalysts, but also prove the high efficiency of $CoVO_x$ materials thus obtained as outlined in a plausible reaction mechanism.

The invention claimed is:

1. An electrochemical water splitting cell, comprising:
an electrolyte vessel containing an electrolyte solution,
a working electrode, and a counter electrode,
wherein the working electrode and the counter electrode are disposed at least partially in the electrolyte vessel and are at least partially immersed in the electrolyte solution contained in the electrolyte vessel,
wherein the working electrode is a composite thin film electrode comprising:
a $CoVO_x$ layer having an average thickness of 500 nm-5 μm in contact with a substrate,
wherein the $CoVO_x$ layer comprises $CoVO_x$ having a Co:V molar ratio in a range of 1.0:1.2-1.5:1.0, and
wherein the CoVOx layer has an O:Co molar ratio and/or an O:V molar ratio in a range of 4:1 to 9:1.

2. The electrochemical water splitting cell of claim 1, wherein the $CoVO_x$ layer of the composite thin film electrode is porous with a pore size in a range of 2-10 nm.

3. The electrochemical water splitting cell of claim 1, wherein the composite thin film electrode has an electrochemically active surface area in a range of 12-22 mF/cm².

4. The electrochemical water splitting cell of claim 1, wherein the $CoVO_x$ layer of the composite thin film electrode consists essentially of amorphous $CoVO_x$.

5. The electrochemical water splitting cell of claim 1, wherein the $CoVO_x$ layer of the composite thin film electrode has an O:Co molar ratio in a range of 4:1 to 9:1.

6. The electrochemical water splitting cell of claim 1, wherein the substrate is a transparent conducting film.

7. The electrochemical water splitting cell of claim 1, wherein the composite thin film electrode has an overpotential in a range of 270-335 mV at a current density of 9-11 mA/cm².

8. The electrochemical water splitting cell of claim 1, wherein the composite thin film electrode has a current density of 1.0-10.0 mA/cm² when the electrodes are subjected to a bias potential of 1.45-1.55 V.

9. The electrochemical water splitting cell of claim 1, wherein the electrolyte solution comprises water and an inorganic base having a concentration of 0.1-1.0 M.

10. The electrochemical water splitting cell of claim 1, wherein the composite thin film electrode has a mass activity in range of 38-50 A/g at a potential of 350 mV.

11. The electrochemical water splitting cell of claim 6, wherein the substrate of the composite thin film electrode is a transparent conducting film selected from the group consisting of fluorine-doped tin oxide, indium tin oxide, aluminum-doped zinc oxide, gallium-doped zinc oxide, indium zinc oxide, indium zinc tin oxide, indium aluminum zinc oxide, indium gallium zinc oxide, indium gallium tin oxide, and antimony tin oxide.

12. The electrochemical water splitting cell of claim 1, wherein the counter electrode is a platinum mesh electrode.

13. The electrochemical water splitting cell of claim 1, wherein the electrolyte solution comprises at least one inorganic base selected from the group consisting of KOH, LiOH, NaOH, $Mg(OH)_2$ and $Ca(OH)_2$.

14. The electrochemical water splitting cell of claim 1, wherein the composite thin film electrode has a porous nanofiber film structure.

* * * * *